(12) United States Patent
Gradstein et al.

(10) Patent No.: US 12,204,605 B2
(45) Date of Patent: Jan. 21, 2025

(54) APPARATUSES, METHODS, AND SYSTEMS FOR INSTRUCTIONS OF A MATRIX OPERATIONS ACCELERATOR

(71) Applicant: Intel Corporation, Santa Clara, CA (US)

(72) Inventors: Amit Gradstein, Binyamina (IL); Simon Rubanovich, Haifa (IL); Sagi Meller, Zichron Yaakov (IL); Saeed Kharouf, Haifa (IL); Gavri Berger, Haifa (IL); Zeev Sperber, Zichron Yackov (IL); Jose Yallouz, Sha'ar HaAmakim (IL); Ron Schneider, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/360,793

(22) Filed: Jul. 27, 2023

(65) Prior Publication Data

US 2024/0078283 A1  Mar. 7, 2024

Related U.S. Application Data

(63) Continuation of application No. 16/729,361, filed on Dec. 28, 2019, now Pat. No. 11,714,875.

(51) Int. Cl.
*G06F 17/16* (2006.01)
*G06F 9/30* (2018.01)
(Continued)

(52) U.S. Cl.
CPC ............ *G06F 17/16* (2013.01); *G06F 9/3001* (2013.01); *G06F 9/30036* (2013.01);
(Continued)

(58) Field of Classification Search
CPC .... G06F 17/16; G06F 9/3001; G06F 9/30036; G06F 9/3851; G06F 9/34; G06F 9/30038; G06F 9/30098; G06T 1/20; G06T 9/00
See application file for complete search history.

(56) References Cited

U.S. PATENT DOCUMENTS 5,247,632 A   9/1993 Newman
5,475,822 A   12/1995 Sibigtroth et al.
(Continued)

FOREIGN PATENT DOCUMENTS

KR  10-2011-0079495 A   7/2011
TW      201923616 A     6/2019
(Continued)

OTHER PUBLICATIONS

Corrected Notice of Allowability, U.S. Appl. No. 15/201,442, Jan. 22, 2019, 5 pages.
(Continued)

*Primary Examiner* — Farley Abad
(74) *Attorney, Agent, or Firm* — NICHOLSON DE VOS & ELLIOTT LLP

(57) ABSTRACT

Systems, methods, and apparatuses relating to a matrix operations accelerator are described. In one embodiment, a processor includes a matrix operations accelerator circuit that includes a two-dimensional grid of fused multiply accumulate circuits that is switchable to a scheduling mode for execution of a decoded single instruction where the matrix operations accelerator circuit loads a first buffer of the two-dimensional grid of fused multiply accumulate circuits from a first plurality of registers that represents a first input two-dimensional matrix, checks if a second buffer of the two-dimensional grid of fused multiply accumulate circuits stores an immediately prior input two-dimension (Continued)

matrix that is the same as a second input two-dimensional matrix from a second plurality of registers that represents the first input two-dimensional matrix, and when the second buffer of the two-dimensional grid of fused multiply accumulate circuits stores the immediately prior input two-dimension matrix, from execution of a previous instruction, that is the same as the second input two-dimensional matrix: prevents reclamation of the second buffer between execution of the previous instruction and the decoded single instruction, performs an operation on the first input two-dimensional matrix from the first buffer and the immediately prior input two-dimension matrix from the second buffer to produce a resultant, and stores the resultant in resultant storage, and when the second buffer of the two-dimensional grid of fused multiply accumulate circuits does not store the immediately prior input two-dimension matrix, from execution of the previous instruction, that is the same as the second input two-dimensional matrix: loads the second input two-dimensional matrix into the second buffer of the two-dimensional grid of fused multiply accumulate circuits, performs the operation on the first input two-dimensional matrix from the first buffer and the second input two-dimension matrix from the second buffer to produce a resultant, and stores the resultant in the resultant storage.

20 Claims, 40 Drawing Sheets

(51) Int. Cl.
   *G06F 9/38* (2018.01)
   *G06F 9/34* (2018.01)

(52) U.S. Cl.
   CPC ........ *G06F 9/30038* (2023.08); *G06F 9/3851* (2013.01); *G06F 9/34* (2013.01)

(56) References Cited

U.S. PATENT DOCUMENTS

| | | | |
|---|---|---|---|
| 5,892,962 | A | 4/1999 | Cloutier |
| 6,161,219 | A | 12/2000 | Ramkumar et al. |
| 6,212,112 | B1 | 4/2001 | Naura et al. |
| 6,332,186 | B1 | 12/2001 | Elwood et al. |
| 6,877,020 | B1 | 4/2005 | Bratt et al. |
| 7,003,542 | B2 | 2/2006 | Devir |
| 7,209,939 | B2 | 4/2007 | Castrapel et al. |
| 7,725,521 | B2 | 5/2010 | Chen et al. |
| 7,792,895 | B1 | 9/2010 | Juffa et al. |
| 7,873,812 | B1 | 1/2011 | Mimar |
| 7,912,889 | B1 | 3/2011 | Juffa et al. |
| 7,932,910 | B2 | 4/2011 | Hansen et al. |
| 8,392,487 | B1 | 3/2013 | Mesh et al. |
| 8,984,043 | B2 | 3/2015 | Ginzburg et al. |
| 9,442,723 | B2 | 9/2016 | Yang et al. |
| 9,906,359 | B2 | 2/2018 | Gueron |
| 9,960,907 | B2 | 5/2018 | Gueron |
| 10,535,114 | B2 | 1/2020 | Bolz |
| 2003/0126176 | A1 | 7/2003 | Devir |
| 2004/0111587 | A1 | 6/2004 | Nair et al. |
| 2004/0154012 | A1 | 8/2004 | Wang et al. |
| 2004/0193668 | A1* | 9/2004 | Devaney .................. G06F 7/57 708/523 |
| 2004/0193858 | A1 | 9/2004 | Ahmad et al. |
| 2005/0125631 | A1* | 6/2005 | Symes ............... G06F 9/30112 712/E9.028 |
| 2005/0193050 | A1 | 9/2005 | Sazegari |
| 2006/0101245 | A1 | 5/2006 | Nair et al. |
| 2006/0190517 | A1 | 8/2006 | Guerrero |
| 2007/0186210 | A1 | 8/2007 | Hussain et al. |
| 2007/0271325 | A1* | 11/2007 | Juffa ..................... G06F 17/16 708/607 |
| 2008/0071851 | A1 | 3/2008 | Zohar et al. |
| 2008/0140994 | A1 | 6/2008 | Khailany et al. |
| 2008/0208942 | A1 | 8/2008 | Won et al. |
| 2009/0043836 | A1 | 2/2009 | Dupaquis et al. |
| 2009/0292758 | A1 | 11/2009 | Brokenshire et al. |
| 2009/0300091 | A1 | 12/2009 | Brokenshire et al. |
| 2009/0300249 | A1 | 12/2009 | Moyer et al. |
| 2010/0180100 | A1 | 7/2010 | Lu et al. |
| 2010/0191787 | A1* | 7/2010 | Chapman ................ G06F 7/527 708/627 |
| 2010/0325187 | A1 | 12/2010 | Juffa et al. |
| 2012/0079252 | A1 | 3/2012 | Sprangle |
| 2012/0113133 | A1 | 5/2012 | Shpigelblat |
| 2012/0137074 | A1 | 5/2012 | Kim et al. |
| 2012/0254588 | A1 | 10/2012 | Adrian et al. |
| 2012/0314774 | A1 | 12/2012 | Yang et al. |
| 2013/0305020 | A1 | 11/2013 | Valentine et al. |
| 2014/0149480 | A1 | 5/2014 | Catanzaro et al. |
| 2015/0067302 | A1 | 3/2015 | Gueron |
| 2015/0199266 | A1 | 7/2015 | Franchetti et al. |
| 2016/0188327 | A1 | 6/2016 | Ould-Ahmed-Vall et al. |
| 2017/0102921 | A1* | 4/2017 | Henry ..................... G06F 7/57 |
| 2018/0113708 | A1* | 4/2018 | Corbal .................. G06F 9/3001 |
| 2018/0189032 | A1* | 7/2018 | Nurvitadhi .............. G06F 30/30 |
| 2018/0253403 | A1 | 9/2018 | Woo et al. |
| 2019/0042540 | A1 | 2/2019 | Sade et al. |
| 2019/0196788 | A1* | 6/2019 | Han ........................ G06N 3/063 |
| 2019/0236049 | A1* | 8/2019 | Vantrease ............... G06F 17/16 |
| 2020/0026745 | A1 | 1/2020 | Pillai |
| 2020/0310794 | A1 | 1/2020 | Sperber |
| 2020/0218538 | A1* | 7/2020 | Mansell .............. G06F 9/30014 |
| 2020/0310802 | A1 | 10/2020 | Shemy |
| 2021/0165635 | A1 | 6/2021 | Ross et al. |

FOREIGN PATENT DOCUMENTS

| | | |
|---|---|---|
| TW | 201947587 A | 12/2019 |
| WO | 2004/053841 A2 | 6/2004 |
| WO | 2016/003740 A1 | 1/2016 |
| WO | 2016/105727 A1 | 6/2016 |
| WO | 2018/125250 A1 | 7/2018 |
| WO | 2018/174935 A1 | 9/2018 |

OTHER PUBLICATIONS

Corrected Notice of Allowability, U.S. Appl. No. 15/201,442, Mar. 11, 2019, 2 pages.
International Preliminary Report on Patentability, PCT App. No. PCT/US2017/036038, Jan. 17, 2019, 14 pages.
International Preliminary Report on Patentability, PCT App. No. PCT/US2017/040546, Oct. 3, 2019, 10 pages.
International Search Report and Written Opinion, PCT App. No. PCT/US2017/040540, Jan. 3, 2018, 14 pages.
International Search Report and Written Opinion, PCT App. No. PCT/US2017/036038, Sep. 5, 2017, 15 pages.
International Search Report and Written Opinion, PCT App. No. PCT/US2017/040534, Jan. 3, 2018, 11 pages.
International Search Report and Written Opinion, PCT App. No. PCT/US2017/040536, Dec. 20, 2017, 11 pages.
International Search Report and Written Opinion, PCT App. No. PCT/US2017/040537, Dec. 20, 2017, 11 pages.
International Search Report and Written Opinion, PCT App. No. PCT/US2017/040546, Jan. 24, 2018, 15 pages.
Lahr, David L., "Distractions: Timing Matrix Multiplication in SciDB and Setting the No. of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.
Non-Final Office Action, U.S. Appl. No. 15/201,442, May 4, 2018, 11 pages.
Non-Final Office Action, U.S. Appl. No. 16/398,200, Jul. 28, 2020, 16 pages.
Notice of Allowance, U.S. Appl. No. 15/201,442, Dec. 14, 2018, 5 pages.

(56) References Cited

OTHER PUBLICATIONS

Notice of Allowance, U.S. Appl. No. 16/729,361, Jun. 28, 2023, 9 pages.
Notice of Allowance, U.S. Appl. No. 16/729,361, Mar. 2, 2023, 13 pages.
Office Action, IN App. No. 202044039434, Feb. 14, 2024, 06 pages.
Office Action, TW App. No. 109132350, Mar. 22, 2024, 21 pages (10 pages of English Translation and 11 pages of Original Document).
Office Action, JP App. No. 2020-150874, Sep. 10, 2024, 03 pages (2 pages of English Translation and 01 page of Original Document).
Office Action, TW App. No. 109132350, Nov. 15, 2024, 05 pages (03 pages of English Translation and 02 pages of Original Document).

* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

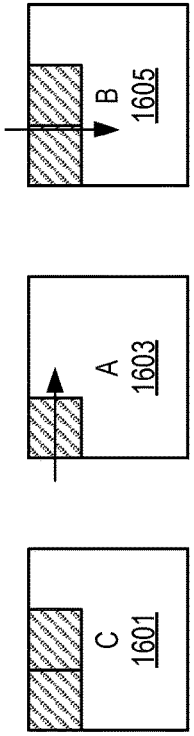

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

| PALETTE ID 1901 | STARTM 1903 |
|---|---|
| STARTP 1905 | PAIR INDICATORS 1907 |
| 0 | 0 |
| 0 | 0 |

. . .

| 0 | 0 |
|---|---|
| TMM0 ROWS 1913 | TMM0 COLUMNS 1915 |
| TMM1 ROWS | TMM1 COLUMNS |
| ▪ ▪ ▪ | |
| TMM15 ROWS | TMM15 COLUMNS |
| 0 | |

```
begin
  foreach Cycle do
    if M > 0 then
      ⌊ M − −
    BMQ.update() if Cycle mod 2 = 0 then
      if K_even > 0 then
        ⌊ K_even − −
      if K_even = 0 ∧ M ≤ 1 then
        if !BMQ.ready() then
          ⌊ MM = MQ.dequeue()
        else
          ⌊ MM = BMQ.dequeue()
        if MM.K > 8 then
          MM = MM(M, 8, N)
          ⌊ BMQ.enqueue(MM(M, K − 8, N))
        K_even = MM.K
        Dispatch_B(MM.B, cycle)
        if M = 0 then
          Dispatch_A(MM.A, cycle)
          Dispatch_C(MM.C, cycle + 2)
          ⌊ M = MM.M
        else if M = 1 then
          Dispatch_A(MM.A, cycle + 1)
          Dispatch_C(MM.C, cycle + 3)
          ⌊ M = MM.M + 1
    else if Cycle mod 2 = 1 then
      if K_odd > 0 then
        ⌊ K_odd − −
      if K_odd = 0 ∧ M ≤ 1 then
        if !BMQ.ready() then
          ⌊ MM = MQ.dequeue()
        else
          ⌊ MM = BMQ.dequeue()
        if MM.K > 8 then
          MM = MM(M, 8, N)
          ⌊ BMQ.enqueue(MM(M, K − 8, N))
        K_odd = MM.K
        Dispatch_B(MM.B, cycle)
        if M = 0 then
          Dispatch_A(MM.A, cycle)
          Dispatch_C(MM.C, cycle + 2)
          ⌊ M = MM.M
        else if M = 1 then
          Dispatch_A(MM.A, cycle + 1)
          Dispatch_C(MM.C, cycle + 3)
          ⌊ M = MM.M + 1
```

FIG. 28

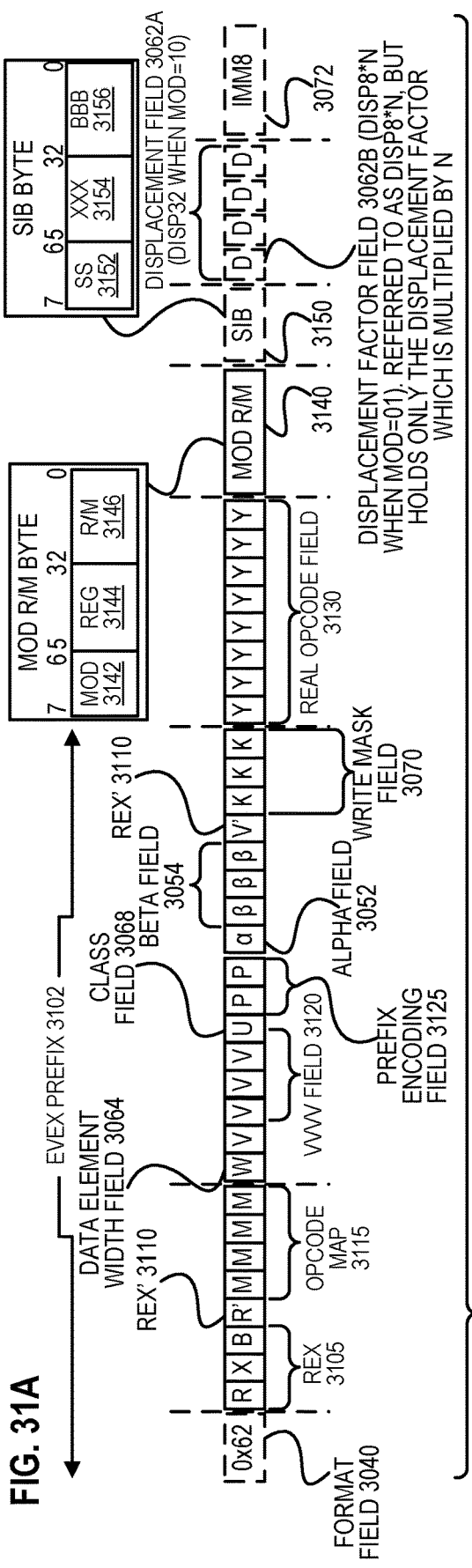
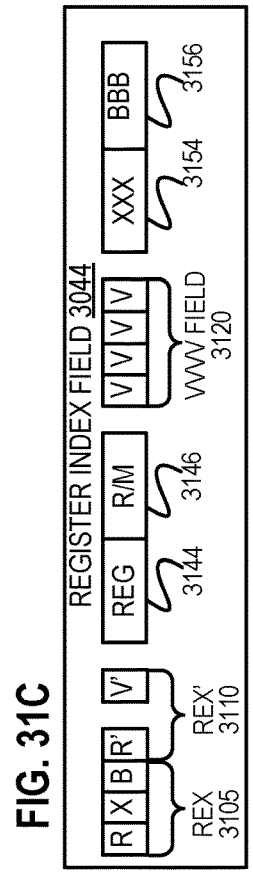
FIG. 31A
FIG. 31B
FIG. 31C

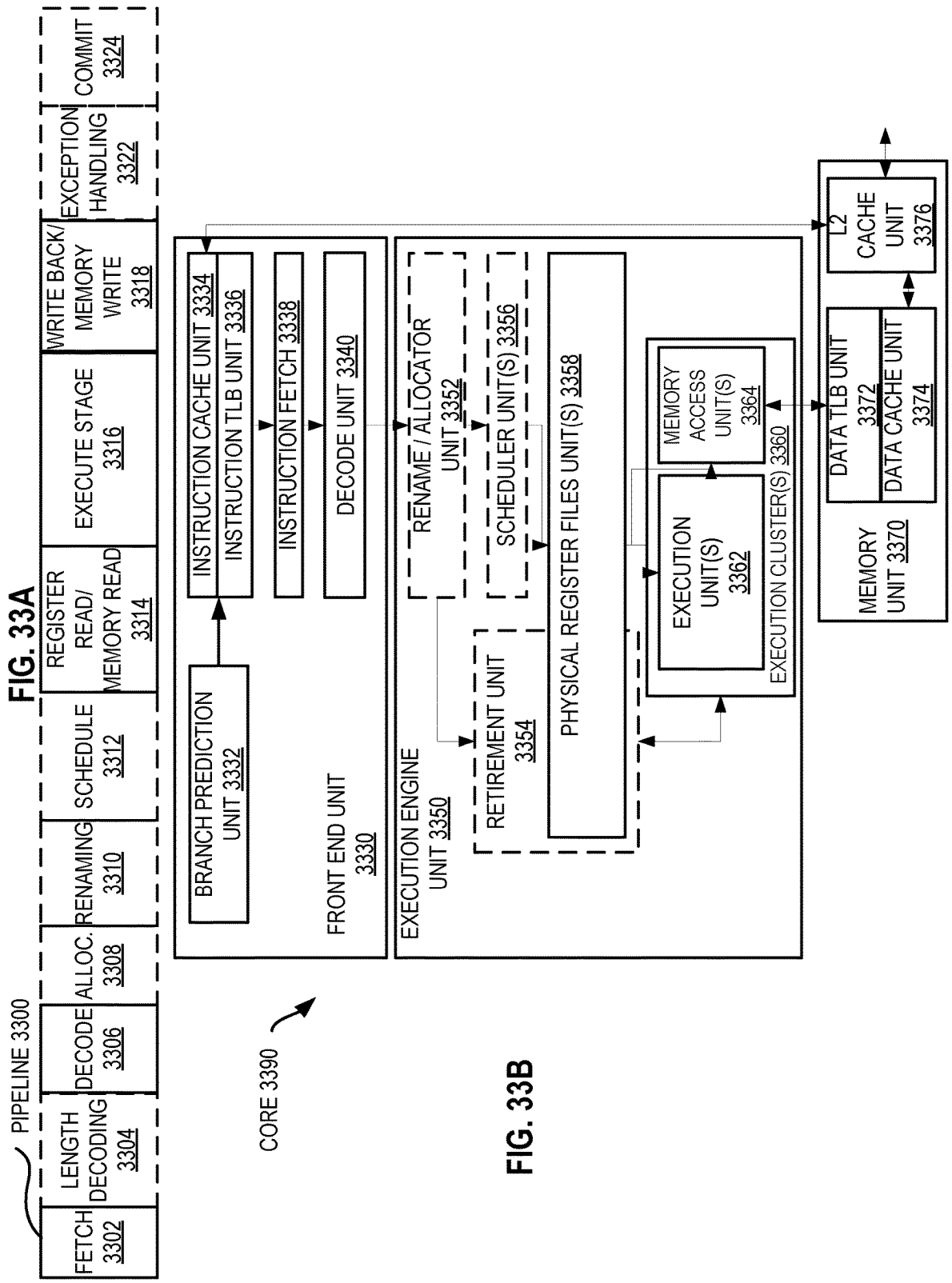

APPARATUSES, METHODS, AND SYSTEMS FOR INSTRUCTIONS OF A MATRIX OPERATIONS ACCELERATOR

CROSS-REFERENCE TO RELATED APPLICATIONS

The present application is a continuation of U.S. patent application Ser. No. 16/729,361 filed Dec. 28, 2019, now U.S. Pat. No. 11,714,875, which is incorporated herein by reference in its entirety.

TECHNICAL FIELD

The disclosure relates generally to computer processor architecture, and, more specifically, to apparatuses, systems, and methods for executing instructions to perform a matrix operation using a matrix operations accelerator circuit.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment.

FIG. 15 illustrates an example of a matrix expressed in row major format and column major format.

FIG. 16 illustrates an example of usage of matrices (tiles).

FIG. 19 illustrates an embodiment of a description of the matrices (tiles) to be supported.

FIG. 28 illustrates pseudocode for matrix operations circuitry according to embodiments of the disclosure.

FIG. 31A is a block diagram illustrating fields for the generic vector friendly instruction formats in FIGS. 30A and 30B according to embodiments of the disclosure.

FIG. 31B is a block diagram illustrating the fields of the specific vector friendly instruction format in FIG. 31A that make up a full opcode field according to one embodiment of the disclosure.

FIG. 31C is a block diagram illustrating the fields of the specific vector friendly instruction format in FIG. 31A that make up a register index field according to one embodiment of the disclosure.

FIG. 33A is a block diagram illustrating both an exemplary in-order pipeline and an exemplary register renaming, out-of-order issue/execution pipeline according to embodiments of the disclosure.

FIG. 33B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1A:
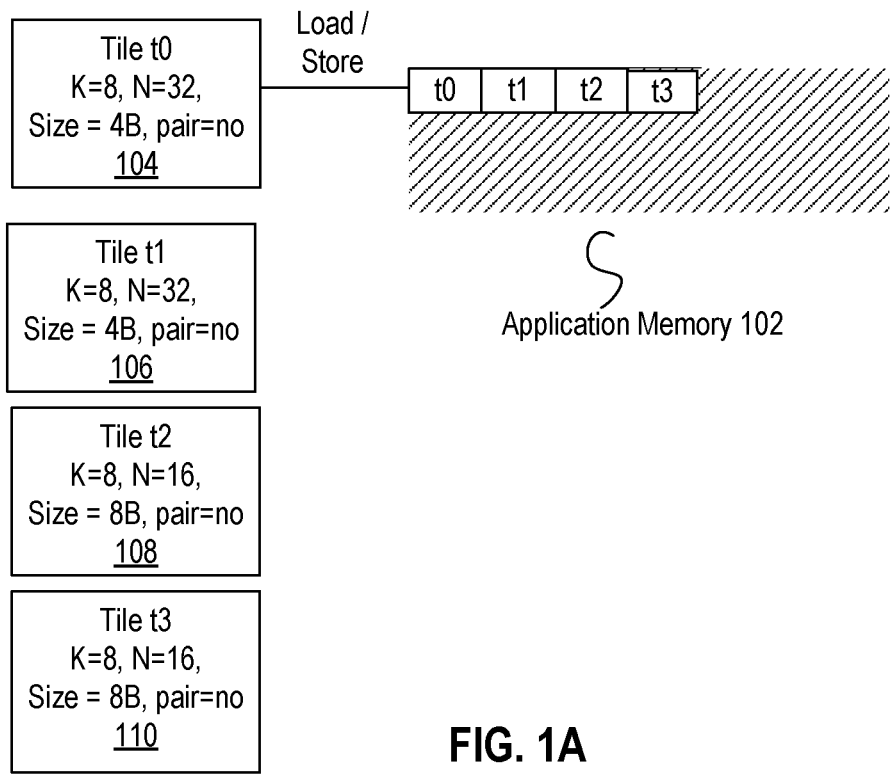
FIG. 1A illustrates an embodiment of configured tiles according to embodiments of the disclosure.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Matrices may be increasingly important in many computing tasks such as machine learning and other bulk data processing. Deep Learning is a class of machine learning algorithms. Deep learning architectures, such as deep neural networks, may be applied to fields including computer vision, speech recognition, natural language processing, audio recognition, social network filtering, machine translation, bioinformatics and drug design.

Inference and training, two tools used for deep learning, may utilize low precision arithmetic. Maximizing throughput of deep learning algorithms and computations may assist in meeting the needs of deep learning processors, for example, those performing deep learning in a data center.

Matrix-matrix multiplication (a.k.a., GEMM or General Matrix Multiplication) is a compute-heavy operation on certain processors. Special hardware for matrix multiplication (e.g., GEMM) is a good option for improving the peak compute (and energy efficiency) of certain applications, such as deep learning. Some of these applications, including deep learning, can operate on input data elements with relatively few bits without losing accuracy, as long as the output elements have enough bits (e.g., more than the inputs).

In certain processors, handling matrices is a difficult and/or instruction intensive task. For example, rows of a matrix could be put into a plurality of packed data (e.g., SIMD or vector) registers and then operated on individually. For example, an add two 8×2 (e.g., row by column) matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

DISCUSSION

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile) or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transform, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc. Also described herein are instructions for performing matrix operation (e.g., TILEPARTIALDOTPRODUCT) instructions.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating point, double precision floating point, integer, etc.) may be supported.

EXEMPLARY USAGE OF CONFIGURED TILES

In some embodiments, tile parameters can be configured. For example, a given tile may be configured to provide tile options. Exemplary tile options include but are not limited to: a number of rows of the tile, a number of columns of the tile, whether the tile is VALID, and whether the tile consists of a PAIR of equal-sized tiles.

FIG. 1A illustrates an embodiment of configured tiles. As shown, 4 kB of application memory 102 have stored thereon 4 1 kB titles, tile t0 104, tile t1 106, tile t2 108, and tile t3 110. In this example, the 4 tiles do not consist of pairs, and each have elements arranged in rows and columns. Tile t0 104 and tile t1 106 have K rows and N columns of 4-byte elements (e.g., single precision data), where K equals 8 and N=32. Tile t2 108 and tile t3 110 have K rows and N/2 columns of 8-byte elements (e.g., double precision data). As the double precision operands are twice the width of single precision, this configuration is consistent with a palette, used to provide tile options, supplying at least 4 names with total storage of at least 4 kB. In operation, the tiles can be loaded from and stored to memory using load and store operations. Depending upon the instruction encoding scheme used, the amount of available application memory, as well as the size, number, and configuration of available tiles varies.

Figure 1B:
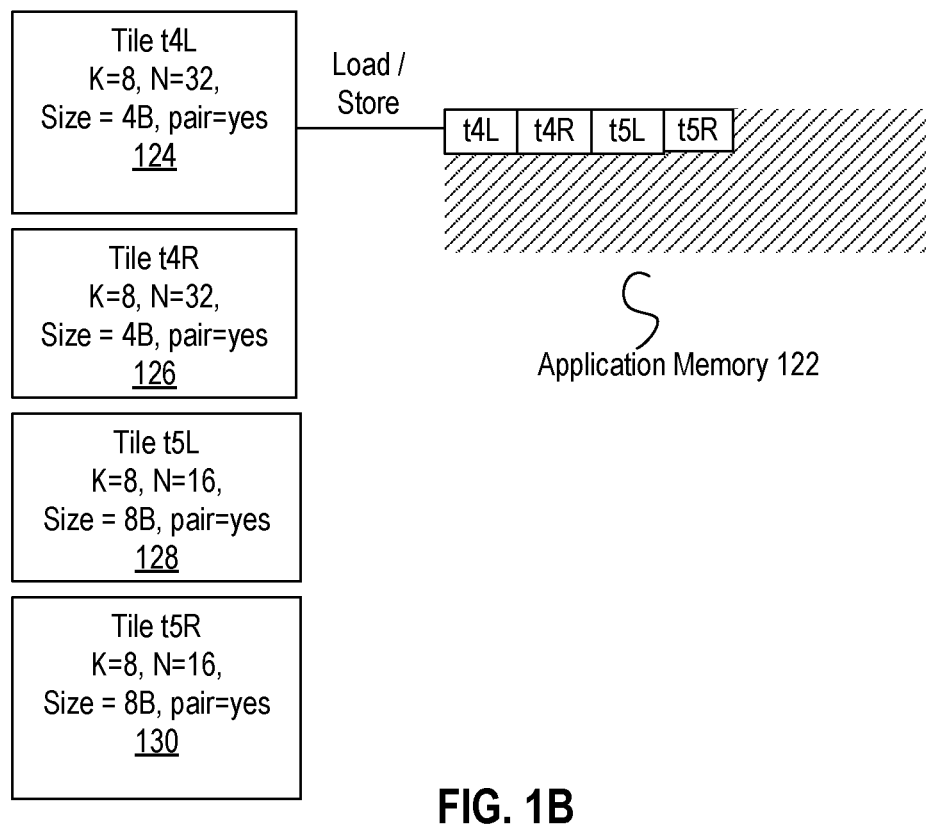
FIG. 1B illustrates an embodiment of configured tiles according to embodiments of the disclosure.

FIG. 1B illustrates an embodiment of configured tiles. As shown, 4 kB of application memory 122 have stored thereon 2 pairs of 1 kB-titles, the first pair being tile t4L 124 and tile t4R 126, and the second pair being tile t5L 128 and tile t5R 130. As shown the pairs of tiles are divided into a left tile and a right tile. In other embodiments, the pair of tiles are divided into an even tile and an odd tile. In this example, the 4 tiles each have elements arranged in rows and columns. Tile t4L 124 and tile t4R 126 have K rows and N columns of 4-byte elements (e.g., single precision floating point data), where K equals 8 and N equals 32. Tile t5L 128 and tile t5R 130 have K rows and N/2 columns of 8-byte elements (e.g., double precision floating point data). As the double precision operands are twice the width of single precision, this configuration is consistent with a palette, used to provide tile options, supplying at least 2 names with total storage of at least 4 kB. The four tiles of FIG. 1A use 4 names, each naming a 1 kB tile, whereas the 2 pairs of tiles in FIG. 1B can use 2 names to specify the paired tiles. In some embodiments, tile instructions accept a name of a paired tile as an operand. In operation, the tiles can be loaded from and stored to memory using load and store operations. Depending upon the instruction encoding scheme used, the amount of available application memory, as well as the size, number, and configuration of available tiles varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row).

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

EXEMPLARY TILE STORAGE TYPES

Figure 2:
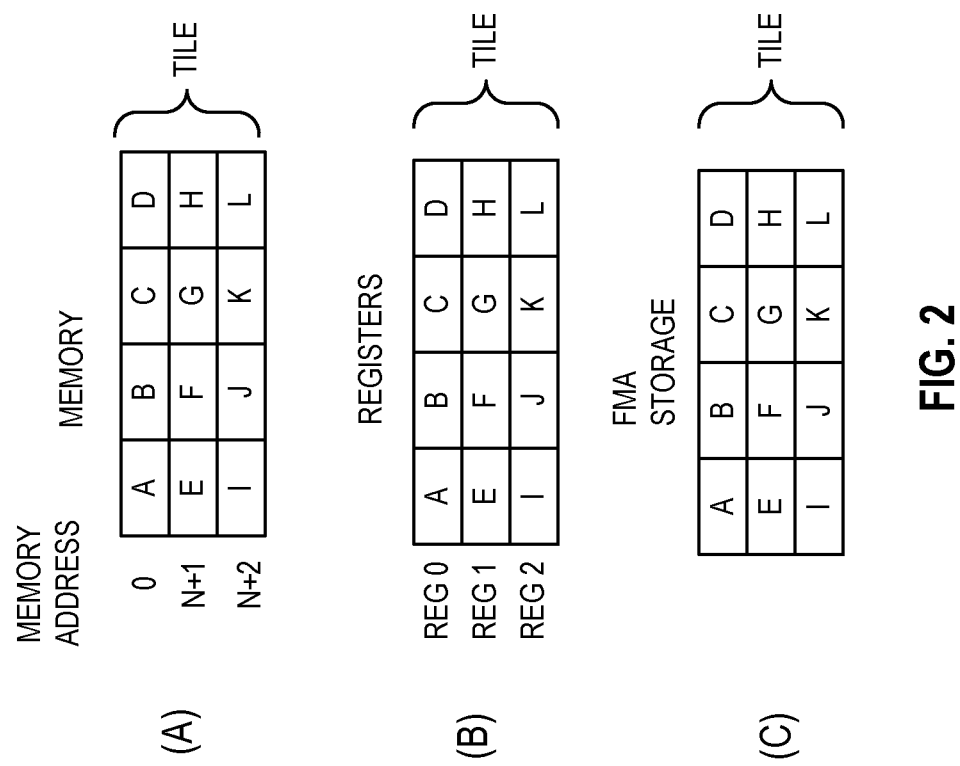
FIG. 2 illustrates several examples of matrix storage according to embodiments of the disclosure.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiply accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIG metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore instruction (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating-point exceptions, with the masking of the exceptions controlled by a control and/or status register.

To support restarting instructions after these events, the instructions store information in the start registers detailed below.

MATRIX (TILE) OPERATION SYSTEMS

Exemplary Hardware Support

Figure 3:
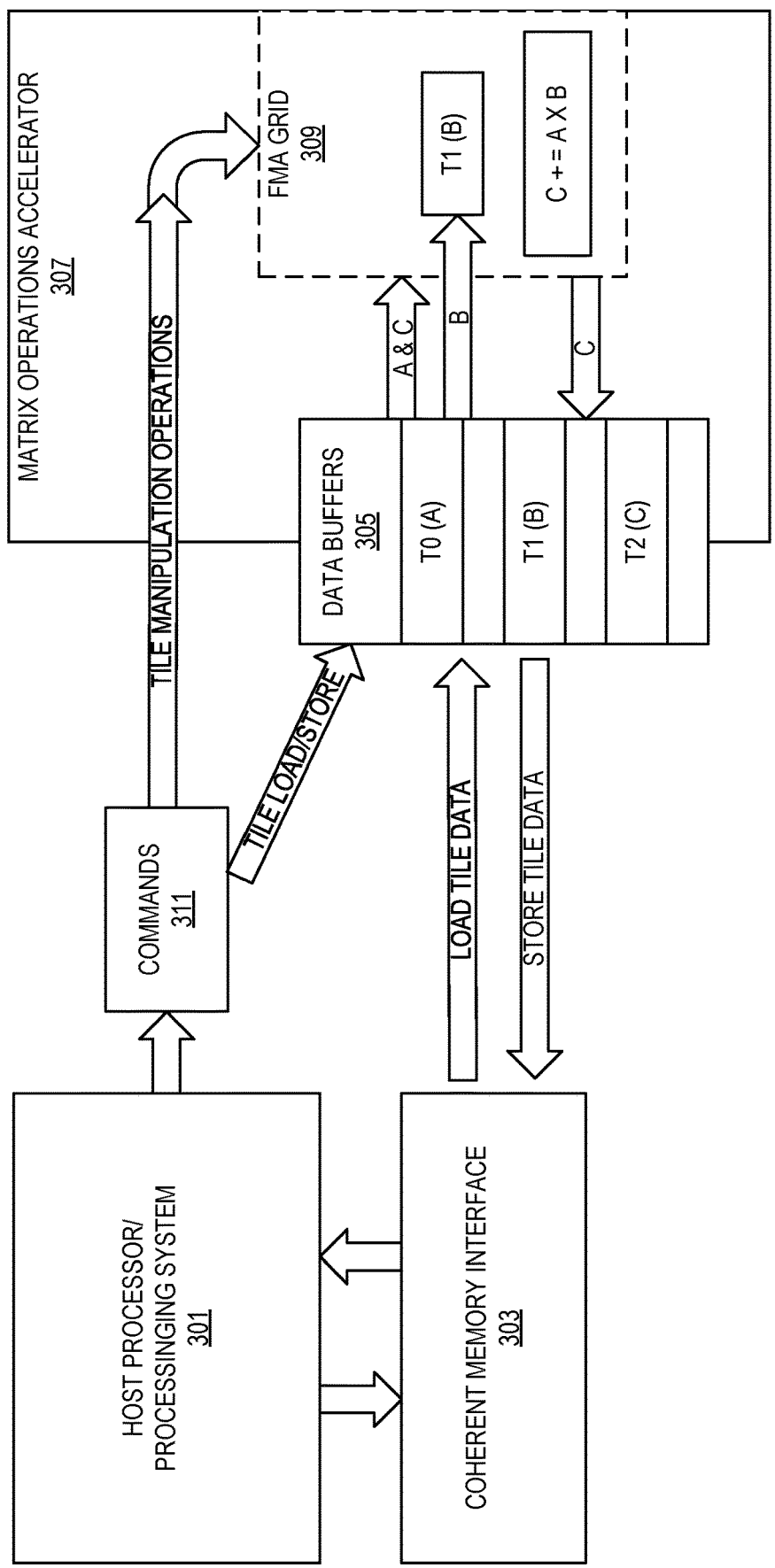
FIG. 3 illustrates an embodiment of a system utilizing a matrix (tile) operations accelerator according to embodiments of the disclosure.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
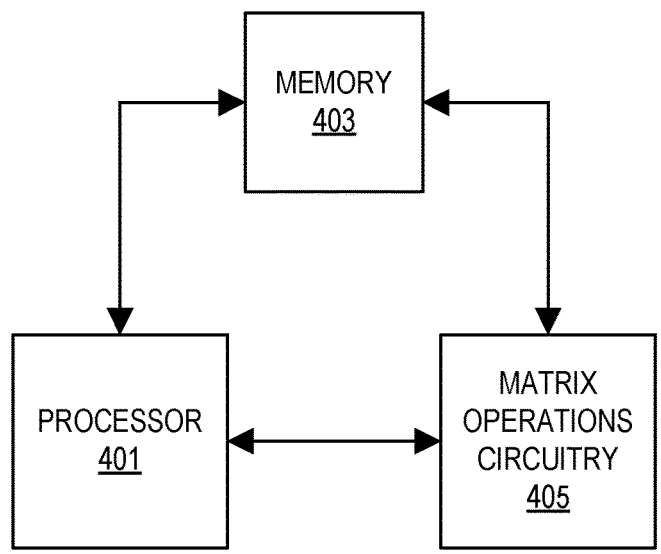
FIGS. 4 and 5 show different embodiments of how memory is shared using a matrix operations accelerator.
Figure 5:
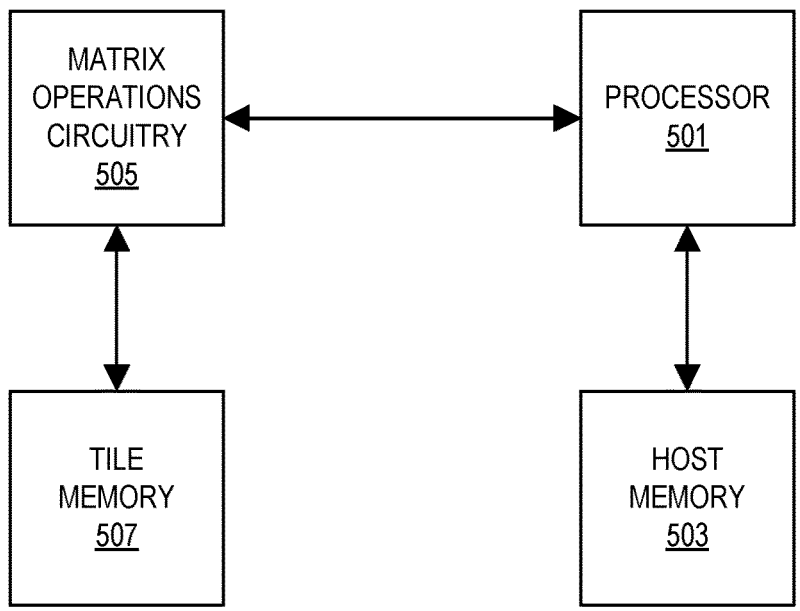

In this example, a coherent memory interface 303 is coupled to the host processor/processing system 301 and matrix operations accelerator 307 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

In some embodiments, tiles are supported using an overlay over physical registers. For example, a tile may utilize 16 1,024-bit registers, 32 512-bit registers, etc. depending on the implementation. In some embodiments, the matrix operations utilize 2-dimensional (2-D) data structures representing one or more packed regions of memory such as registers. Throughout this description, these 2-D data structures are referred to as tiles or tile registers.

In some embodiments, the matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset is stored in the FMA grid 309. As shown, T1 is housed and T0 and T2 are not. Note that A, B, and C refer to the matrices of these tiles which may or may not take up the entire space of the tile.

Figure 6:
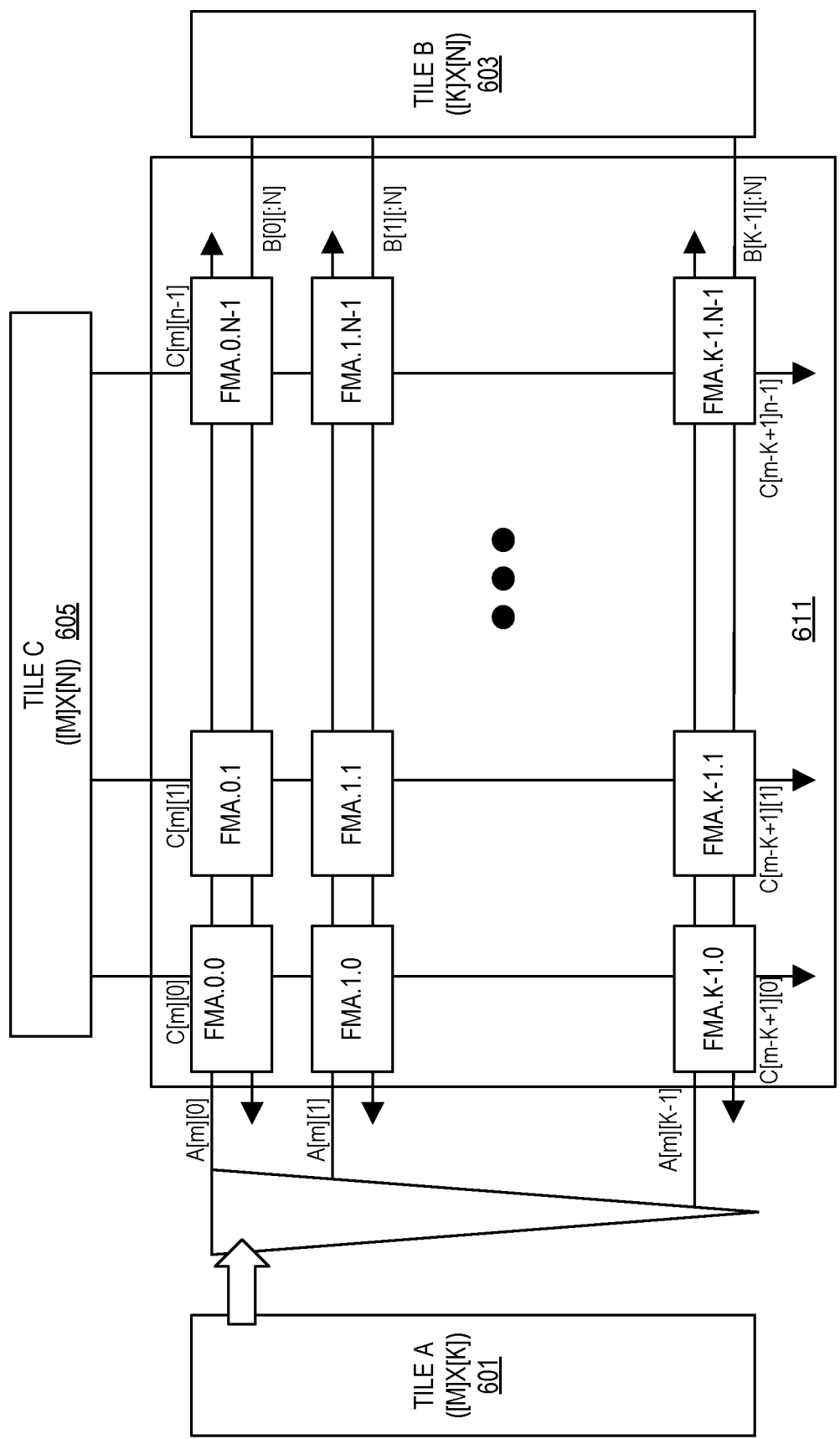
FIG. 6 illustrates an embodiment of matrix multiply accumulate operation using tiles ("TMMA").

FIG. 6 illustrates an embodiment of matrix multiply accumulate operation using tiles ("TMMA").

The number of rows in the matrix (TILE A 601) matches the number of serial (chained) FMAs comprising the computation's latency in certain embodiments. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix A (stored in tile A 601) has its elements of a row transformed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMMA, an implementation is free to implement this with "masking" or "early outs."

The latency of an entire TMMA is proportional to N*K. The repeat rate is proportional to N. The number of MACs per TMMA instruction is N*K*M.

Figure 7:
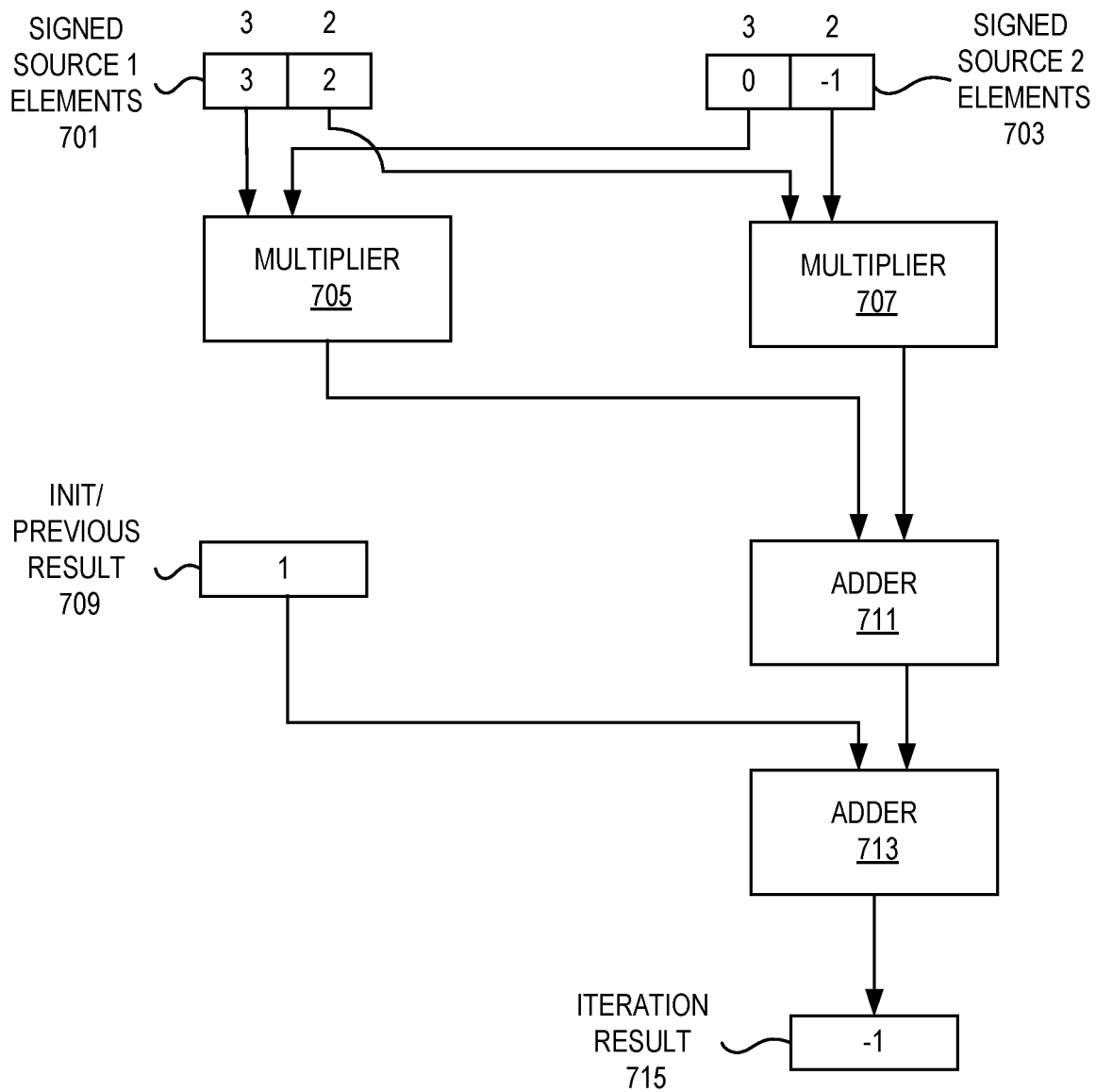
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating-point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating point) while the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709 or passed on to the next iteration if there is one. In some embodiments, a writemask is applied to this storage such that if a corresponding writemask (bit) is set, the storage happens, and, if not set, the storage does not happen.

Figure 8:
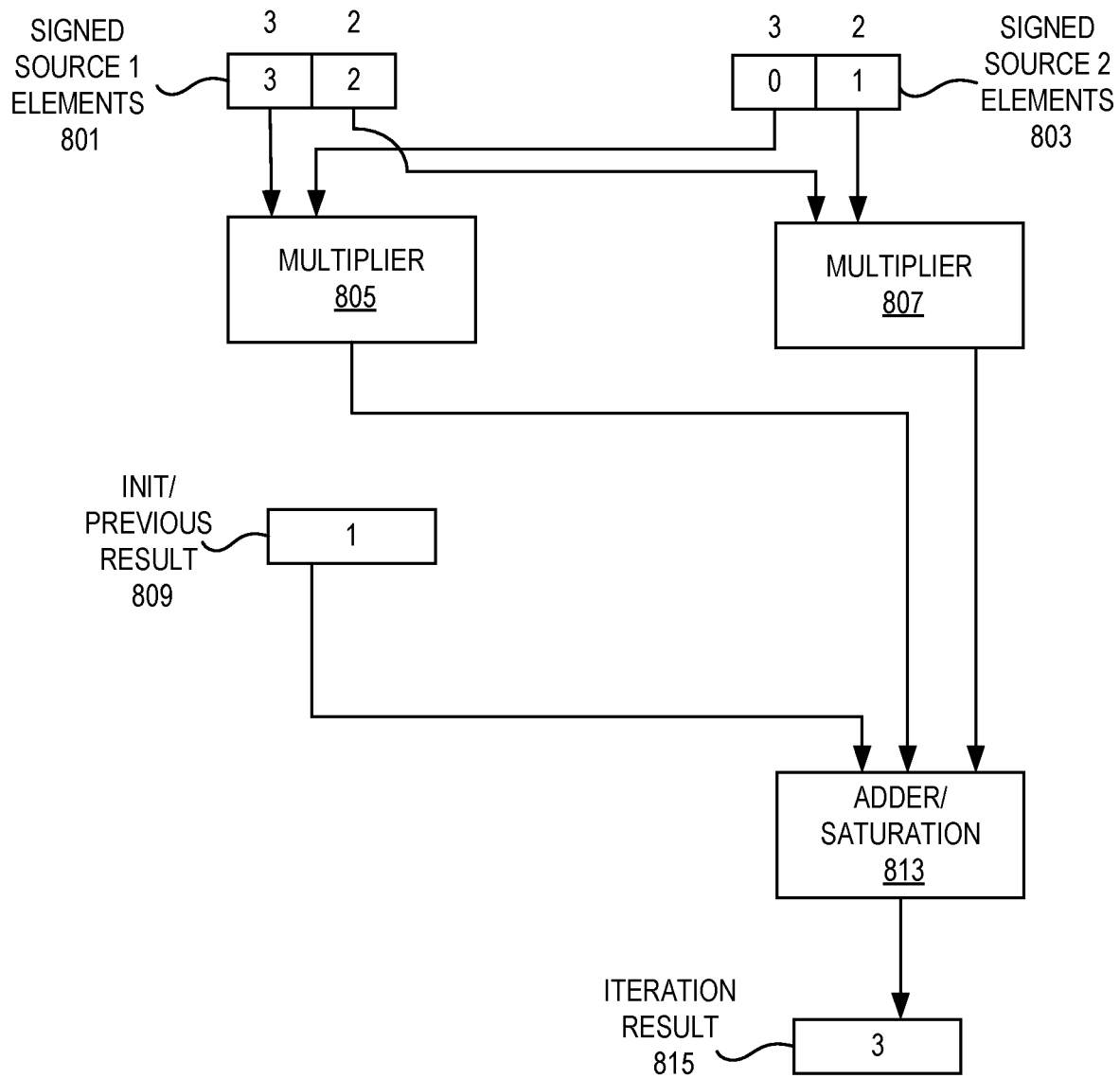
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 813.

Addition/saturation (accumulator) circuitry 813 preserves a sign of an operand when the addition results in a value that is too big. In particular, saturation evaluation occurs on the infinite precision result between the multi-way-add and the write to the destination or next iteration. When the accumulator 813 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from −128 (=−2^7) to 127(=2^7−1)).

The result of the addition and saturation check is stored into the signed result 815 in a packed data element position that corresponds to the packed data element position u sed from the signed third source 809 or passed on to the next iteration if there is one. In some embodiments, a writemask is applied to this storage such that if a corresponding writemask (bit) is set, the storage happens, and, if not set, the storage does not happen.

Figure 9:
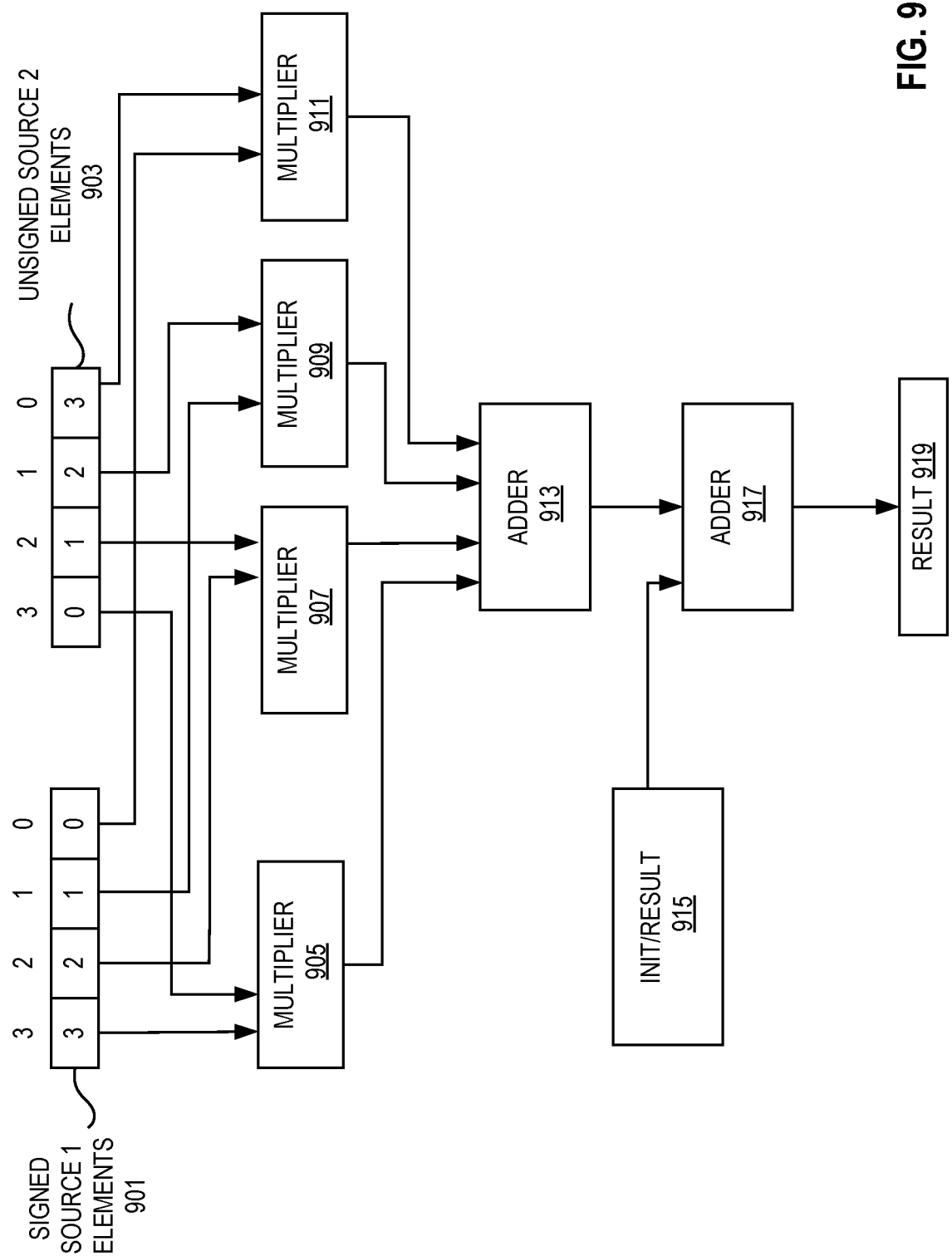
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 905, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 913.

The result of the addition of the results of the multiplications is added to the data from most significant packed data element position of the signed source 3 915 (using a different adder 917 or the same adder 913).

Finally, the result 919 of the second addition is either stored into the signed destination in a packed data element position that corresponds to the packed data element position used from the signed third source 915 or passed to the next iteration. In some embodiments, a writemask is applied to this storage such that if a corresponding writemask (bit) is set, the storage happens, and, if not set, the storage does not happen.

Figure 10:
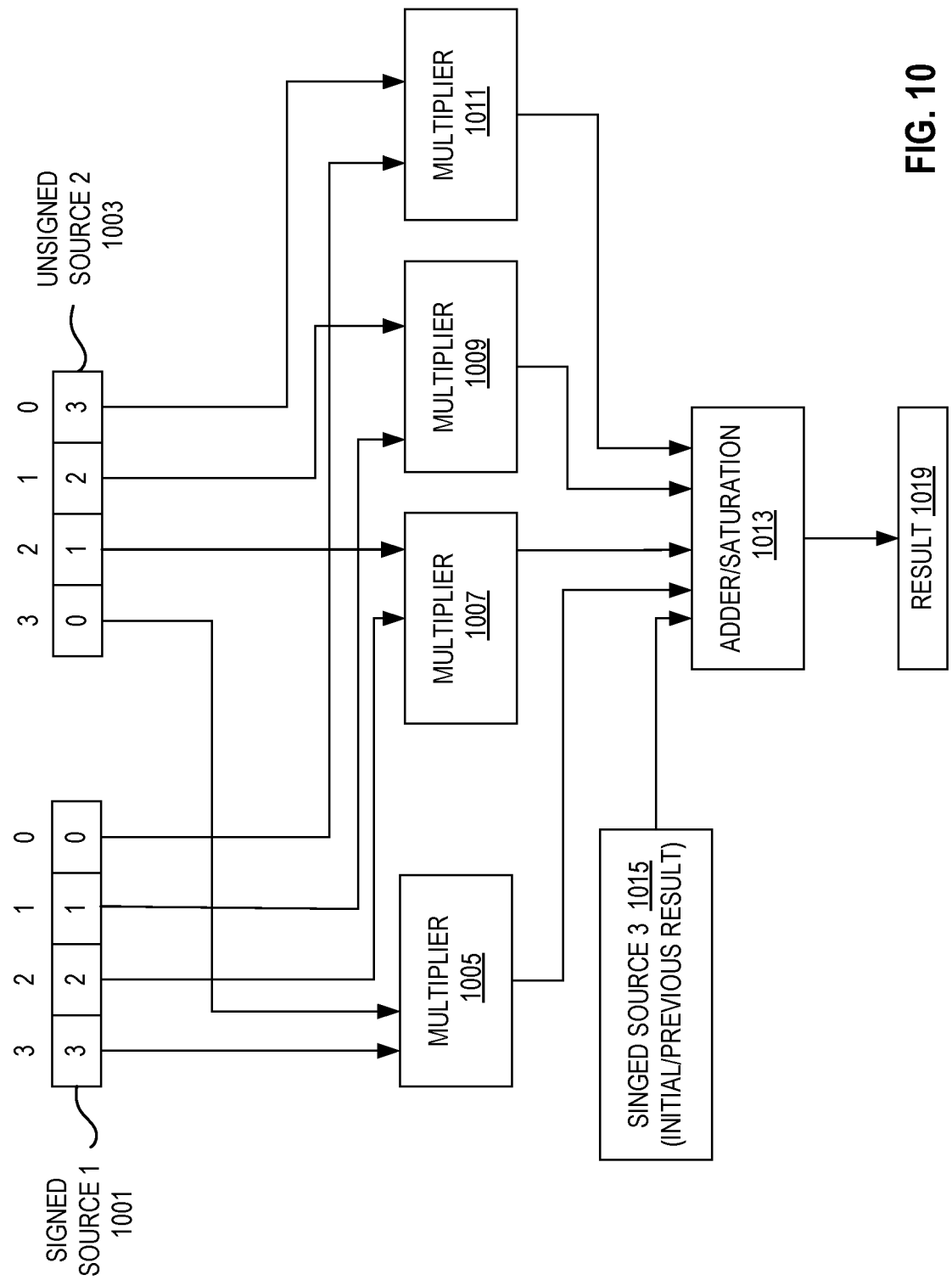
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source 1001 and a second unsigned source 1003 each have four packed data elements. Each of these packed data elements stores data such as floating point or integer data. A third signed source 1015 (initial or previous result) has a packed data element of which stores signed data. The sizes of the first and second sources are a quarter of the third signed source 1015 (initial or previous result). For example, the first and second sources could have 16-bit packed data elements (e.g., word) and the third signed source 1015 (initial or previous result) could have 64-bit packed data elements (e.g., double precision floating point or 64-bit integer).

In this illustration, the four most significant packed data element positions of the first signed source 1001 and the second unsigned source 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first signed source 1001 and the second unsigned source 1003 are multiplied using a multiplier circuit 1005, data from second most significant packed data element positions of the first signed source 1001 and the second unsigned source 1003 are multiplied using a multiplier circuit 1007, data from third most significant packed data element positions of the first signed source 1001 and the second unsigned source 1003 are multiplied using a multiplier circuit 1009, and data from the least significant packed data element positions of the first signed source 1001 and the second unsigned source 1003 are multiplied using a multiplier circuit 1011. In some embodiments, the signed packed data elements of the first signed source 1001 are sign extended and the unsigned packed data elements of the second unsigned source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of third signed source 1015 (initial or previous result). The result of the addition of the results of the multiplications is added to the data from most significant packed data element position of third signed source 1015 (initial or previous result) using adder/saturation 1013 circuitry.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from third signed source 1015 (initial or previous result) or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-intenger or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
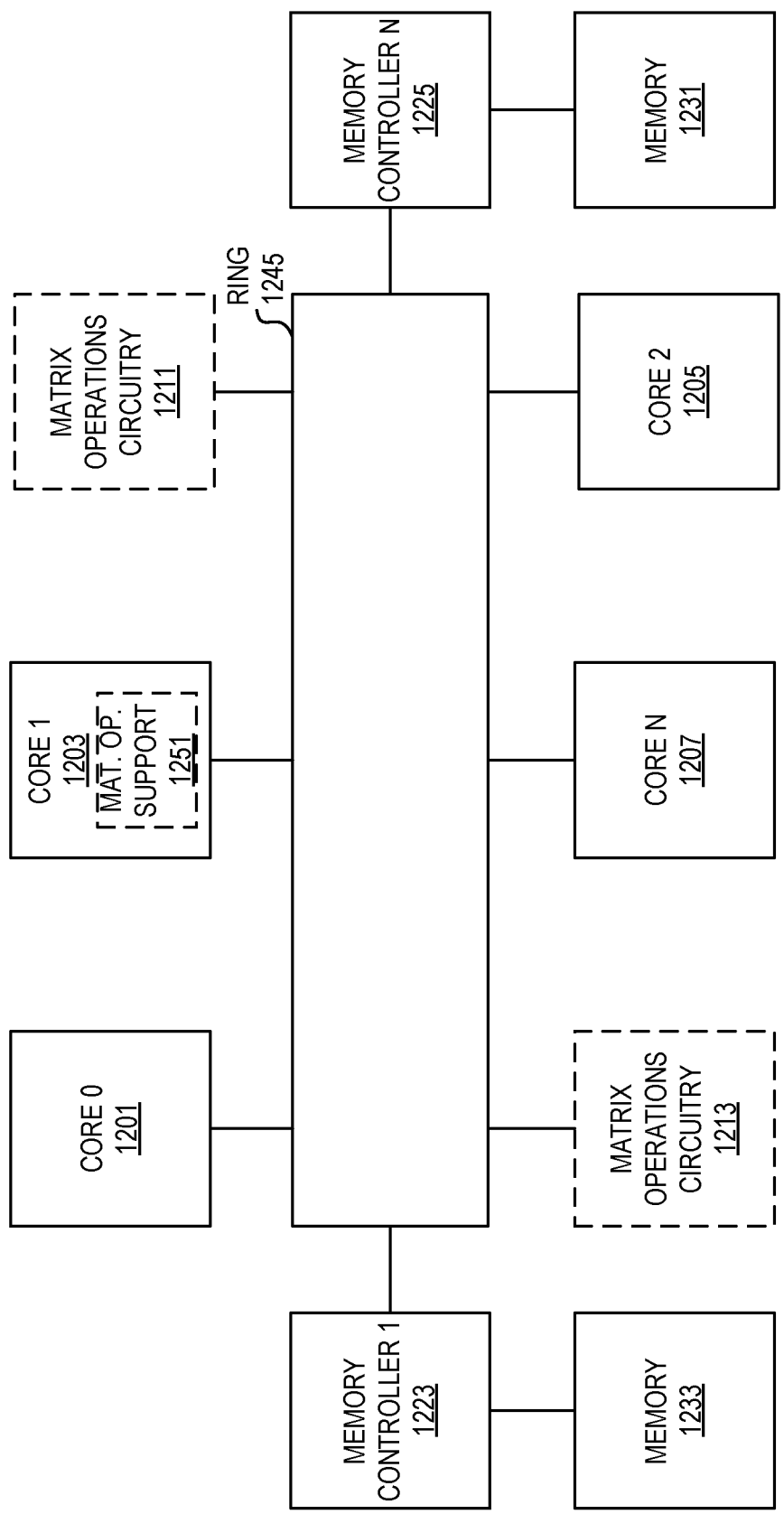
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, multiple entities are coupled with a ring interconnect 1245.

A plurality of cores, core 0 1201, core 1 1203, core 2 1205, and core N 1207 provide non-tile-based instruction support. In some embodiments, matrix operations circuitry 1251 is provided in a core 1203, and in other embodiments matrix operations circuitry 1211 and 1213 are accessible on the ring interconnect 1245.

Additionally, one or more memory controllers 1223-1225 are provided to communicate with memory 1233 and 1231 on behalf of the cores and/or matrix operations circuitry.

Figure 13:
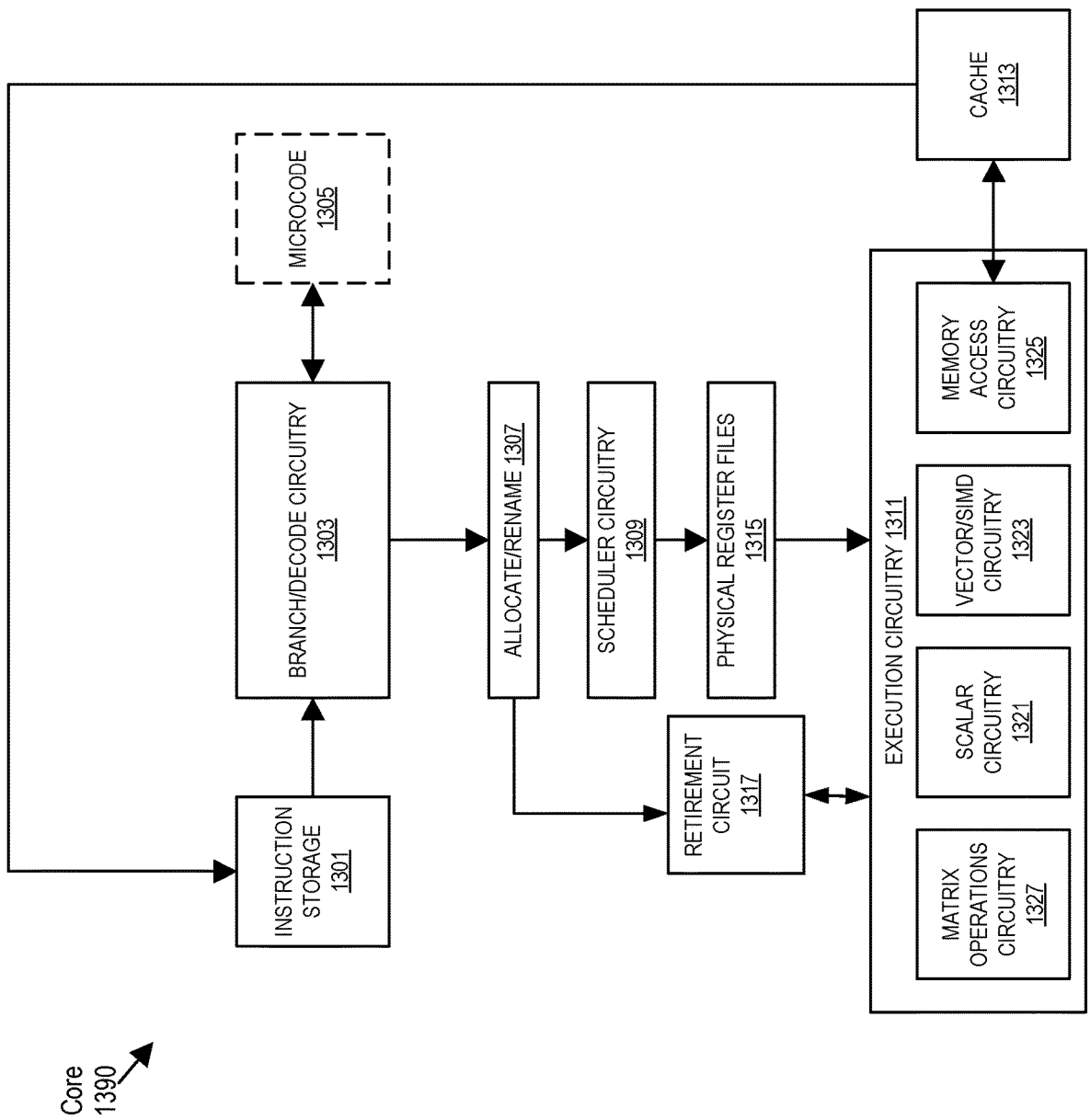
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 is a set of one or more execution circuits, including scalar circuitry 1321, vector/SIMD circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
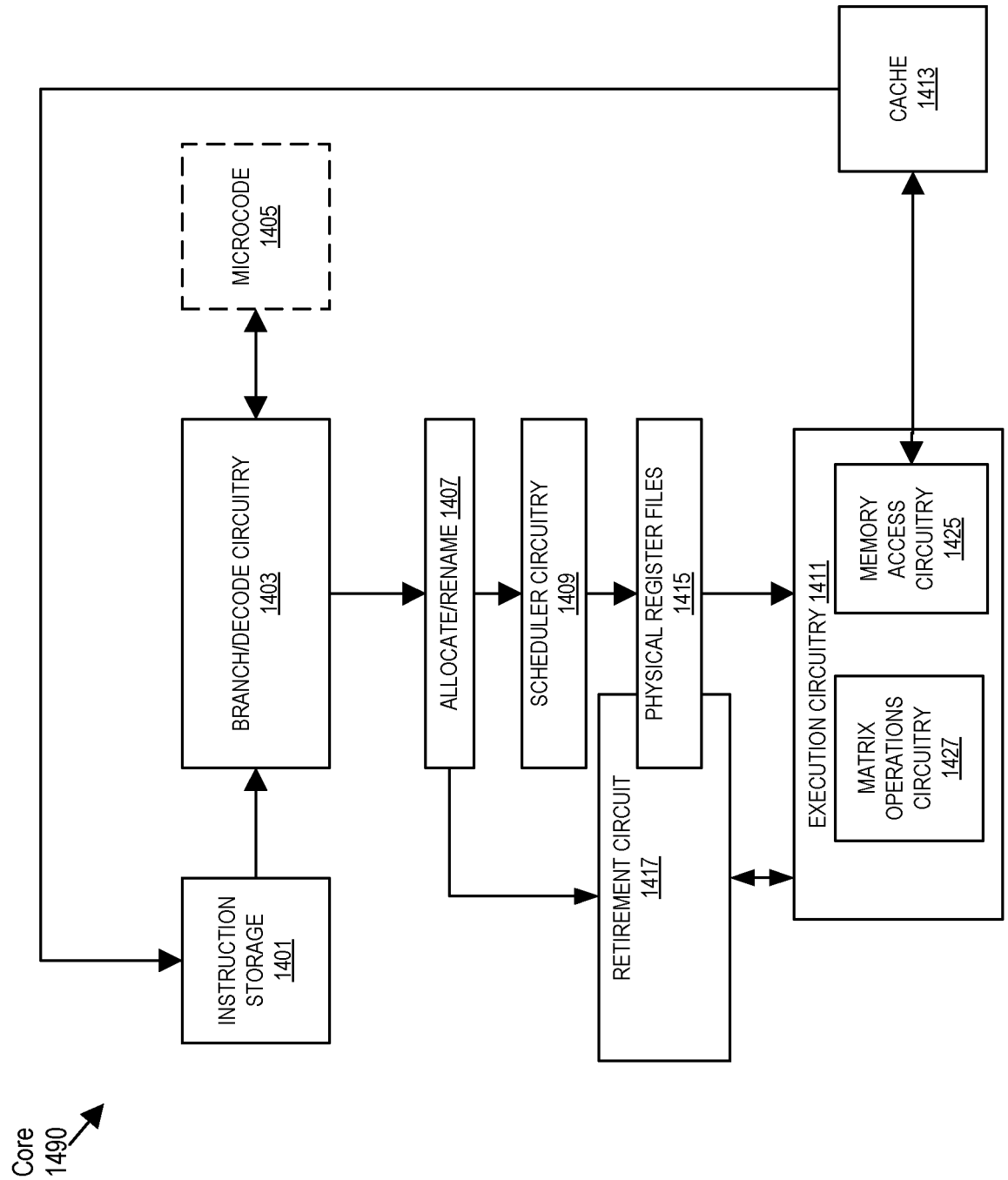
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to allocate/rename 1407 circuitry which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general-purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuitry 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425 to access cache 1413. The execution circuits 1427 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the allocate/rename 1407 circuitry performs an allocation stage and renaming stage; 4) the scheduler circuitry 1409 performs a schedule stage; 5) physical register file(s) (coupled to, or included in, the scheduler circuitry 1409 and allocate/rename 1407 circuitry and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T*B^T=(BA)^T$, where superscript T means transform. Reading column major data as row major data results in the matrix looking like the transform matrix.

In some embodiments, row-major semantics are utilized in hardware, and column major data is to swap the operand order with the result being transforms of matrix, but for subsequent column-major reads from memory it is the correct, non-transformd matrix.

For example, if there are two column-major matrices to multiply:

| a b | | g i k | | ag+bh ai+bj ak+bl |
|---|---|---|---|---|
| c d | * | h j l | = | cg+dh ci+dj ck+dl |
| e f | | | | eg+fh ei+fj ek+fl |
| (3×2) | | (2×3) | | (3×3) |

The input matrices would be stored in linear memory (column-major) as:

| a c e b d f |
|---|
| and |
| g h i j k l. |

Reading those matrices as row-major with dimensions 2×3 and 3×2, they would appear as:

| a c e | | g h |
|---|---|---|
| b d f | | i j |
| k l | | |

Swapping the order and matrix multiplying:

| g h | | a c e | | ag+bh cg+dh eg+fh |
|---|---|---|---|---|
| i j | * | b d f = | | ai+bj ci+di ei+fi |
| k l | | | | ak+bl ck+dl ek+fl |

The transform matrix is out and can then be stored in in row-major order:

| ag+bh | cg+dh | eg+fh | ai+bi | ci+di | ei+fi | ak+bl | ck+dl | ek+fl |
|---|---|---|---|---|---|---|---|---| and used in subsequent column major computations, it is the correct un-transformed matrix:

| ag+bh | ai+bj | ak+bl |
|---|---|---|
| cg+dh | ci+dj | ck+dl |
| eg+fh | ei+fi | ek+fl |

Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the matrix A 1603 (tmm2) is re-used twice as it multiplied by two tiles from matrix B 1605. Pointers to load a new A matrix (tile) and two new B matrices (tiles) from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
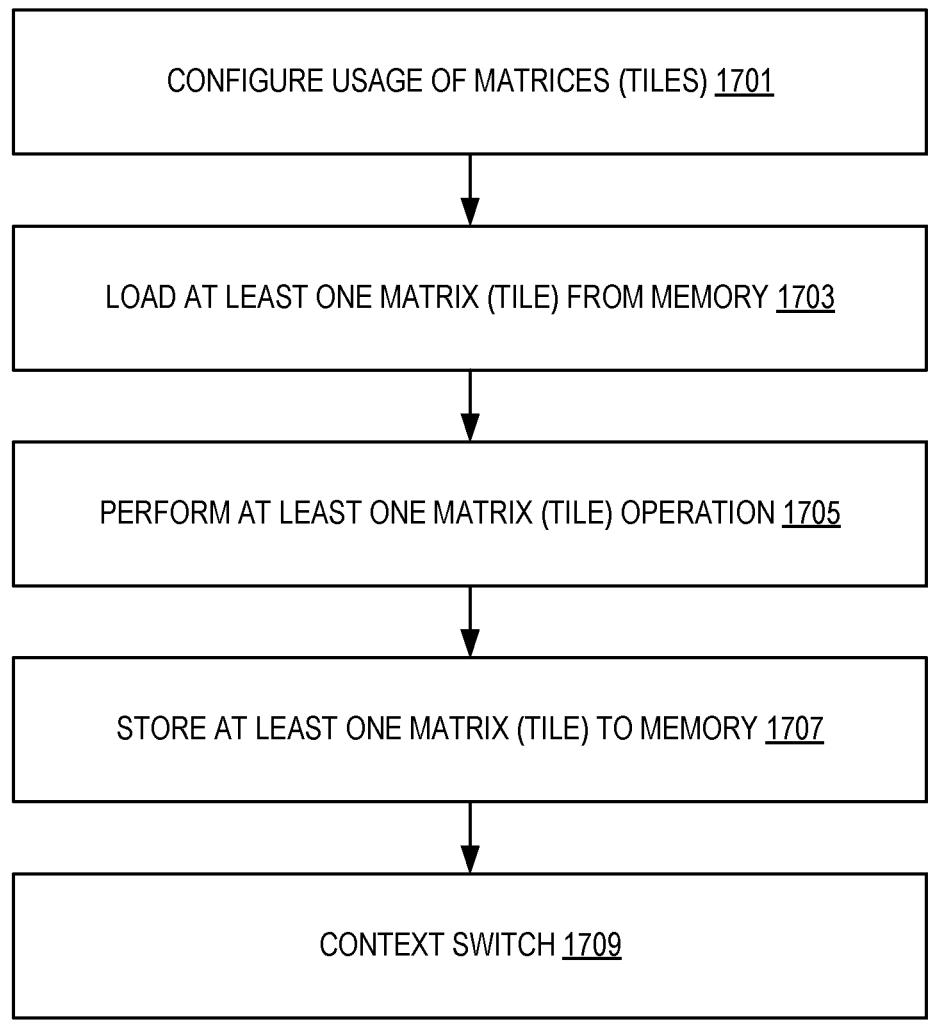
FIG. 17 illustrates an embodiment a method of usage of matrices (tiles).

FIG. 17 illustrates an embodiment of usage of matrices (tiles). At 1701, tile usage is configured. For example, a TILECONFIG instruction is executed to configure tile usage including setting a number of rows and columns per tile. Typically, at least one matrix (tile) is loaded from memory at 1703. At least one matrix (tile) operation is performed at 1705 using the matrices (tiles). At 1707, at least one matrix (tile) is stored out to memory and a context switch can occur at 1709.

EXEMPLARY CONFIGURATION

Title Configuration Hardware Support

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L×N) will typically not work if M and L are not the same.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

TILE USAGE CONFIGURATION

Figure 18:
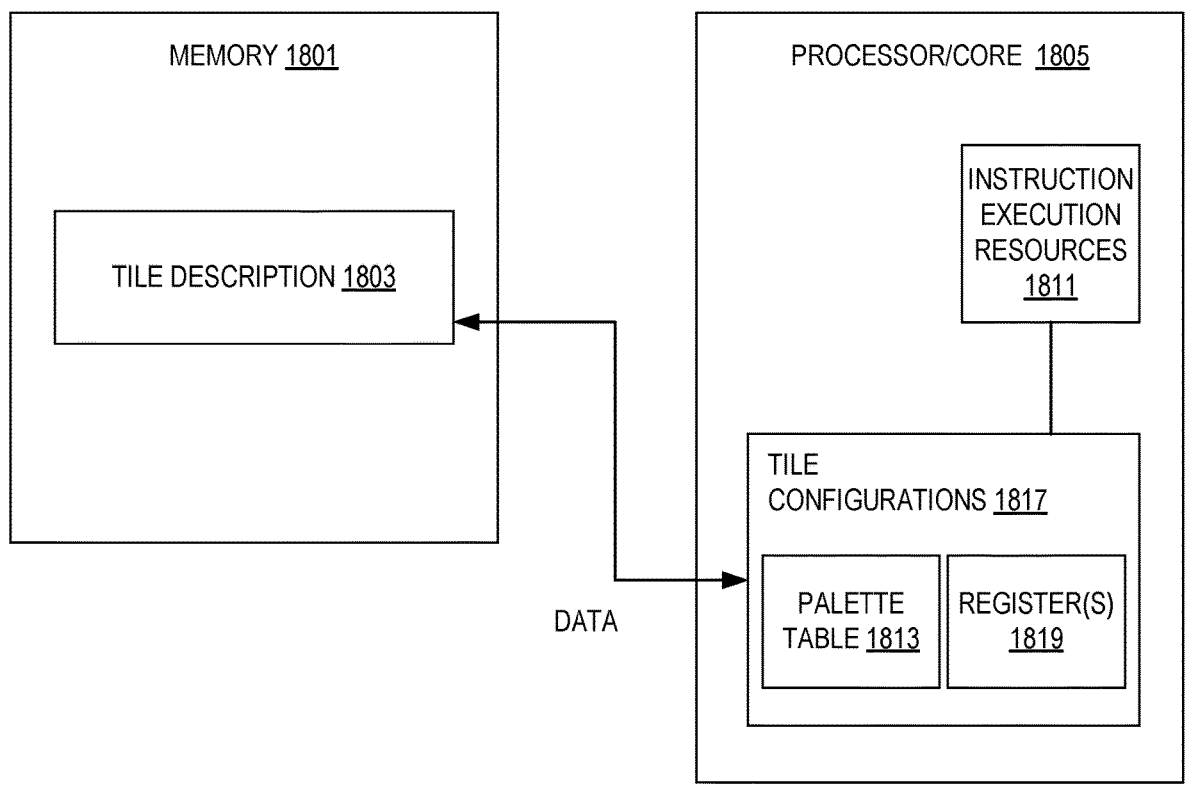
FIG. 18 illustrates support for configuration of the usage of tiles according to an embodiment.

FIG. 18 illustrates support for configuration of the usage of tiles according to an embodiment. A memory 1801 contains the tile description 1803 of the matrices (tiles) to be supported.

Instruction execution resources 1811 of a processor/core 1805 stores aspects of a tile description 1803 into tile configurations 1817. The tile configurations 1817 include palette table 1813 to detail what tiles for a palette are configured (the number of rows and columns in each tile) and a marking that matrix support is in use. In particular, instruction execution resources 1811 are configured to use tiles as specified by the tile configurations 1817. The instruction execution resources 1811 may also include a machine specific register or configuration register to indicate tile usage. Additional values such as in-use and start values are also set. The tile configurations 1817 utilize register(s) 1819 to store tile usage and configuration information.

FIG. 19 illustrates an embodiment of a description of the matrices (tiles) to be supported. This is the description that is to be stored upon an execution of a STTILECFG instruction. In this example, each field is a byte. In byte [0], a palette ID 1901 is stored. The palette ID is used to index a palette table 1813 which stores, per palette ID, a number of bytes in a tile, and bytes per row of the tiles that are associated with this ID as defined by the configuration.

Byte 1 stores a value to be stored in a "startRow" register 1903 and byte 2 stores a value to be stored in a register, startP 1905. To support restarting instructions after these events, the instructions store information these registers. To support restarting instructions after break events such as those detailed above, the instructions store information in these registers. The startRow value indicates the row that should be used for restart. The startP value indicates the position within the row for store operations when pairs are used and, in some embodiments, indicates the lower half of the row (in the lower tile of a pair) or higher half of the row (in the higher tile of a pair). Generally, the position in the row (the column) is not needed.

With the exception of TILECONFIG and STTILECFG, successfully executing matrix (tile) instructions will set both startRow and startP to zero.

Any time an interrupted matrix (tile) instruction is not restarted, it is the responsibility of software to zero the startRow and startP values. For example, unmasked floating point exception handlers might decide to finish the operation in software and change the program counter value to another instruction, usually the next instruction. In this case the software exception handler must zero the startRow and startP values in the exception presented to it by the operating system before resuming the program. The operating system will subsequently reload those values using a restore instruction.

Byte 3 stores an indication of pairs (1b per tile) of tiles 1907.

Bytes 16-17 store the number of rows 1913 and columns 1915 for tile 0, bytes 18-19 store the number of rows and columns for tile 1, etc. In other words, each 2-byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to an initial state with 0 rows, 0 columns.

Finally, the configuration in memory typically ends with an ending delineation such as all zeros for several consecutive bytes.

EXEMPLARY TILE AND TILE CONFIGURATION STORAGE

Figure 20A:
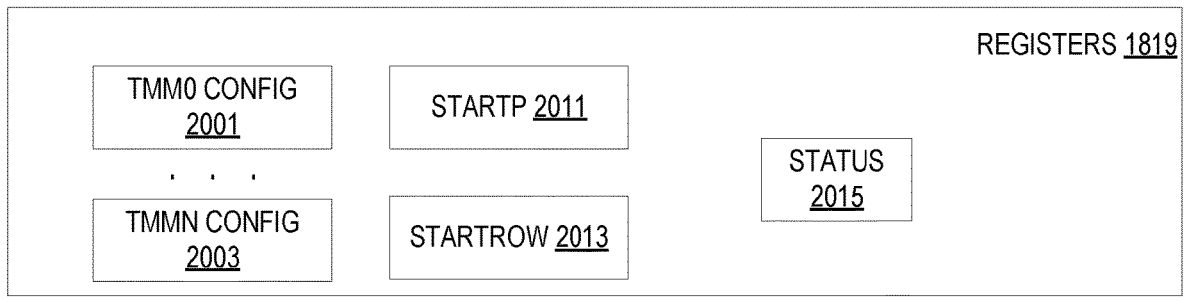
FIGS. 20A-20D illustrate examples of register(s).

FIGS. 20A-20D illustrate examples of register(s) 1819. FIG. 20A illustrates a plurality of registers 1819. As shown each tile (TMM0 2001 . . . TMMN 2003) has a separate register with each register storing a row and column size for that particular tile. StartP 2011 and StartRow 2013 are stored in separate registers. One or more status registers 2015 are set (e.g., TILES_CONFIGURED =1) to indicate tiles are configured for use.

Figure 20B:
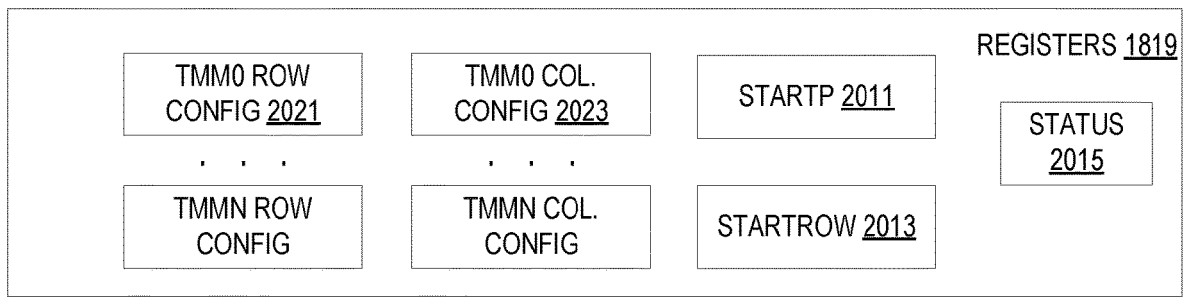

FIG. 20B illustrates a plurality of registers 1819. As shown each tile has separate registers for its rows and columns. For example, TMM0 rows configuration 2021, TMM0 columns configuration 2023, StartP 2011 and StartRow 2013 are stored in separate registers. One or more status registers 2015 are set (e.g., TILES_CONFIGURED=1) to indicate tiles are configured for use.

Figure 20C:

FIG. 20C illustrates a single register 1819. As shown, this register stores tile configurations (rows and columns per tile) 2031, StartP 2011, and StartRow 2013 are stored in single register as packed data registers. One or more status registers 2015 are set (e.g., TILES_CONFIGURED=1) to indicate tiles are configured for use.

Figure 20D:

FIG. 20D illustrates a plurality of registers 1819. As shown, a single register stores tile configuration (rows and columns per tile) 2031. StartP and StartRow are stored in separate registers 2011 and 2013. One or more status registers 2015 are set (e.g., TILES_CONFIGURED=1) to indicate tiles are configured for use.

Other combinations are contemplated such as combining the start registers into a single register where they are shown separately, etc.

SCHEDULING FOR A SYSTOLIC ARRAY

As mentioned above, hardware for General Matrix Multiplication (a.k.a., GEMM) is a good option for improving the peak compute (and energy efficiency) of certain applications, such as deep learning. The huge computational demand of applications based on Deep Neural Networks (DNNs) may lead to the use of hardware (e.g., accelerator) employing numerous (e.g., hundreds) of processing elements, e.g., fused multiply add (FMA) circuits. However, (e.g., DNN) accelerators may be optimized for a very regular dataflow pattern of dense matrix multiplications. In certain embodiments, an accelerator uses a systolic array implementation to maximize performance and area/power efficiency. A systolic array may include dense two-dimensional arrays optimized for very regular dataflows.

In certain hardware, the decoding and executing of an instruction causes the configurable systolic array hardware (e.g., matrix operations accelerator circuit) to compute C=A*B+C, where A, B, and C are each two-dimensional matrices, and for each element of C, the hardware computes a dot product of one row of input matrix A with one column of matrix B.

In certain embodiments, a matrix operations accelerator circuit takes as input a matrix A (of dimensions M×K, where M and K are integers), matrix B (of dimensions K×N, where M and K are integers), and matrix C (of dimension M×N, where M and N are integers), and then performs an operation (e.g., a fused multiply add) on respective elements to produce a resultant that is stored in a matrix (e.g., back into matrix C of dimension M×N, where M and N are integers). In one embodiment, M, K, and N are less than or equal to 16. In certain embodiments, the matrix operations accelerator circuit performs the following operation (e.g., on floating-point numbers):

$$\text{updated } c_{i,j} = c_{i,j} + \sum_{l=0}^{K-1} a_{i,l} * b_{l,j}$$

Figure 21:
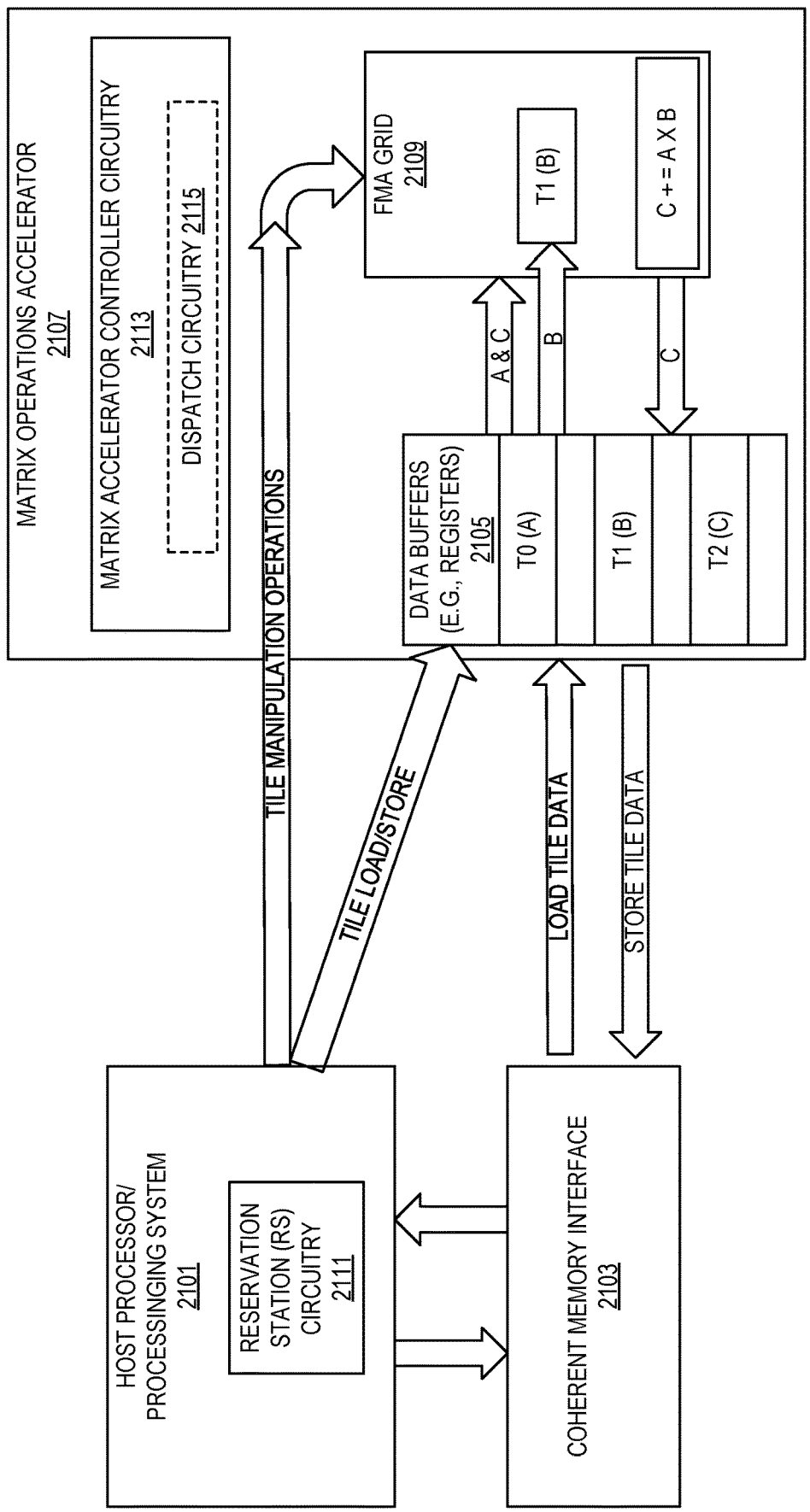
FIG. 21 illustrates an embodiment of a system utilizing a matrix (tile) operations accelerator according to embodiments of the disclosure.

FIG. 21 illustrates an embodiment of a system utilizing a matrix (tile) operations accelerator 2107 according to embodiments of the disclosure. In certain embodiments, a host processor/processing system 2101 (for example, a hardware processor core, e.g., processor core 3390 in FIG. 33B) communicates commands (e.g., matrix manipulation operations such as arithmetic or matrix manipulation operations, load, and/or store operations) to a matrix operations accelerator 2107. However, this is shown this way for discussion purposes only. As detailed herein, accelerator 2107 may be a part of a processing core. Commands that are tile manipulation operator instructions may refer to tiles as register-register ("reg-reg") or register-memory ("reg-mem") format. Other commands such as TILESTORE, TILELOAD, TILECONFIG, etc., do not perform data operations on a tile in certain embodiments. Commands may be decoded instructions (e.g., micro-operations) or macro-instructions for the accelerator 2107 to handle. In one embodiment, a hardware processor core sends micro-ops to matrix (tile) operations accelerator 2107 in response to a matrix operations instruction being executed by the hardware processor core.

In one embodiment, reservation station (RS) circuitry 2111 sends commands (e.g., micro-ops) to matrix operations accelerator 2107. In certain embodiments, matrix operations accelerator 2107 is a tile matrix unit (TMU). In certain embodiments, matrix operations accelerator 2107 includes a matrix accelerator controller circuitry 2113. In one embodiment, matrix accelerator controller (e.g., circuitry 2113) is to control the operations and flow of data in, out, and/or within matrix operations accelerator 2107. Matrix operations accelerator 2107 (e.g., matrix accelerator controller circuitry 2113) may include dispatch circuitry 2115, for example, to control the dispatching of received requests (e.g., commands) from host processor/processing system 2101 to one or more components of the matrix operations accelerator 2107. An example of dispatch circuitry is discussed below in reference to FIG. 23.

Depicted matrix operations accelerator 2107 includes data buffers (e.g., registers) 2105. In certain embodiments, data buffers (e.g., registers) 2105 are configurable to store a respective matrix, for example, into a first plurality of registers (e.g., tile) that represents a first two-dimensional matrix (e.g., tile marked as T0 storing matrix A in storage 2105), a second two-dimensional matrix (e.g., tile marked as T1 storing matrix B in storage 2105), a third two-dimensional matrix (e.g., tile marked as T3 storing matrix C in storage 2105), etc. System (e.g., host processor/processing system 2101) may include an (e.g., coherent) memory interface 2103 (e.g., data cache unit) to send and receive data (e.g., in contrast to commands) between host processor/processing system 2101 (e.g., as an Out of Order (OoO) core) and matrix operations accelerator 2107.

In certain embodiments, matrix operations accelerator 2107 utilize a grid of processing elements 2109 (e.g., fused multiply add (FMA) circuits) to perform operations. In one embodiment, dispatch circuitry 2115 controls the sending of data (e.g., one or more values from a tile) from data buffers 2105 (e.g., registers forming a tile) to the grid of processing elements 2109 (e.g., grid of FMA circuits). In certain embodiments, the grid of processing elements 2109 is a two-dimensional grid of processing elements, e.g., two-dimensional grid of processing element circuits 2200 in FIG. 22.

Figure 22:
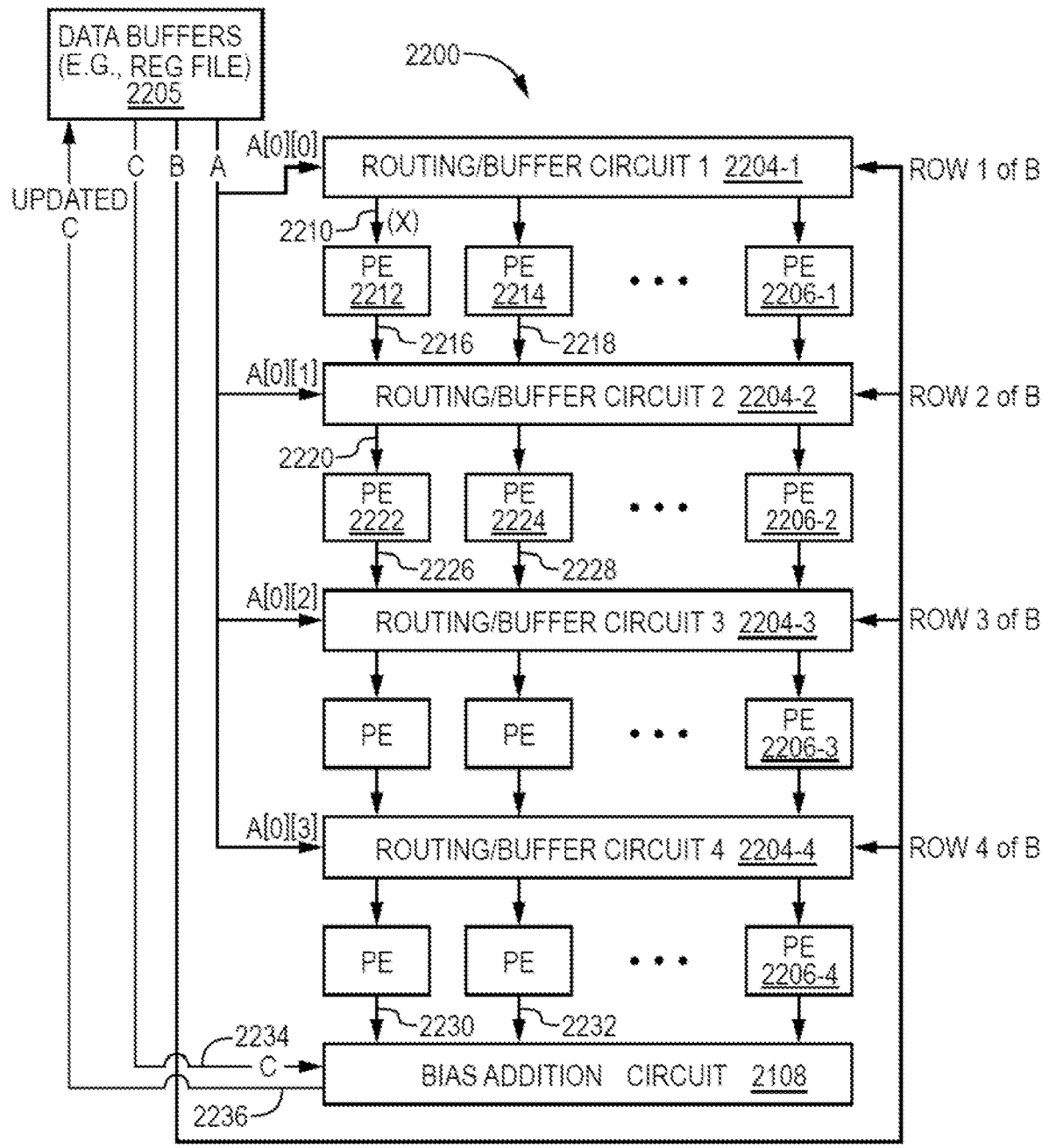
FIG. 22 illustrates a matrix operations accelerator circuit comprising a two-dimensional grid of processing element circuits according to embodiments of the disclosure.

FIG. 22 illustrates an embodiment of a matrix operations accelerator circuit 2200 comprising a two-dimensional grid of processing element circuits 2206-1 to 2206-4. In certain embodiments, data storage 2205 (e.g., register file) includes a plurality of registers, e.g., having a respective set of registers (e.g., tile) that represents a first input two-dimensional matrix (A), a second input two-dimensional matrix (B), and a third input two-dimensional matrix (C), and result storage. In one embodiment, output two-dimensional matrix resultant is stored in the registers that form third input two-dimensional matrix (C), e.g., overwriting the values for the input two-dimensional matrix (C) after they have been utilized by the matrix operations accelerator circuit 2200. Depicted matrix operations accelerator circuit 2200 includes a plurality of routing/buffer circuits 2402-1 to 2402-4 to route and store the input values (e.g., from matrix A and matrix B) to the processing elements according to the operation to be performed.

Note that the figures herein may not depict all data communication couplings (e.g., connections). One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. A single line may include multiple paths therein, e.g., multiple channels. For example, line 2210 may include multiple paths (e.g., "X", where X is any positive integer), e.g., one path for a value from matrix A and one path for a value from matrix B.

On request to perform an operation (e.g., by decoding and executing of an instruction to cause that operation), matrix operations accelerator circuit 2200 is to send values from matrix A and matrix B to a respective routing circuit in certain embodiments. For example, the operation may be to multiply matrix A by matrix B and then add a respective resultant to a corresponding value from matrix C. In one embodiment, first routing circuit 2204-1 is to receive a first value A[0] [0] from matrix A[row] [column] (the value from row index zero and column index zero) and broadcast that value to each processing element 2206-1 in that row to a first input of each of the processing elements 2206-1 and a set of values from the first row of matrix B and send those values to a respective second input of each of the processing elements 2206-1 (e.g., such that processing element 2212 receives the value from B[0] [0], processing element 2214 receives the value from B[0] [1], etc.). In one embodiment, processing element 2212 provides on its output 2216 the resultant of the multiplication of A[0] [0]*B[0] [0] and processing element 2214 provides on its output 2218 the resultant of the multiplication of A[0] [0]*B[0] [1]. Outputs (e.g., output 2216 and 2218) are sent to routing/buffer circuit 2 2204-2.

In one embodiment, second routing/buffer circuit 2204-2 is to receive a second value A[0][1] from matrix A[row] [column] (the value from row index zero and column index one) and broadcast that value to each processing element 2206-2 in that row to a first input of each of the processing elements 2206-2, a set of values from the second row of matrix B and send those values to a respective second input of each of the processing elements 2206-1 (e.g., such that processing element 2222 receives the value from B[1] [0], processing element 2224 receives the value from B[1] [1], etc.), and a respective output from the outputs of the above row of processing elements 2206-1. In one embodiment, processing element 2222 provides on its output 2226 the resultant of the multiplication of A[0] [1]*B[1] [0] added to the output 2216 (A[0] [0]*B[0] [0]), and processing element 2224 provides on its output 2228 the resultant of the multiplication of A[0] [1]*B[1] [1] added to the output 2218 (A[0] [0]*B[0] [1]). In certain embodiments, this fused multiply add operation is continued by each row of processing elements 2206-3 to 2206-4 to generate an output 2230 and an output 2232 from processing elements 2206-4. Note that four is an example number of rows of processing elements (e.g., and rows and columns of each of matrices A, B, and C), but it may be any plurality of rows. As the end of the rows of processing elements for the matrix operations accelerator circuit 2200 have been reached, bias addition circuit 2208 is to add a respective element from matrix C from input 2234 (e.g., a set of parallel input ports) (e.g., a respective element from the first row of matrix C) and store the resultant in the respective element of matrix C (e.g., in a respective element position of the first row of matrix C) via output 2236 (e.g., a set of parallel output ports). For example, the first element from the first row of matrix C being added to the resultant from output 2230 and that result stored back into the first element location of the first row of matrix C, and the second element from the first row of matrix C being added to the resultant from output 2232 and that result stored back into the second element location of the first row of matrix C. This can be repeated for each row of matrix A to generate the entire multiplication of matrix A*matrix B (e.g., and adding a bias from matrix C into the respective resultants).

Certain embodiments of circuitry thus use a two-dimensional (2D) array of processing elements (PEs) (e.g., FMA units), for example, with some input and output buffers and local control logic circuitry. In one embodiment, each PE gets some of its inputs from a data store, such as a register file, and other inputs from other PEs, and the final row of PEs sends its output back to the data store. Thus, the PEs form a pipeline in these embodiments. A user may generally intend to perform a sequence of operations on a large set of data elements (e.g., more data elements than PEs). So, the elements may be input into the top of the array to start the pipeline, and let data trickle downward, through the pipeline (providing additional inputs at various stages of the pipeline, where appropriate).

In one embodiment, each instance of a processing element is a fused multiply accumulate (FMA) circuit that includes a multiplier circuit (e.g., that takes a first input a, a second input b, and produces a resultant output) and an adder circuit (e.g., that adds resultant output from multiplier circuit as a first input with a third input c to produce a resultant). Control of the dispatch of operations and/or data into two-dimensional grid of processing element circuits (e.g., FMA circuits) may be performed by dispatch circuitry.

Figure 23:
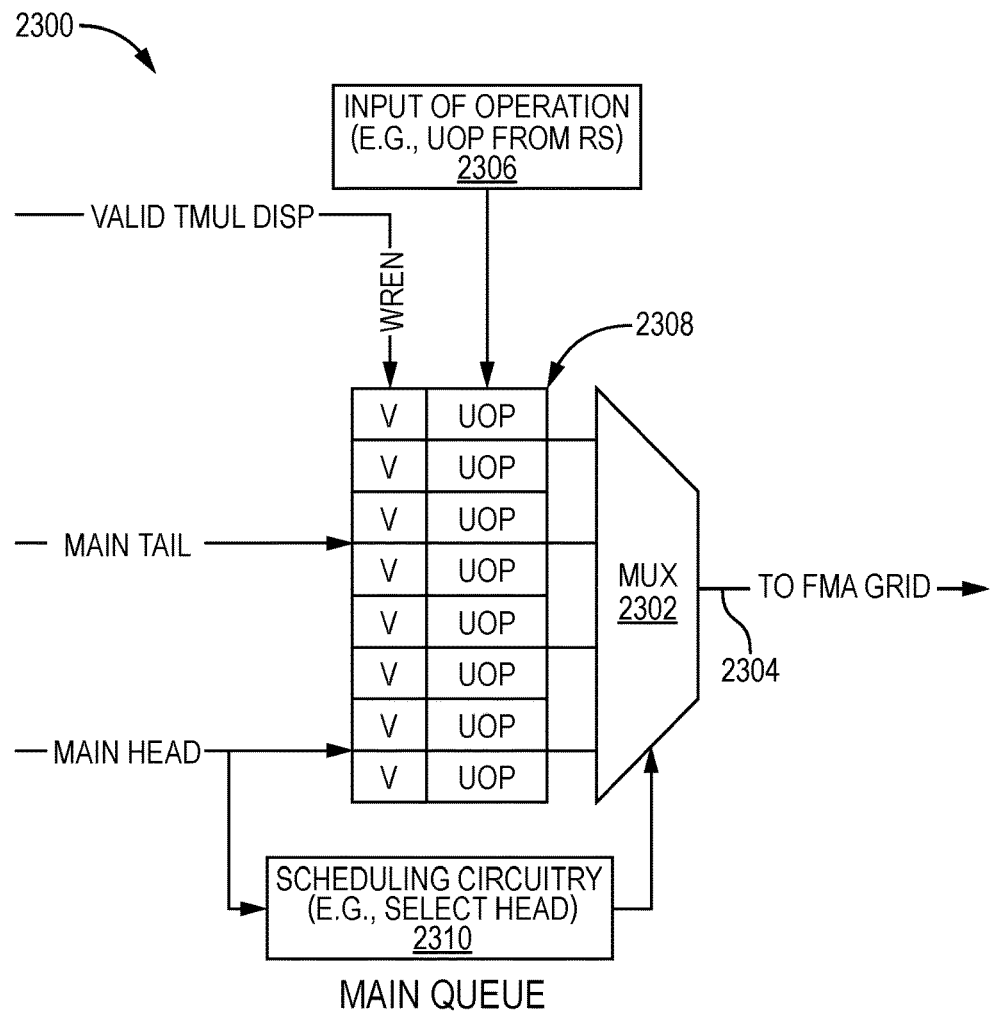
FIG. 23 illustrates dispatch circuitry of a matrix operations accelerator circuit according to embodiments of the disclosure.

FIG. 23 illustrates dispatch circuitry 2300 of a matrix operations accelerator circuit according to embodiments of the disclosure. In one embodiment, dispatch circuitry 2300 is part of dispatch circuitry 2115 in FIG. 21. In certain embodiments, dispatch circuitry 2300 is to select one of multiple pending operations (e.g., micro-operations (micro-ops)) with multiplexer 2302 and send the selected operation on output 2304 to operation circuitry (e.g., FMA grid 2109 in FIG. 21 or PE circuits in FIG. 22). In FIG. 23, the pending operations are received on input 2306 into queue 2308. Input 2306 may be from a reservation station (e.g., RS circuitry 2111 in FIG. 21).

In one embodiment, dispatch circuitry receives operation requests (e.g., one for each instruction or set of micro-operations for a single instruction) from an Out-of-(program)Order reservation station circuitry and executes the operations in order, for example, under the assumption that two consecutive operations (e.g., instructions) can be executed in the (e.g., pipeline of) matrix operations accelerator circuit one after the other with no dependency limitations, e.g., where the out-of-order circuitry takes care of the dependency of a matrix operation with A and B tiles while the dependency between successive matrix operations is handled by the dispatch queue. In one embodiment, RS circuitry is to dispatch the next operation (e.g., micro-operation (μop)) to the matrix operations accelerator circuit after the dependency is resolved. The queue 2308 as depicted includes eight slots, although it should be understood that a single or any plurality of slots may be used.

In certain embodiments, entries in queue 2308 store information for identifying the utilized input tile(s) and/or output tile(s) in data buffers (e.g., data buffers 2105 or data buffers 2205) and/or the operations to be performed by the grid (e.g., FMA grid 2109 in FIG. 21. In one embodiment, each entry in queue 2308 stores a value (or an indicator for that value) of a valid bit (v), operation (e.g., μop) opcode, tiles dimensions (e.g., M, K, N), controls (e.g., zero controls), tile ID value (e.g., a value for each of A tile, B tile, and C tile location in the data buffers). Main head may be a pointer to the beginning of the current operation (e.g., first micro-operation of a plurality of micro-operations of a single instruction) that is dispatched to the matrix operations accelerator circuit. Main tail may be a pointer to the ending of the current operation (e.g., last micro-operation of the plurality of micro-operations of that single instruction) that is dispatched to the matrix operations accelerator circuit. Valid bit (v) may be used to mark an operation (e.g., micro-operation) as complete, e.g., when the requested operation for that operation is completed by the matrix operations accelerator circuit.

In certain embodiments, scheduling circuitry 2310 is included to select an operation (e.g., a head of a plurality of micro-operations) to send to operation circuitry (e.g., FMA grid 2109 in FIG. 21 or PE circuits in FIG. 22), e.g., to begin operations for that selected operation.

Figure 24:
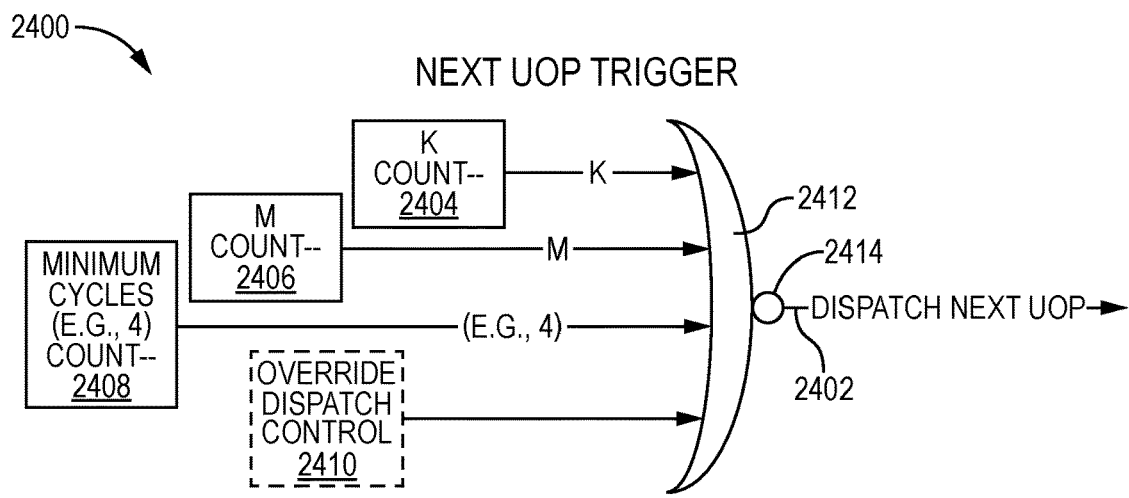
FIG. 24 illustrates scheduling circuitry of dispatch circuitry of a matrix operations accelerator circuit according to embodiments of the disclosure.

FIG. 24 illustrates scheduling circuitry 2400 of dispatch circuitry of a matrix operations accelerator circuit according to embodiments of the disclosure. As noted above, an operation (e.g., micro-operations) may be Updated $C_{M \times N} = C_{M \times N} + A_{M \times K} \times B_{K \times N}$. Scheduling circuitry may wait for a maximum of: M (e.g., the number of cycles in which the buffers (e.g., buffer 2105 in FIG. 21 or buffer 2205 in FIG. 22) of the first array (for example, first row (e.g., first row of PEs 2212, 2214, . . . 2206-1 in FIG. 22) or first column) are occupied (e.g., and a bus is used to transfer the A tile into the matrix operations accelerator circuit), K (e.g., the number of cycles the resources (e.g., bus) loading the B tile into the matrix operations accelerator circuit are occupied), and a preselected minimum (e.g., 4 cycles) gap between dispatches. In FIG. 24, output 2402 is asserted (e.g., as a value of one instead of zero) to cause dispatch of a next operation (e.g., micro-operation) to matrix operations accelerator circuit. In certain embodiments, scheduling circuitry 2400 includes a K counter 2404 to assert a value of one for K while counting down the number of cycles the resources (e.g., bus) loading the B tile into the matrix operations accelerator circuit are occupied, and then a zero when complete (e.g., predetermined value for counter K), an M counter 2406 to assert a value of one for M while counting down the number of cycles the resources (e.g., bus) loading the A tile into the matrix operations accelerator circuit are occupied, and then a zero when complete (e.g., predetermined value for counter M), and a minimum cycles (e.g., four cycles as an example, but any single or plurality of cycles may be selected) counter 2408 to count down the minimum cycles between dispatching of operations (e.g., micro-operations) on output 2402 (e.g., a dispatch being a one asserted on output 2402) to assert a value of one while counting down the minimum number of cycles, and then a zero when complete. In one embodiment, OR logic gate 2412 is to assert a one when any of its inputs are one and NOT logic gate 2414 is to invert the output of OR logic gate 2412. As one example, once each counter counts down to its triggering threshold (e.g., zero), it will cause an assertion of a zero on its respective line to OR logic gate 2412 (e.g., until a dispatch occurs for 2402), and thus NOT logic gate 2414 will output a one when all of the counters 2404, 2406, and 2408 assert a zero. After each dispatch, the counter(s) may be reset to their original (e.g., non-zero) value.

Optionally, an override dispatch control 2410 may be utilized, e.g., to assert a zero in a mode that does not override the dispatch of an operation and to assert a one in a mode that does override the dispatch of an operation (and thus cause an output of a zero from output 2402).

In one embodiment, a trigger for selecting a next operation (e.g., micro-operation) for execution by the matrix operations accelerator circuit (e.g., operation circuitry (e.g., FMA grid 2109 in FIG. 21 or PE circuits in FIG. 22)) is given by MAX{4,M, K}, where M is the number of A matrix rows and K is the number of A matrix columns (or B matrix rows) and 4 is a lower bound on the number of cycles for an (e.g., micro-operation) execution. Note that, in certain embodiments, the scheduling circuitry is to wait at least K cycles (e.g., when there is only a single bus for B tile to be loaded into the operation circuitry (e.g., FMA grid 2109 in FIG. 21 or PE circuits in FIG. 22)), (e.g., enabling a fetch of only a single B row per cycle). In certain of these embodiments, K sets the number of accumulations, which is the number of B matrix rows, and thus the B-bus will be occupied for the next K cycles, and no new micro-operation can be dispatched during this time. In certain of these embodiments, M sets the number of cycles in which the A matrix rows use the A-bus, e.g., such that the next micro-operation can be dispatched only after both M-counter as well as K-counter are zeroed out. In addition, a minimum number of (e.g., 4) cycles may be desired between consecutive dispatches, e.g., where the C-matrix should be read in cycle 1, accumulated with the multiplication result (e.g., A×B) in cycle 2, and be written back again to the data buffers in cycle 3, and one more cycle before it can be read again in cycle 4. This presumes the steps in the above are in a single cycle. In other embodiments, the steps may take more than one cycle each.

In certain embodiments, scheduling circuitry 2400 is to clear a valid bit in the corresponding queue (e.g., queue 2308 in FIG. 23) when an operation (e.g., micro-operation) is selected and/or dispatched to the operation circuitry (e.g., FMA grid 2109 in FIG. 21 or PE circuits in FIG. 22) for execution and/or update its head-pointer in the corresponding queue (e.g., queue 2308 in FIG. 23) (e.g., to make the next operation available to the selection decision).

Figure 25:
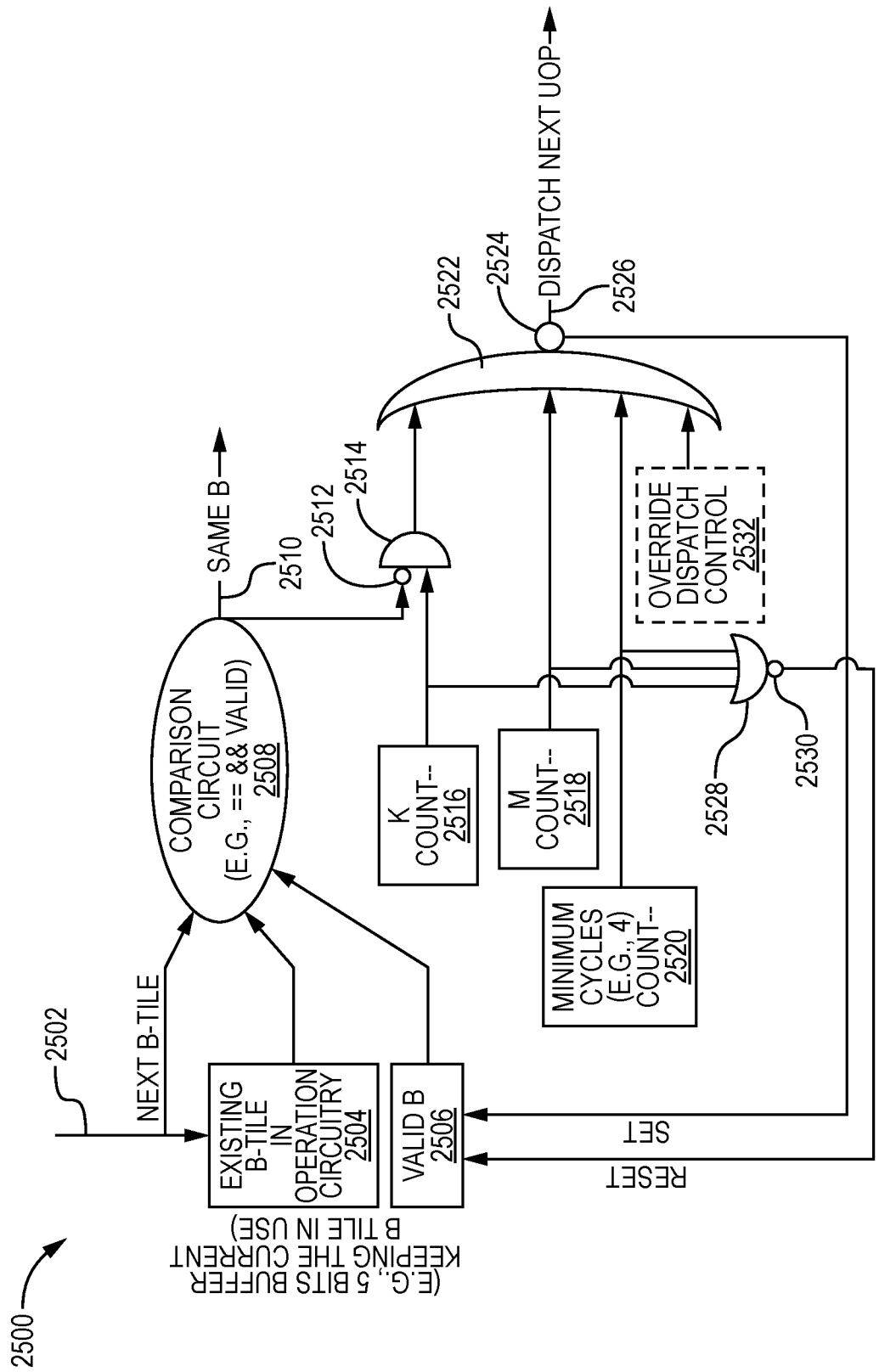
FIG. 25 illustrates scheduling circuitry, of dispatch circuitry of a matrix operations accelerator circuit, that is switchable from a baseline scheduling mode to a scheduling mode that reuses an input matrix according to embodiments of the disclosure.

FIG. 25 illustrates scheduling circuitry 2500, of dispatch circuitry of a matrix operations accelerator circuit, that is switchable from a baseline scheduling mode to a scheduling mode that reuses an input matrix according to embodiments of the disclosure. Input matrix in these embodiments refers to an input "B" matrix (e.g., tile), but this is merely illustrative and other matrices (e.g., tiles) may be scheduling similarly.

Scheduling circuitry 2500 includes an input 2502 to receive a value identifying the next operation (e.g., micro-operation) that is to be performed on matrix operations accelerator circuit, and particularly, the next operation that is selected and/or dispatched to the operation circuitry (e.g., FMA grid 2109 in FIG. 21 or PE circuits in FIG. 22) for execution. In one embodiment, input 2502 receives the output 2304 from FIG. 23.

In certain embodiments, input 2502 identifies a next operation (e.g., and the corresponding input/output tiles) to be dispatched by scheduling circuitry 2500. In certain of these embodiments, input 2502 includes an identification (ID) value that represents a tile (e.g., a set of registers forming a tile in data buffers (e.g., registers) 2105 in FIG. 21). Scheduling circuitry 2500 includes storage 2504 that identifies a current tile(s) being processed by matrix operations accelerator circuit, and particularly, it may identify the current tile(s) that have their data loaded in (or their data is being loaded into/out of) operation circuitry (e.g., FMA grid 2109 in FIG. 21 or buffer circuits in FIG. 22). In one embodiment, scheduling circuitry 2500 includes a valid tile (e.g., tile B) storage 2506 to indicate if the identification value in storage 2504 is a valid value or an invalid value (e.g., the hardware is loading another tile and thus another identification value).

Scheduling circuitry 2500 includes a comparison circuit 2508 to compare (i) the current tile (e.g., tile B) that is loaded into operation circuitry (e.g., into FMA grid 2109 in FIG. 21 or buffer circuit(s) in FIG. 22) with (ii) the next tile (e.g., next tile B) that is to be loaded into operation circuitry (e.g., FMA grid 2109 in FIG. 21 or buffer circuits in FIG. 22). In one embodiment, this comparison is done by comparing the identification value provided by the scheduling circuitry for each tile, for example, the identification value provided on the tile's entry into data buffers (e.g., data buffers 2105 in FIG. 21) of matrix operations accelerator, e.g., wherein the identification value is provided to each tile before the values for the tile are entered into operation circuitry (e.g., FMA grid 2109 in FIG. 21 or buffer circuits in FIG. 22).

In certain embodiments, comparison circuit 2508 is to compare (i) the input tile (e.g., its ID value in data buffers 2105 in FIG. 21) (e.g., "new tile B") from input 2502 for a next operation to (ii) the current tile (e.g., tile B) that is currently loaded into operation circuitry (e.g., currently loaded in FMA grid 2109 in FIG. 21 or buffer circuit(s) in FIG. 22), for example, the ID value for data buffers 2105 in FIG. 21 for a tile that is currently loaded into FMA grid 2109 in FIG. 21. In one embodiment, comparison circuit 2508 is to compare the ID value of current tile in use to the ID value of the next tile to be used in operation circuitry and if equal, assert a value (e.g., one) that they are equal. In one embodiment, comparison circuit 2508 is to compare the ID value of current tile in use from storage 2504 to the ID value of the next tile to be used in operation circuitry, and if equal, assert a value (e.g., one) that they are equal when storage 2506 also indicates the identification value in storage 2504 is a valid value, e.g., and assert a different value (e.g., zero) otherwise.

In certain embodiments, when (i) the current tile (e.g., tile B) that is loaded into operation circuitry (e.g., into FMA grid 2109 in FIG. 21 or buffer circuit(s) in FIG. 22) is equal to (ii) the next tile (e.g., next tile B) that is to be loaded into operation circuitry (e.g., FMA grid 2109 in FIG. 21 or buffer circuits in FIG. 22), the same tile (e.g., same tile B) value is asserted (e.g., a one) to cause (e.g., via output 2510) switching to a scheduling mode that reuses the input matrix, for example, reuse of tile B already stored within operation circuitry (e.g., into FMA grid 2109 in FIG. 21 or buffer circuit(s) in FIG. 22), e.g., without reloading it from data buffers (e.g., data buffers 2105 in FIG. 21) separate from the operation circuitry.

In certain embodiments, comparison circuit 2508 is to output a first value (e.g., one) on output 2510 when (i) the current tile (e.g., tile B) that is loaded into operation circuitry (e.g., into FMA grid 2109 in FIG. 21 or buffer circuit(s) in FIG. 22) is equal to (ii) the next tile (e.g., next tile B) that is to be loaded into operation circuitry. Output 2510 may then be input into NOT logic gate 2512 and that output and the output from K counter 2516 to AND logic gate 2514 (e.g., having an output of one only when all of the inputs are a one) and into OR logic gate 2522.

In certain embodiments, scheduling circuitry 2500 includes a K counter 2516 to assert a value of one for K while counting down the number of cycles the resources (e.g., bus) loading the B tile into the matrix operations accelerator circuit are occupied, and then a zero when complete (e.g., predetermined value for counter K), an M counter 2518 to assert a value of one for M while counting down the number of cycles the resources (e.g., bus) loading the A tile into the matrix operations accelerator circuit are occupied, and then a zero when complete (e.g., predetermined value for counter M), and a minimum cycles (e.g., four cycles as an example, but any single or plurality of cycles may be selected) counter 2520 to count down the minimum cycles between dispatching of operations (e.g., micro-operations) on output 2526 (e.g., a dispatch being a one asserted on output 2526) to assert a value of one while counting down the minimum number of cycles, and then a zero when complete. In one embodiment, OR logic gate 2522 is to assert a one when any of its inputs are one and NOT logic gate 2524 is to invert the output of OR logic gate 2522. As one example, once each counter counts down to its triggering threshold (e.g., zero) and (thus AND logic gate 2514 outputs a zero when K counter 2516 asserts a zero), it will cause an assertion of a zero on its respective line to OR logic gate 2522 (e.g., until a dispatch occurs for 2526), and thus NOT logic gate 2514 will output a one (i) when all of the counters 2516, 2518, and 2520 assert a zero or (ii) if the output 2510 is a one for a match along with counters 2518 and 2520 asserting a zero. After each dispatch, the counter(s) may be reset to their original (e.g., non-zero) value (e.g., as set by the dimensions of A and B tiles). In one embodiment, when K counter 2516, M counter 2518, and minimum cycles counter 2520 assert a zero on their respective lines to OR logic gate 2528, it outputs a zero to NOT logic gate 2530, which then outputs a one (instead of a zero otherwise) as a reset to cause the valid tile (e.g., tile B) storage 2506 to indicate the identification value in storage 2504 is an invalid value (e.g., the hardware is loading another tile into operation circuitry).

Optionally, an override dispatch control 2532 may be utilized, e.g., to assert a zero in a mode that does not override the dispatch of an operation and to assert a one in a mode that does override the dispatch of an operation (and thus cause an output of a zero from output 2526).

As noted above, scheduling circuit may select between (i) a first (e.g., throughput efficient) scheduling mode that reuses the input matrix, for example, reuse of a tile already stored within operation circuitry (e.g., into FMA grid 2109 in FIG. 21 or buffer circuit(s) in FIG. 22), e.g., without reloading it from data buffers (e.g., data buffers 2105 in FIG. 21) separate from the operation circuitry. and (ii) a second scheduling mode that does not reuse a tile already stored within operation circuitry.

In one embodiment, a trigger for selecting a next operation (e.g., micro-operation) for execution by the matrix operations accelerator circuit (e.g., operation circuitry (e.g., FMA grid 2109 in FIG. 21 or PE circuits in FIG. 22)) in (i) the first (e.g., throughput efficient) scheduling mode is given by MAX{4,M } and (ii) in the second scheduling mode is given by MAX{4,M, K}, where M is the number of A matrix rows and K is the number of A matrix columns and 4 is a lower bound on the number of cycles for an (e.g., micro-operation) execution. Note that, in certain embodiments, the scheduling circuitry is to wait at least K cycles (e.g., when there is only a single bus for B tile to be loaded into the operation circuitry (e.g., FMA grid 2109 in FIG. 21 or PE circuits in FIG. 22)), (e.g., enabling a fetch of only a single B row per cycle). In certain of these embodiments, K sets the number of accumulations, which is the number of B matrix rows, and thus the B-bus will be occupied for the next K cycles, and no new micro-operation can be dispatched during this time. In certain of these embodiments, M sets the number of cycles in which the A matrix rows use the A-bus, e.g., such that the next micro-operation can be dispatched only after both M-counter as well as K-counter are zeroed out. In addition, a minimum number of (e.g., 4) cycles may be desired between consecutive dispatches, e.g., where the C-matrix should be read in cycle 1, accumulated with the multiplication result (e.g., A×B) in cycle 2, and be written back again to the data buffers in cycle 3, and one more cycle before it can be read again in cycle 4. This presumes the steps in the above are in a single cycle. In other embodiments, steps may take more than one cycle each s. In certain embodiments, tile B is the B matrix in $A_{M \times K} \times B_{K \times N}$. For example, scheduling according to if($TMUL_{next} \cdot B = TMUL_{TMM} \cdot B$) then wait maximum of (M or Minimum cycles), else wait maximum of (M, K, or Minimum cycles).

In certain embodiments, in the performing of a matrix operation on M,K,N, transfer of the B matrix is for K (e.g., up to 16) cycles (e.g., the B-transfer period), and during the B-transfer period, next operation (e.g., $TMUL_{next}(M,K,N)$) that uses same B matrix can start execution when it's A-buffer is free. For example, when the B-transfer period of M,K,N ends, operation returns to normal and the B matrix will be read and transferred from data buffers (e.g., data buffers 2105 in FIG. 21) (e.g., tile matrix buffer (TMB)) to the operation circuitry (e.g., into FMA grid 2109 in FIG. 21 or buffer circuit(s) in FIG. 22) (e.g., tile matrix multiplier (TMM)). In one embodiment, where the usage is continuous, circuitry (e.g., scheduling circuitry) (e.g., with operations from an OOO RS circuit) will prevent the reclamation and re-assignment of the buffer (e.g., B-buffer), e.g., and no caching is needed. Thus, a computer utilizing the first (e.g., throughput efficient) scheduling mode is improved by not only having the ability to dispatch an operation earlier, but, when a read (e.g., via a B-bus) of the data from the data buffers (e.g., data buffers 2105 in FIG. 21) is eliminated, reducing power consumption.

In certain embodiments, when data from data buffers (e.g., data buffers 2105 in FIG. 21) is stored into operation circuitry (e.g., into FMA grid 2109 in FIG. 21 or buffer circuit(s) in FIG. 22), the data buffers may be reclaimed, e.g., deallocated from use and then re-allocated to store a matrix (e.g., new tile B) for a different operation (e.g., different instruction). In certain embodiments, when in a first (e.g., throughput efficient) scheduling mode that reuses the input matrix, for example, reuse of a tile already stored within operation circuitry (e.g., into FMA grid 2109 in FIG. 21 or buffer circuit(s) in FIG. 22), reclamation of the In one embodiment, when in a first (e.g., throughput efficient) scheduling mode that reuses the input matrix, scheduling circuitry is to prevent reclamation of the buffer (e.g., buffer for matrix B in operations circuitry) between execution of the previous operation (e.g., single instruction) and the next operation (e.g., single instruction) and/or when in a second scheduling mode that does not reuse the input matrix, scheduling circuitry is to allow reclamation of the buffer (e.g., buffer for matrix B in operations circuitry) between execution of the previous operation (e.g., single instruction) and the next operation (e.g., single instruction). In one embodiment, when in the second scheduling mode that does not reuse the input matrix, scheduling circuitry begins reclamation of the buffer (e.g., buffer for matrix B in operations circuitry) between execution of the previous operation (e.g., instruction) and the next operation (e.g., instruction). Matrix operations accelerator circuit (e.g., controller circuitry) may assign an identification value for each plurality of registers that represents an input two-dimensional matrix, and the check if the second buffer of the two-dimensional grid of fused multiply accumulate circuits stores the immediately prior input two-dimension matrix that is the same as the second input two-dimensional matrix may be comparing respective identification values for corresponding input two-dimensional matrices from the previous operation (e.g., instruction) and the next operation (e.g., instruction). Matrix operations accelerator circuit (e.g., controller circuitry) may assign a same ID value for a matrix that has the same value. Matrix operations accelerator circuit (e.g., controller circuitry) may assign different ID values for matrices that have different values. For example, a first operation (e.g., instruction) may have a first value assigned to an input two-dimensional matrix, a second operation (e.g., instruction) may have a same value assigned when it is the same input two-dimensional matrix and different value assigned when it is a different input two-dimensional matrix that in the first operation.

In certain embodiments, scheduling circuitry 2500 is to clear a valid bit in the corresponding queue (e.g., queue 2308 in FIG. 23) when an operation (e.g., micro-operation) is selected and/or dispatched to the operation circuitry (e.g., FMA grid 2109 in FIG. 21 or PE circuits in FIG. 22) for execution and/or update its head-pointer in the corresponding queue (e.g., queue 2308 in FIG. 23) (e.g., to make the next operation available to the selection decision). In one embodiment, the re-usage of the B-buffer data is only allowed if the operation that loads the B values into the B-buffer is still running when the "possible reuse", second operation arrives and then that second operation is checked for continuity with the first operation such that the second operation will use the reclaimed value only when continuity with the first operation is found, e.g., if the first operation using to-be-reused B values is not complete, its B buffer cannot be reclaimed and therefore can be used by second operation (e.g., as long as there is continuity).

In certain embodiments, first (e.g., throughput efficient) scheduling mode that reuses the input matrix is used to accelerate the performance of a (e.g., floating-point) FP matrix operations accelerator circuit. It should be understood that scheduling disclosed herein is not restricted to matrix operations accelerator circuit design but can be extended to other varied latency micro-architecture with inherit limitations. Moreover, it can be extended to a case where a FMA circuit assumes 1 cycle latency.

In certain embodiments, a matrix may have a dimension that is larger than the available hardware (for example, operation circuitry (e.g., FMA grid 2109 in FIG. 21 or PE circuits in FIG. 22)). Certain embodiments herein utilize a plurality of (e.g., three) counters for scheduling (e.g., dispatching the operations (e.g., micro-operations)), namely $K_{even}$, $K_{odd}$ and $M_c$ handling the unit limitations and a mechanism for checking the reuse of $B_{K \times N}$ matrix. Furthermore, certain embodiments herein implement a secondary queue for handling operations (e.g., micro-ops) in case a dimension (e.g., K) is greater than the available hardware (e.g., K>8), for example, where these operations (e.g., micro-ops) are dispatched with high priority for a second round in the operation circuitry (e.g., FMA grid 2109 in FIG. 21 or PE circuits in FIG. 22).

In one embodiment, scheduling circuit keep a first row $B_0 \in B_{K \times N}$ during M cycles and broadcast each of the M elements of the first column of matrix $A_{M \times K}$ in a different cycle. After a cycle or number of cycles (e.g., 2 cycles), the next FMA array (e.g., row or column) of an FMA grid is occupied during M cycles calculating the second partial FMA operation in certain embodiments. This sequential pipelined mode is executed till K partial FMA operations is calculated through K FMA arrays in certain embodiments.

In one embodiment, FMA grid utilization is restricted by three major limitations, namely (1) number of rows in destination, (2) B-bus bandwidth (e.g., 512 bits per cycle), and (3) the number of FMA arrays (e.g., rows or columns). As one example for (1) in case of M<a given value (e.g., 16), it is possible to send the next operation (e.g., micro-operation) to execution after M cycles, since the first FMAO array is available and free after M cycles. For instance, in case of M=12, the first FMAO is used during the first 12 cycles. However, the first result of the destination WB is computed by 16 cycles. This means that next operation (e.g., micro-operation) can be dispatched before the first operation (e.g., micro-operation) has been completed in this example. As one example for (2), the FMA grid is restricted to receive a single BKXN matrix row in a cycle. In one embodiment, the adders of the FMA circuits have a given number of (e.g., two) cycles latency, which means that it is required to send up to a threshold value (e.g., 512 bits) of B-bus once every two cycles. Thus, certain embodiments execute two operation (e.g., micro-operation) simultaneously and keep the B-bus busy every cycle. Furthermore, certain embodiments keep the BKXN matrix row in a buffer for reusing through consecutive instructions. As one example for (3), the FMA grid architecture supports up to a given number (e.g., 16) partial product addition (e.g., K≤16) while FMA grid contains fewer than the given number (e.g., 8) FMA arrays (e.g., rows or columns). In case K≤8, the result is ready after 16 cycles, while in case K>8 an alternative solution is necessary.

Figure 26:
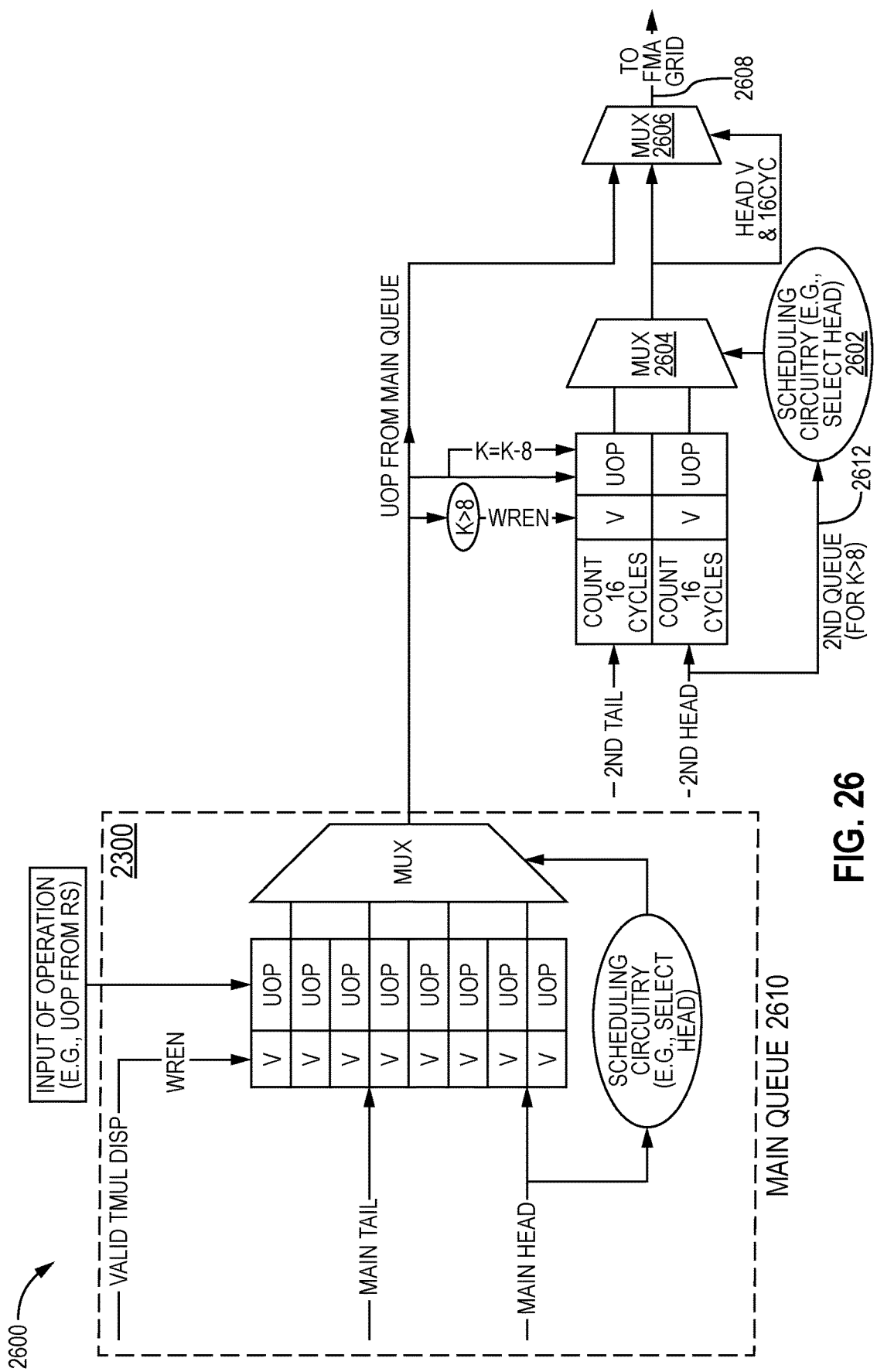
FIG. 26 illustrates dispatch circuitry of a matrix operations accelerator circuit for multiple passes according to embodiments of the disclosure.

FIG. 26 illustrates dispatch circuitry 2600 of a matrix operations accelerator circuit for multiple passes according to embodiments of the disclosure. Dispatch circuitry 2600 including two queues, namely the main-queue 2610 and the second-pass-queue 2612. In one embodiment, the main-queue 2610 maintains the significant information for executing the operation in operation circuitry (e.g., FMA grid 2109 in FIG. 21 or PE circuits in FIG. 22).

In one embodiment, the second-pass-queue 2612 keeps operation (e.g., micro-operations) that are eligible for a second pass in the operation circuitry (e.g., FMA grid 2109 in FIG. 21 or PE circuits in FIG. 22), (e.g., whose K>8) handling (3) above. In one embodiment, every operation (e.g., micro-operation) inserted into the second-pass-queue 2612 is suspended for 16 cycles before it is dispatched again for second pass. In embodiments where operation circuitry (e.g., FMA grid 2109 in FIG. 21 or PE circuits in FIG. 22) is limited to a narrower number of (e.g., 8) FMA circuits, as second pass is required. The second pass can be restarted at least 16 cycles afterword (e.g., 16 cycles=8 FMA units*2 cycles ADD latency). Note that this split is possible due to the following, which also depicts the terms calculated in the first and second paths:

$$\hat{C}_{M \times N} = C_{M \times N} + A_{M \times K} \times B_{K \times N} = \underbrace{C_{M \times N} + A_{M \times 8} \times B_{8 \times N}}_{\text{first path}} + \overbrace{A_{M \times K-8} \times B_{K-8 \times N}}^{\text{second path}}$$

In one embodiment, upon dispatching an operation (e.g., micro-operation) from the main-queue 2610 (e.g., as instance of dispatch circuitry 2300), its number of accumulation is observed (e.g., checking if K>8). In certain embodiments, if (K<=threshold (e.g., 8)) the operation (e.g., micro-operation) is directly sent to the operation circuitry (e.g., FMA grid 2109 in FIG. 21 or PE circuits in FIG. 22), e.g., without copying it into the second-pass-queue 2612 and/or if (K>threshold (e.g., 8)) the operation (e.g., micro-operation) keep sending it to operation circuitry (e.g., FMA grid 2109 in FIG. 21 or PE circuits in FIG. 22), e.g., while it is also copied into the second-pass-queue 2612. In one embodiment, in the second-pass-queue 2612, K is updated to be the remainder of accumulations to be executed (e.g., K−8). In one embodiment, every operation (e.g., micro-operation) that is inserted to the second-pass-queue 2612 triggers a (e.g.,16) cycles counter. In one embodiment, once the counter completes its count (e.g., 16 cycles), its corresponding operation (e.g., micro-operation) is eligible to be sent to the operation circuitry (e.g., FMA grid 2109 in FIG. 21 or PE circuits in FIG. 22) for the second execution part. In one embodiment, since the operations (e.g., micro-operations) in the second-pass-queue 2612 are older, they are provided a priority for dispatching in case they are ready. The below can be used for queue selection: Select_queue= (Valid second-pass-uop) AND (16-cycles) ? second-PASS-QUEUE : MAIN-QUEUE. In one embodiment, scheduling circuitry 2602 of dispatch circuitry 2600 utilizes multiplexer 2604 to select an entry from second-pass-queue 2612. For example, with multiplexer 2606 selecting from either main queue 2610 or second queue 2612 to provide an operation to be sent via output 2608 to FMA grid.

Figure 27:
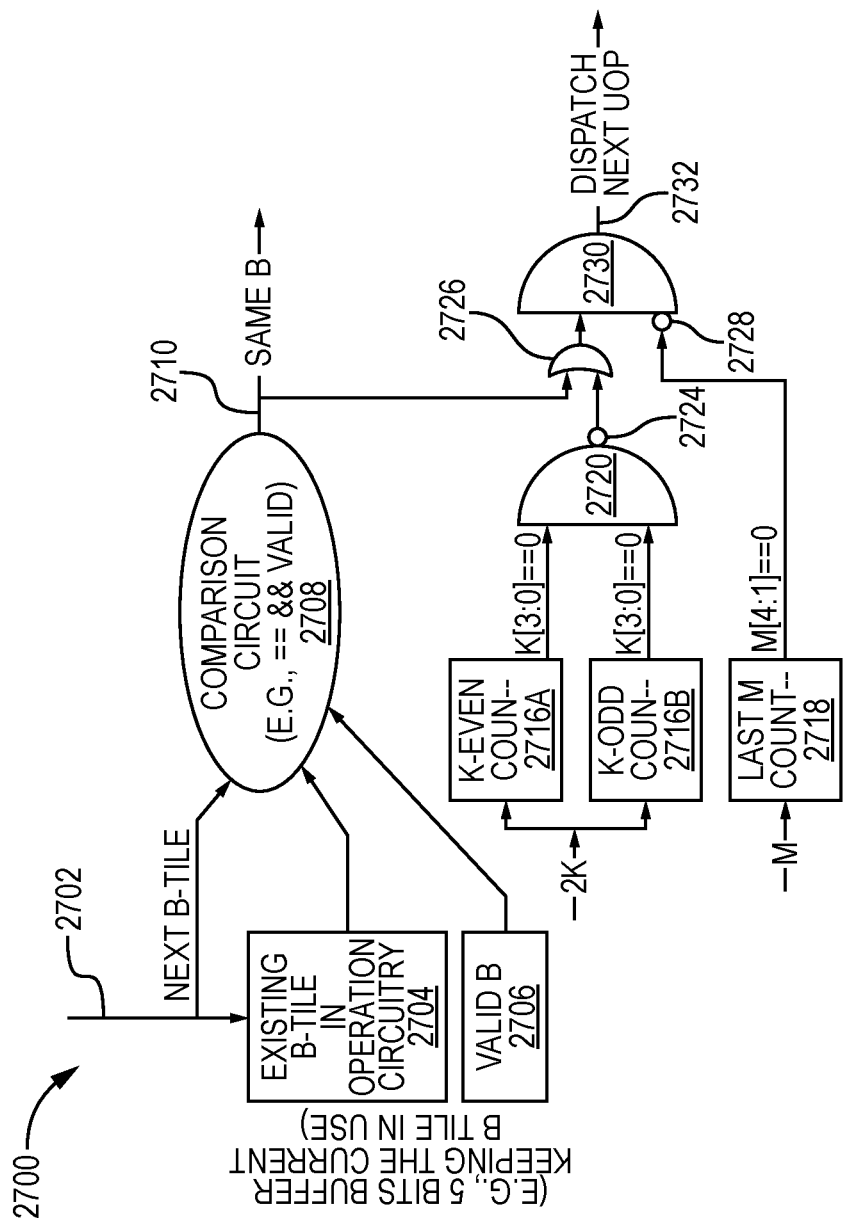
FIG. 27 illustrates scheduling circuitry of dispatch circuitry of a matrix operations accelerator circuit for multiple passes according to embodiments of the disclosure.

FIG. 27 illustrates scheduling circuitry 2700 of dispatch circuitry of a matrix operations accelerator circuit for multiple passes according to embodiments of the disclosure. Input matrix in these embodiments refers to an input "B" matrix (e.g., tile), but this is merely illustrative and other matrices (e.g., tiles) may be scheduling similarly.

Scheduling circuitry 2700 includes an input 2702 to receive a value identifying the next operation (e.g., micro-operation) that is to be performed on matrix operations accelerator circuit, and particularly, the next operation that is selected and/or dispatched to the operation circuitry (e.g., FMA grid 2109 in FIG. 21 or PE circuits in FIG. 22) for execution. In one embodiment, input 2702 receives the output 2304 from FIG. 23.

In certain embodiments, input 2702 identifies a next operation (e.g., and the corresponding input/output tiles) to be dispatched by scheduling circuitry 2700. In certain of these embodiments, input 2702 includes an identification (ID) value that represents a tile (e.g., a set of registers forming a tile in data buffers (e.g., registers) 2105 in FIG. 21). Scheduling circuitry 2700 includes storage 2704 that identifies a current tile(s) being processed by matrix operations accelerator circuit, and particularly, it may identify the current tile(s) that have their data loaded in (or their data is being loaded into/out of) operation circuitry (e.g., FMA grid 2109 in FIG. 21 or buffer circuits in FIG. 22). In one embodiment, scheduling circuitry 2700 includes a valid tile (e.g., tile B) storage 2706 to indicate if the identification value in storage 2704 is a valid value or an invalid value (e.g., the hardware is loading another tile and thus another identification value).

Scheduling circuitry 2700 includes a comparison circuit 2708 to compare (i) the current tile (e.g., tile B) that is loaded into operation circuitry (e.g., into FMA grid 2109 in FIG. 21 or buffer circuit(s) in FIG. 22) with (ii) the next tile (e.g., next tile B) that is to be loaded into operation circuitry (e.g., FMA grid 2109 in FIG. 21 or buffer circuits in FIG. 22). In one embodiment, this comparison is done by comparing the identification value provided by the scheduling circuitry for each tile, for example, the identification value provided on the tile's entry into data buffers (e.g., data buffers 2105 in FIG. 21) of matrix operations accelerator, e.g., wherein the identification value is provided to each tile before the values for the tile are entered into operation circuitry (e.g., FMA grid 2109 in FIG. 21 or buffer circuits in FIG. 22).

In certain embodiments, comparison circuit 2708 is to compare (i) the input tile (e.g., its ID value in data buffers 2105 in FIG. 21) (e.g., "new tile B") from input 2702 for a next operation to (ii) the current tile (e.g., tile B) that is currently loaded into operation circuitry (e.g., currently loaded in FMA grid 2109 in FIG. 21 or buffer circuit(s) in FIG. 22), for example, the ID value for data buffers 2105 in FIG. 21 for a tile that is currently loaded into FMA grid 2109 in FIG. 21. In one embodiment, comparison circuit 2708 is to compare the ID value of current tile in use to the ID value of the next tile to be used in operation circuitry and if equal, assert a value (e.g., one) that they are equal. In one embodiment, comparison circuit 2708 is to compare the ID value of current tile in use from storage 2704 to the ID value of the next tile to be used in operation circuitry, and if equal, assert a value (e.g., one) that they are equal when storage 2706 also indicates the identification value in storage 2704 is a valid value, e.g., and assert a different value (e.g., zero) otherwise.

In certain embodiments, when (i) the current tile (e.g., tile B) that is loaded into operation circuitry (e.g., into FMA grid 2109 in FIG. 21 or buffer circuit(s) in FIG. 22) is equal to (ii) the next tile (e.g., next tile B) that is to be loaded into operation circuitry (e.g., FMA grid 2109 in FIG. 21 or buffer circuits in FIG. 22), the same tile (e.g., same tile B) value is asserted (e.g., a one) to cause (e.g., via output 2710) switching to a scheduling mode that reuses the input matrix, for example, reuse of tile B already stored within operation circuitry (e.g., into FMA grid 2109 in FIG. 21 or buffer circuit(s) in FIG. 22), e.g., without reloading it from data buffers (e.g., data buffers 2105 in FIG. 21) separate from the operation circuitry.

In certain embodiments, comparison circuit 2708 is to output a first value (e.g., one) on output 2710 when (i) the current tile (e.g., tile B) that is loaded into operation circuitry (e.g., into FMA grid 2109 in FIG. 21 or buffer circuit(s) in FIG. 22) is equal to (ii) the next tile (e.g., next tile B) that is to be loaded into operation circuitry. Output 2710 may then be input into OR logic gate 2726 along with the input from NOT logic gate 2724. Output from OR logic gate 2726 is sent to first input of AND logic gate 2730. Other input of AND logic gate 2730 is coupled to NOT logic gate 2728, which is coupled to M counter 2718. Output 2732 of AND logic gate 2730 is to cause a dispatch of a next operation (e.g., micro-operation) when one in certain embodiments. In comparison to FIG. 25, FIG. 27 includes a counter 2716A for even K and a counter 2716B for odd K, and with both counters coupled to a respective input of AND logic gate 2720. In one embodiment, K even counter 2716A asserts a value of one for even Ks while counting down the number of cycles the resources (e.g., bus) loading the B tile into the matrix operations accelerator circuit are occupied, and then a zero when complete (e.g., predetermined value for counter K even), K odd counter 2716B asserts a value of one for odd Ks while counting down the number of cycles the resources (e.g., bus) loading the B tile into the matrix operations accelerator circuit are occupied, and then a zero when complete (e.g., predetermined value for counter K odd), and M counter 2718 to assert a value of one for M while counting down the number of cycles the resources (e.g., bus) loading the A tile into the matrix operations accelerator circuit are occupied, and then a zero when complete (e.g., predetermined value for counter M). After each dispatch, the counter(s) may be reset to their original (e.g., non-zero) value.

In one embodiment, FIG. 27 specifies the trigger of the next operation to be sent to the operation circuitry (e.g., FMA grid 2109 in FIG. 21 or buffer circuits in FIG. 22) as follows: even cycles are tracked by K-even counter 2716A, and the odd cycles are tracked by K-odd counter 2716B, any operation (e.g., micro-operation) that is dispatched updates its corresponding K-even or K-odd counters, and any operation (e.g., micro-operation) that is dispatched, also updates M counter, e.g., and BKXN matrix re-use is checked.

In one embodiment, if (((K-even==0) OR (K-odd==0) OR (SAME-B==1)) AND (M<=1)) THEN dispatch next operation (e.g., micro-operation).

In one embodiment, the dispatch state represents the case in which one of the B-bus cycle (e.g., either Even cycle, or Odd cycle) are available (e.g., its corresponding counter is zero) and the first FMA0 is available (e.g., the M counter is zero or one), and will send the next operation (e.g., micro-operation) in either the main-queue 2610 or in the 2nd-pass-queue 2612 into the operation circuitry (e.g., into FMA grid 2109 in FIG. 21 or buffer circuit(s) in FIG. 22) for execution.

In certain embodiments, in case the trigger happens when M-counter==0, the A and B should be sent to TMM on the same cycle and/or in case M-counter==1, the B-bus should be sent to TMM one cycle prior the A-bus. Note that certain embodiments assume multiple (e.g., 2) cycle latency for an FMA circuit (e.g., PE) execution, scheduling for the case where the FMA circuit (e.g., PE) has a single cycle latency is possible, e.g., including tile reuse.

The following are examples for specifying the scheduling. In one embodiment, a tile (e.g., tile B) reuse mechanism is utilized along with the following.

Example 1.1 Given are three numbers a , b and c. We define a Fused Multiplication Addition (FMA) operation as the addition of c with the product of a and b, i.e., ĉ=c+a·b.

Example 1.2 Given are three matrices $A_{M \times K}$, $B_{K \times N}$ and $C_{M \times N}$. We define a Matrix Multiplication MM (M, K, N) as an operation which results in a new matrix $\hat{C}_{M \times N}$, where each element $\hat{c}_{i,j} = c_{i,j} + \Sigma_{l=0}^{K-1} a_{il} \cdot b_{lj}$.

Certain embodiments herein impose an architecture restriction in which M,N,K≤threshold value (e.g.,16).

Example 1.3 The Matrix Queue MQ is an ordered set of matrix multiplication operations, i.e. MQ={M $M_1$, M $M_2$, . . . }. This set represents the matrix multiplication operations is ready state at the RS.

Example 1.4 The Big Matrix Queue BMQ is an ordered set of matrix multiplication operations, i.e. BMQ={M $M_1$, M $M_2$, . . . }. This queue is utilized for the matrix multiplication operations of K>8 which needs an extra round in the Matrix Multiplication unit according to limitation 3. Each element in this queue has an internal counter and is ready 16 cycles after its insertion. This structure implements two additional methods update and ready for updating and checking whether the top of the queue MM is ready.

In one embodiment, each of the matrix multiplication (MM) operation parameters M,K,N and operands A,B,C are defined as a MM element property, e.g. MM.K. Given a Matrix Multiplication MM and its operands A,B,C, the scheduler may synchronize the initial cycle operations of these operands though the functions Dispatch_A, Dispatch_B, Dispatch_C, which receive the initial cycle as an input parameter. Then, defined the starting cycle for operation, scheduler may cause continuation of execution of the rest of MM operations in according to the operational mode.

Specifically, in a first (e.g., FMA_0) array, broadcast at each consequently cycle the elements a_(i,0) where i=0 . . . M starting from the input cycle of Dispatch_A, then at cycle+2 in a second (e.g., FMA_1) array, continue to broadcast the elements a_(i,1) where i=0 . . . M and so on. In one embodiment, the MM.C operand is inserted to FMA_0 array two cycles after the insertion of A through Dispatch_C, since this is the time for finishing the FMA multiplication operation. In one embodiment, Dispatch_B inserts the whole B_i row every two cycles to FMA_i where i=0 . . . K, respectively. Note that according to some embodiments, the load of a single matrix row per cycle is a system restriction. Indeed, based on this restriction, a scheduler may divide the timeline into even and odd cycles inserting the MM operations into these classified cycles. Then, rack when one of these cycles are free for insertion through the counters M,K_even, K_odd which are updated every cycle. In case MM.K>8, split the MM(M,K,N) operation into two operations, namely MM(M,8,N) and MM(M,K−,N) in certain embodiments. In one embodiment, the MM(M,8,N) operation includes the first 8 FMA operations of MM(M,K,N) and is straightly sent to execution when inserted, where the MM(M,K−8,N) is enqueued (e.g., at main queue 2610 in FIG. 26) and waits at least a threshold number (e.g., 16) cycles for operation (till MM(M,8,N) finishes to calculate its first line result), then this MM(M,8,N) result is inserted as C input of matrix MM(M,K−8,N) when executed.

FIG. 28 illustrates pseudocode 2800 for matrix operations circuitry according to embodiments of the disclosure.

Figure 29:
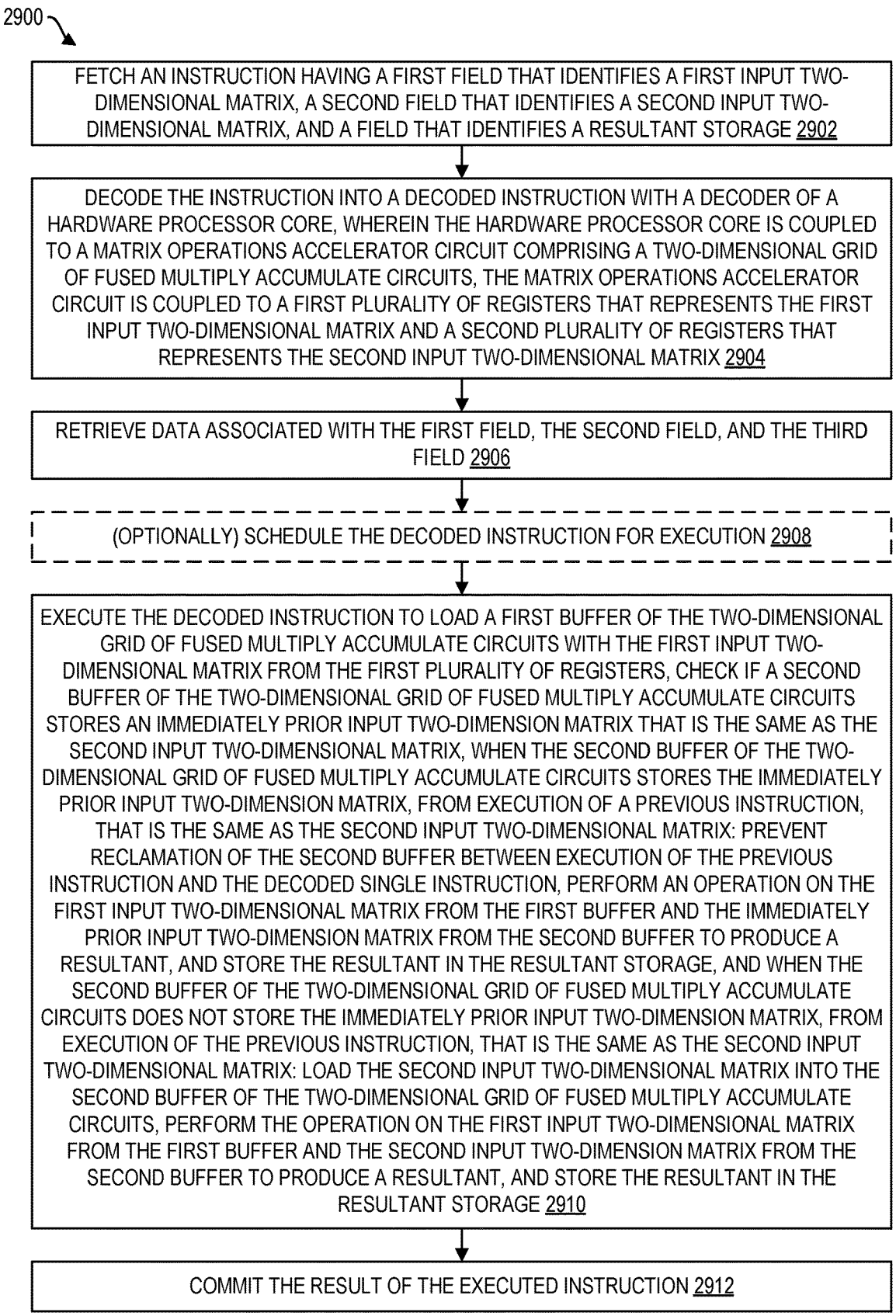
FIG. 29 illustrates a method of processing a matrix operation instruction according to embodiments of the disclosure.

FIG. 29 illustrates a method 2900 of processing a matrix operation instruction according to embodiments of the disclosure. A processor (e.g., or processor core) may perform method 2900, e.g., in response to receiving a request to execute an instruction from software. Processor (e.g., or processor core) may offload certain operation to a matrix operations accelerator circuit. Depicted method 2900 includes processing matrix operation (e.g., FMA) instruction by: fetch an instruction having a first field that identifies a first input two-dimensional matrix, a second field that identifies a second input two-dimensional matrix, and a field that identifies a resultant storage 2902, decode the instruction into a decoded instruction with a decoder of a hardware processor core, wherein the hardware processor core is coupled to a matrix operations accelerator circuit comprising a two-dimensional grid of fused multiply accumulate circuits, the matrix operations accelerator circuit is coupled to a first plurality of registers that represents the first input two-dimensional matrix and a second plurality of registers that represents the second input two-dimensional matrix 2904, retrieve data associated with the first field (e.g., tile A), the second field (e.g., tile B) (and, optionally, a third field (e.g., tile C)) 2906, (optionally) schedule the decoded instruction for execution 2908, execute the decoded instruction to load a first buffer of the two-dimensional grid of fused multiply accumulate circuits with the first input two-dimensional matrix from the first plurality of registers, check if a second buffer of the two-dimensional grid of fused multiply accumulate circuits stores an immediately prior input two-dimension matrix that is the same as the second input two-dimensional matrix, when the second buffer of the two-dimensional grid of fused multiply accumulate circuits stores the immediately prior input two-dimension matrix, from execution of a previous instruction, that is the same as the second input two-dimensional matrix: prevent reclamation of the second buffer between execution of the previous instruction and the decoded single instruction, perform an operation on the first input two-dimensional matrix from the first buffer and the immediately prior input two-dimension matrix from the second buffer to produce a resultant, and store the resultant in the resultant storage, and when the second buffer of the two-dimensional grid of fused multiply accumulate circuits does not store the immediately prior input two-dimension matrix, from execution of the previous instruction, that is the same as the second input two-dimensional matrix: load the second input two-dimensional matrix into the second buffer of the two-dimensional grid of fused multiply accumulate circuits, perform the operation on the first input two-dimensional matrix from the first buffer and the second input two-dimension matrix from the second buffer to produce a resultant, and store the resultant in the resultant storage 2910, and commit the result of the executed instruction 2912.

Exemplary architectures, systems, etc. that the above may be used in are detailed below.

At least some embodiments of the disclosed technologies can be described in view of the following examples:

Example 1. An apparatus comprising:
  a matrix operations accelerator circuit comprising a two-dimensional grid of fused multiply accumulate circuits;
  a first plurality of registers that represents a first input two-dimensional matrix coupled to the matrix operations accelerator circuit;
  a second plurality of registers that represents a second input two-dimensional matrix coupled to the matrix operations accelerator circuit;
  a decoder, of a hardware processor core coupled to the matrix operations accelerator circuit, to decode a single instruction into a decoded single instruction, the single instruction including a field that identifies a resultant storage; and
  an execution circuit of the hardware processor core to execute the decoded single instruction to:
    load a first buffer of the two-dimensional grid of fused multiply accumulate circuits with the first input two-dimensional matrix from the first plurality of registers,
    check if a second buffer of the two-dimensional grid of fused multiply accumulate circuits stores an immediately prior input two-dimensional matrix that is the same as the second input two-dimensional matrix,
    when the second buffer of the two-dimensional grid of fused multiply accumulate circuits stores the immediately prior input two-dimension matrix, from execution of a previous instruction, that is the same as the second input two-dimensional matrix:
      prevent reclamation of the second buffer between execution of the previous instruction and the decoded single instruction,
      perform an operation on the first input two-dimensional matrix from the first buffer and the immediately prior input two-dimension matrix from the second buffer to produce a resultant, and
      store the resultant in the resultant storage, and
    when the second buffer of the two-dimensional grid of fused multiply accumulate circuits does not store the immediately prior input two-dimension matrix, from execution of the previous instruction, that is the same as the second input two-dimensional matrix:
      load the second input two-dimensional matrix into the second buffer of the two-dimensional grid of fused multiply accumulate circuits,
      perform the operation on the first input two-dimensional matrix from the first buffer and the second input two-dimension matrix from the second buffer to produce a resultant, and
      store the resultant in the resultant storage.

Example 2. The apparatus of example 1, wherein when the second buffer of the two-dimensional grid of fused multiply accumulate circuits does not store the immediately prior input two-dimension matrix, from execution of the previous instruction, that is the same as the second input two-dimensional matrix, the matrix operations accelerator circuit is to begin reclamation of the second buffer between execution of the previous instruction and the decoded single instruction.

Example 3. The apparatus of example 1, wherein the matrix operations accelerator circuit assigns an identification value for each plurality of registers that represents an input two-dimensional matrix, and the check if the second buffer of the two-dimensional grid of fused multiply accumulate circuits stores the immediately prior input two-dimension matrix that is the same as the second input two-dimensional matrix comprises comparing respective identification values for corresponding input two-dimensional matrices from the previous instruction and the single instruction.

Example 4. The apparatus of example 3, wherein the matrix operations accelerator circuit is to assign a different identification value to the second plurality of registers to store an input two-dimensional matrix of a next instruction.

Example 5. The apparatus of example 1, wherein when the second buffer of the two-dimensional grid of fused multiply accumulate circuits stores the immediately prior input two-dimension matrix, from execution of the previous instruction, that is the same as the second input two-dimensional matrix, the matrix operations accelerator circuit does not load the second buffer of the two-dimensional grid of fused multiply accumulate circuits during execution of the decoded single instruction.

Example 6. The apparatus of example 1, wherein the resultant storage is a third plurality of registers that represents at least one output two-dimensional matrix formed by execution of the decoded single instruction.

Example 7. The apparatus of example 1, wherein the operation comprises transmitting a respective output of each of a first proper subset of fused multiply accumulate circuits of the two-dimensional grid downstream to a respective input of each of a second proper subset of fused multiply accumulate circuits of the two-dimensional grid to form the resultant.

Example 8. The apparatus of example 7, wherein the first proper subset of fused multiply accumulate circuits is one of a row or a column of the two-dimensional grid of fused multiply accumulate circuits and the second proper subset of fused multiply accumulate circuits is another of the one of the row or the column of the two-dimensional grid of fused multiply accumulate circuits.

Example 9. A method comprising:
decoding, with a decoder of a hardware processor core, a single instruction into a decoded single instruction, wherein the hardware processor core is coupled to a matrix operations accelerator circuit comprising a two-dimensional grid of fused multiply accumulate circuits, the matrix operations accelerator circuit is coupled to a first plurality of registers that represents a first input two-dimensional matrix and a second plurality of registers that represents a second input two-dimensional matrix, and the single instruction includes a field that identifies a resultant storage; and executing the decoded single instruction with an execution circuit of the hardware processor core to:
load a first buffer of the two-dimensional grid of fused multiply accumulate circuits with the first input two-dimensional matrix from the first plurality of registers,
check if a second buffer of the two-dimensional grid of fused multiply accumulate circuits stores an immediately prior input two-dimension matrix that is the same as the second input two-dimensional matrix,
when the second buffer of the two-dimensional grid of fused multiply accumulate circuits stores the immediately prior input two-dimension matrix, from execution of a previous instruction, that is the same as the second input two-dimensional matrix:
prevent reclamation of the second buffer between execution of the previous instruction and the decoded single instruction,
perform an operation on the first input two-dimensional matrix from the first buffer and the immediately prior input two-dimension matrix from the second buffer to produce a resultant, and
store the resultant in the resultant storage, and
when the second buffer of the two-dimensional grid of fused multiply accumulate circuits does not store the immediately prior input two-dimension matrix, from execution of the previous instruction, that is the same as the second input two-dimensional matrix:
load the second input two-dimensional matrix into the second buffer of the two-dimensional grid of fused multiply accumulate circuits,
perform the operation on the first input two-dimensional matrix from the first buffer and the second input two-dimension matrix from the second buffer to produce a resultant, and
store the resultant in the resultant storage.

Example 10. The method of example 9, wherein when the second buffer of the two-dimensional grid of fused multiply accumulate circuits does not store the immediately prior input two-dimension matrix, from execution of the previous instruction, that is the same as the second input two-dimensional matrix, further comprising beginning reclamation of the second buffer between execution of the previous instruction and the decoded single instruction.

Example 11. The method of example 9, further comprising assigning an identification value for each plurality of registers that represents an input two-dimensional matrix, and the check if the second buffer of the two-dimensional grid of fused multiply accumulate circuits stores the immediately prior input two-dimension matrix that is the same as the second input two-dimensional matrix comprises comparing respective identification values for corresponding input two-dimensional matrices from the previous instruction and the single instruction.

Example 12. The method of example 11, further comprising assigning a different identification value to the second plurality of registers to store an input two-dimensional matrix of a next instruction.

Example 13. The method of example 9, wherein when the second buffer of the two-dimensional grid of fused multiply accumulate circuits stores the immediately prior input two-dimension matrix, from execution of the previous instruction, that is the same as the second input two-dimensional matrix, further comprising not loading the second buffer of the two-dimensional grid of fused multiply accumulate circuits during execution of the decoded single instruction.

Example 14. The method of example 9, wherein the resultant storage is a third plurality of registers that represents at least one output two-dimensional matrix formed by execution of the decoded single instruction.

Example 15. The method of example 9, wherein the operation comprises transmitting a respective output of each of a first proper subset of fused multiply accumulate circuits of the two-dimensional grid downstream to a respective input of each of a second proper subset of fused multiply accumulate circuits of the two-dimensional grid to form the resultant.

Example 16. The method of example 15, wherein the first proper subset of fused multiply accumulate circuits is one of a row or a column of the two-dimensional grid of fused multiply accumulate circuits and the second proper subset of fused multiply accumulate circuits is another of the one of the row or the column of the two-dimensional grid of fused multiply accumulate circuits.

Example 17. A non-transitory machine readable medium that stores code that when executed by a machine causes the machine to perform a method comprising:
decoding, with a decoder of a hardware processor core, a single instruction into a decoded single instruction, wherein the hardware processor core is coupled to a matrix operations accelerator circuit comprising a two-dimensional grid of fused multiply accumulate circuits, the matrix operations accelerator circuit is coupled to a first plurality of registers that represents a first input two-dimensional matrix and a second plurality of registers that represents a second input two-dimensional matrix, and the single instruction includes a field that identifies a resultant storage; and executing the decoded single instruction with an execution circuit of the hardware processor core to:
load a first buffer of the two-dimensional grid of fused multiply accumulate circuits with the first input two-dimensional matrix from the first plurality of registers,
check if a second buffer of the two-dimensional grid of fused multiply accumulate circuits stores an immediately prior input two-dimension matrix that is the same as the second input two-dimensional matrix,
when the second buffer of the two-dimensional grid of fused multiply accumulate circuits stores the immediately prior input two-dimension matrix, from execution of a previous instruction, that is the same as the second input two-dimensional matrix:
prevent reclamation of the second buffer between execution of the previous instruction and the decoded single instruction,
perform an operation on the first input two-dimensional matrix from the first buffer and the immediately prior input two-dimension matrix from the second buffer to produce a resultant, and
store the resultant in the resultant storage, and
when the second buffer of the two-dimensional grid of fused multiply accumulate circuits does not store the immediately prior input two-dimension matrix, from execution of the previous instruction, that is the same as the second input two-dimensional matrix:

load the second input two-dimensional matrix into the second buffer of the two-dimensional grid of fused multiply accumulate circuits, perform the operation on the first input two-dimensional matrix from the first buffer and the second input two-dimension matrix from the second buffer to produce a resultant, and store the resultant in the resultant storage.

Example 18. The non-transitory machine readable medium of example 17, wherein when the second buffer of the two-dimensional grid of fused multiply accumulate circuits does not store the immediately prior input two-dimension matrix, from execution of the previous instruction, that is the same as the second input two-dimensional matrix, the method further comprising beginning reclamation of the second buffer between execution of the previous instruction and the decoded single instruction.

Example 19. The non-transitory machine readable medium of example 17, the method further comprising assigning an identification value for each plurality of registers that represents an input two-dimensional matrix, and the check if the second buffer of the two-dimensional grid of fused multiply accumulate circuits stores the immediately prior input two-dimension matrix that is the same as the second input two-dimensional matrix comprises comparing respective identification values for corresponding input two-dimensional matrices from the previous instruction and the single instruction.

Example 20. The non-transitory machine readable medium of example 19, the method further comprising assigning a different identification value to the second plurality of registers to store an input two-dimensional matrix of a next instruction.

Example 21. The non-transitory machine readable medium of example 17, wherein when the second buffer of the two-dimensional grid of fused multiply accumulate circuits stores the immediately prior input two-dimension matrix, from execution of the previous instruction, that is the same as the second input two-dimensional matrix, the method further comprising not loading the second buffer of the two-dimensional grid of fused multiply accumulate circuits during execution of the decoded single instruction.

Example 22. The non-transitory machine readable medium of example 17, wherein the resultant storage is a third plurality of registers that represents at least one output two-dimensional matrix formed by execution of the decoded single instruction.

Example 23. The non-transitory machine readable medium of example 17, wherein the operation comprises transmitting a respective output of each of a first proper subset of fused multiply accumulate circuits of the two-dimensional grid downstream to a respective input of each of a second proper subset of fused multiply accumulate circuits of the two-dimensional grid to form the resultant.

Example 24. The non-transitory machine readable medium of example 23, wherein the first proper subset of fused multiply accumulate circuits is one of a row or a column of the two-dimensional grid of fused multiply accumulate circuits and the second proper subset of fused multiply accumulate circuits is another of the one of the row or the column of the two-dimensional grid of fused multiply accumulate circuits.

In yet another embodiment, an apparatus comprises a data storage device that stores code that when executed by a hardware processor causes the hardware processor to perform any method disclosed herein. An apparatus may be as described in the detailed description. A method may be as described in the detailed description.

DETAILED EXEMPLARY SYSTEMS, PROCESSORS, AND EMULATION

Detailed herein are examples of hardware, software, etc. to execute the above described instructions. For example, what is described below details aspects of instruction execution including various pipeline stages such as fetch, decode, schedule, execute, retire, etc.

INSTRUCTION SETS

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 30A:
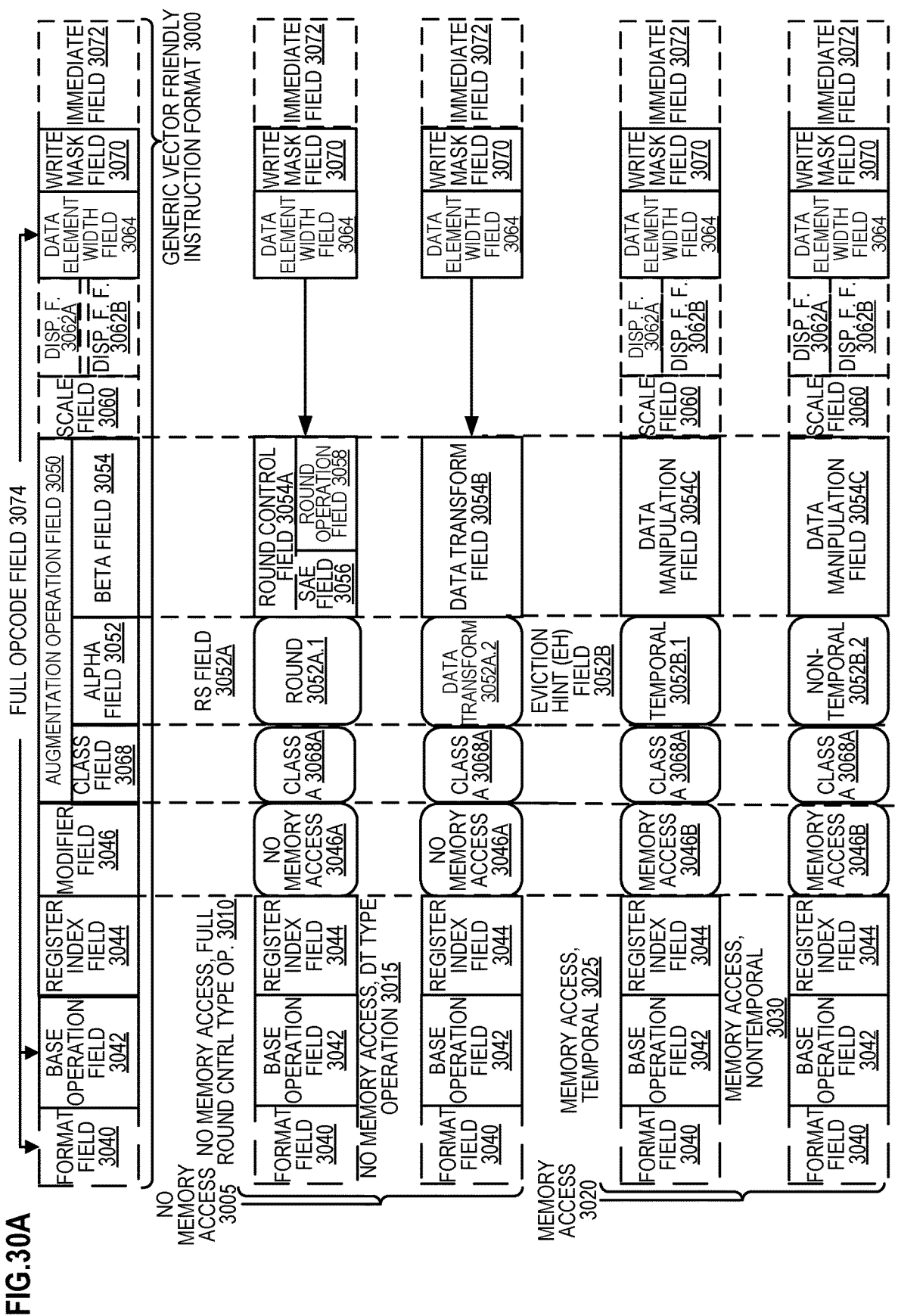
FIG. 30A is a block diagram illustrating a generic vector friendly instruction format and class A instruction templates thereof according to embodiments of the disclosure.
Figure 30B:
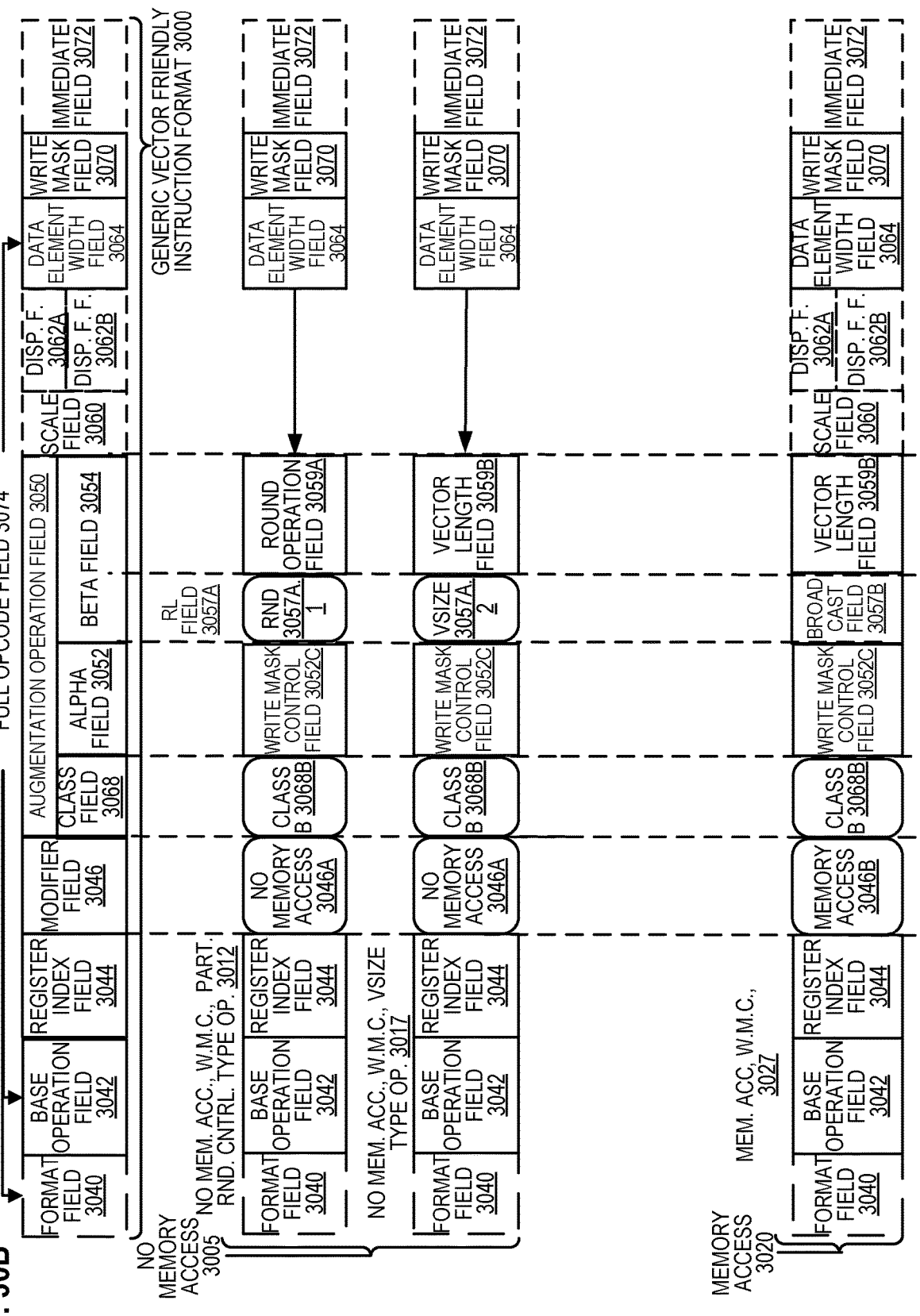
FIG. 30B is a block diagram illustrating the generic vector friendly instruction format and class B instruction templates thereof according to embodiments of the disclosure.

FIGS. 30A-30B are block diagrams illustrating a generic vector friendly instruction format and instruction templates thereof according to embodiments of the disclosure. FIG. 30A is a block diagram illustrating a generic vector friendly instruction format and class A instruction templates thereof according to embodiments of the disclosure; while FIG. 30B is a block diagram illustrating the generic vector friendly instruction format and class B instruction templates thereof according to embodiments of the disclosure. Specifically, a generic vector friendly instruction format 3000 for which are defined class A and class B instruction templates, both of which include no memory access 3005 instruction templates and memory access 3020 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 30A include: 1) within the no memory access 3005 instruction templates there is shown a no memory access, full round control type operation 3010 instruction template and a no memory access, data transform type operation 3015 instruction template; and 2) within the memory access 3020 instruction templates there is shown a memory access, temporal 3025 instruction template and a memory access, non-temporal 3030 instruction template. The class B instruction templates in FIG. 30B include: 1) within the no memory access 3005 instruction templates there is shown a no memory access, write mask control, partial round control type operation 3012 instruction template and a no memory access, write mask control, vsize type operation 3017 instruction template; and 2) within the memory access 3020 instruction templates there is shown a memory access, write mask control 3027 instruction template.

The generic vector friendly instruction format 3000 includes the following fields listed below in the order illustrated in FIGS. 30A-30B.

Format field 3040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 3042—its content distinguishes different base operations.

Register index field 3044—its content, directly or through address generation, specifies the locations of the source and destination operands, be they in registers or in memory. These include a sufficient number of bits to select N registers from a PxQ (e.g. 32x512, 16x128, 32x1024, 64x1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 3046—its content distinguishes occurrences of instructions in the generic vector instruction format that specify memory access from those that do not; that is, between no memory access 3005 instruction templates and memory access 3020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 3050—its content distinguishes which one of a variety of different operations to be performed in addition to the base operation. This field is context specific. In one embodiment of the disclosure, this field is divided into a class field 3068, an alpha field 3052, and a beta field 3054. The augmentation operation field 3050 allows common groups of operations to be performed in a single instruction rather than 2, 3, or 4 instructions.

Scale field 3060—its content allows for the scaling of the index field's content for memory address generation (e.g., for address generation that uses 2scale*index+base).

Displacement Field 3062A—its content is used as part of memory address generation (e.g., for address generation that uses 2scale*index+base+displacement).

Displacement Factor Field 3062B (note that the juxtaposition of displacement field 3062A directly over displacement factor field 3062B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 3074 (described later herein) and the data manipulation field 3054C. The displacement field 3062A and the displacement factor field 3062B are optional in the sense that they are not used for the no memory access 3005 instruction templates and/or different embodiments may implement only one or none of the two.

Data element width field 3064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 3070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 3070 allows for partial vector operations, including loads, stores, arithmetic, logical, etc. While embodiments of the disclosure are described in which the write mask field's 3070 content selects one of a number of write mask registers that contains the write mask to be used (and thus the write mask field's 3070 content indirectly identifies that masking to be performed), alternative embodiments instead or additional allow the mask write field's 3070 content to directly specify the masking to be performed.

Immediate field 3072—its content allows for the specification of an immediate. This field is optional in the sense that it is not present in an implementation of the generic vector friendly format that does not support immediate and it is not present in instructions that do not use an immediate.

Class field 3068—its content distinguishes between different classes of instructions. With reference to FIGS. 30A-B, the contents of this field select between class A and class B instructions. In FIGS. 30A-B, rounded corner squares are used to indicate a specific value is present in a field (e.g., class A 3068A and class B 3068B for the class field 3068 respectively in FIGS. 30A-B).

Instruction Templates of Class A

In the case of the non-memory access 3005 instruction templates of class A, the alpha field 3052 is interpreted as an RS field 3052A, whose content distinguishes which one of the different augmentation operation types are to be performed (e.g., round 3052A.1 and data transform 3052A.2 are respectively specified for the no memory access, round type operation 3010 and the no memory access, data transform type operation 3015 instruction templates), while the beta field 3054 distinguishes which of the operations of the specified type is to be performed. In the no memory access 3005 instruction templates, the scale field 3060, the displacement field 3062A, and the displacement factor field 3062B are not present.

No-Memory Access Instruction Templates—Full Round Control Type Operation

In the no memory access full round control type operation 3010 instruction template, the beta field 3054 is interpreted as a round control field 3054A, whose content(s) provide static rounding. While in the described embodiments of the disclosure the round control field 3054A includes a suppress all floating point exceptions (SAE) field 3056 and a round operation control field 3058, alternative embodiments may support may encode both these concepts into the same field or only have one or the other of these concepts/fields (e.g., may have only the round operation control field 3058).

SAE field 3056—its content distinguishes whether or not to disable the exception event reporting; when the SAE field's 3056 content indicates suppression is enabled, a given instruction does not report any kind of floating-point exception flag and does not raise any floating point exception handler.

Round operation control field 3058—its content distinguishes which one of a group of rounding operations to perform (e.g., Round-up, Round-down, Round-towards-zero and Round-to-nearest). Thus, the round operation control field 3058 allows for the changing of the rounding mode on a per instruction basis. In one embodiment of the disclosure where a processor includes a control register for specifying rounding modes, the round operation control field's 3050 content overrides that register value.

No Memory Access Instruction Templates—Data Transform Type Operation

In the no memory access data transform type operation 3015 instruction template, the beta field 3054 is interpreted as a data transform field 3054B, whose content distinguishes which one of a number of data transforms is to be performed (e.g., no data transform, swizzle, broadcast).

In the case of a memory access 3020 instruction template of class A, the alpha field 3052 is interpreted as an eviction hint field 3052B, whose content distinguishes which one of the eviction hints is to be used (in FIG. 30A, temporal 3052B.1 and non-temporal 3052B.2 are respectively specified for the memory access, temporal 3025 instruction template and the memory access, non-temporal 3030 instruction template), while the beta field 3054 is interpreted as a data manipulation field 3054C, whose content distinguishes which one of a number of data manipulation operations (also known as primitives) is to be performed (e.g., no manipulation; broadcast; up conversion of a source; and down conversion of a destination). The memory access 3020 instruction templates include the scale field 3060, and optionally the displacement field 3062A or the displacement factor field 3062B.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 3052 is interpreted as a write mask control (Z)

field 3052C, whose content distinguishes whether the write masking controlled by the write mask field 3070 should be a merging or a zeroing.

In the case of the non-memory access 3005 instruction templates of class B, part of the beta field 3054 is interpreted as an RL field 3057A, whose content distinguishes which one of the different augmentation operation types are to be performed (e.g., round 3057A.1 and vector length (VSIZE) 3057A.2 are respectively specified for the no memory access, write mask control, partial round control type operation 3012 instruction template and the no memory access, write mask control, VSIZE type operation 3017 instruction template), while the rest of the beta field 3054 distinguishes which of the operations of the specified type is to be performed. In the no memory access 3005 instruction templates, the scale field 3060, the displacement field 3062A, and the displacement factor field 3062B are not present.

In the no memory access, write mask control, partial round control type operation 3010 instruction template, the rest of the beta field 3054 is interpreted as a round operation field 3059A and exception event reporting is disabled (a given instruction does not report any kind of floating-point exception flag and does not raise any floating point exception handler).

Round operation control field 3059A—just as round operation control field 3058, its content distinguishes which one of a group of rounding operations to perform (e.g., Round-up, Round-down, Round-towards-zero and Round-to-nearest). Thus, the round operation control field 3059A allows for the changing of the rounding mode on a per instruction basis. In one embodiment of the disclosure where a processor includes a control register for specifying rounding modes, the round operation control field's 3050 content overrides that register value.

In the no memory access, write mask control, VSIZE type operation 3017 instruction template, the rest of the beta field 3054 is interpreted as a vector length field 3059B, whose content distinguishes which one of a number of data vector lengths is to be performed on (e.g., 128, 256, or 512 byte).

In the case of a memory access 3020 instruction template of class B, part of the beta field 3054 is interpreted as a broadcast field 3057B, whose content distinguishes whether or not the broadcast type data manipulation operation is to be performed, while the rest of the beta field 3054 is interpreted the vector length field 3059B. The memory access 3020 instruction templates include the scale field 3060, and optionally the displacement field 3062A or the displacement factor field 3062B.

With regard to the generic vector friendly instruction format 3000, a full opcode field 3074 is shown including the format field 3040, the base operation field 3042, and the data element width field 3064. While one embodiment is shown where the full opcode field 3074 includes all of these fields, the full opcode field 3074 includes less than all of these fields in embodiments that do not support all of them. The full opcode field 3074 provides the operation code (opcode).

The augmentation operation field 3050, the data element width field 3064, and the write mask field 3070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 31 is a block diagram illustrating an exemplary specific vector friendly instruction format according to embodiments of the disclosure. FIG. 31 shows a specific vector friendly instruction format 3100 that is specific in the sense that it specifies the location, size, interpretation, and order of the fields, as well as values for some of those fields. The specific vector friendly instruction format 3100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 30 into which the fields from FIG. 31 map are illustrated.

It should be understood that, although embodiments of the disclosure are described with reference to the specific vector friendly instruction format 3100 in the context of the generic vector friendly instruction format 3000 for illustrative purposes, the disclosure is not limited to the specific vector friendly instruction format 3100 except where claimed. For example, the generic vector friendly instruction format 3000 contemplates a variety of possible sizes for the various fields, while the specific vector friendly instruction format 3100 is shown as having fields of specific sizes. By way of specific example, while the data element width field 3064 is illustrated as a one bit field in the specific vector friendly instruction format 3100, the disclosure is not so limited (that is, the generic vector friendly instruction format 3000 contemplates other sizes of the data element width field 3064).

The generic vector friendly instruction format 3000 includes the following fields listed below in the order illustrated in FIG. 31A.

EVEX Prefix (Bytes 0-3) 3102—is encoded in a four-byte form.

Format Field 3040 (EVEX Byte 0, bits [7:0])—the first byte (EVEX Byte 0) is the format field 3040 and it contains 0x62 (the unique value used for distinguishing the vector friendly instruction format in one embodiment of the disclosure).

The second-fourth bytes (EVEX Bytes 1-3) include a number of bit fields providing specific capability.

REX field 3105 (EVEX Byte 1, bits [7-5])—consists of an EVEX.R bit field (EVEX Byte 1, bit [7]-R), EVEX.X bit field (EVEX byte 1, bit [6]-X), and EVEX.B bit field EVEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 3110—this is the first part of the REX' field 3110 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 3115 (EVEX byte 1, bits [3:0]-mmmm)—its content encodes an implied leading opcode byte (0F, 0F 38, or 0F 3).

Data element width field 3064 (EVEX byte 2, bit [7]-W)—is represented by the notation EVEX.W. EVEX.W is used to define the granularity (size) of the datatype (either 32-bit data elements or 64-bit data elements).

EVEX.vvvv 3120 (EVEX Byte 2, bits [6:3]-vvvv)—the role of EVEX.vvvv may include the following: 1) EVEX.vvvv encodes the first source register operand, specified in inverted (ls complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 3120 encodes the 4 low-order bits of the first source register specifier stored in inverted (1s complement) form. Depending on the instruction, an extra different EVEX bit field is used to extend the specifier size to 32 registers.

EVEX.U 3068 Class field (EVEX byte 2, bit [2]-U)—If EVEX.U=0, it indicates class A or EVEX.U0; if EVEX.U=1, it indicates class B or EVEX.U1.

Prefix encoding field 3125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 3052 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 3054 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 3110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 3070 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 3130 (Byte 4) is also known as the opcode byte. Part of the opcode is specified in this field.

MOD R/M Field 3140 (Byte 5) includes MOD field 3142, Reg field 3144, and R/M field 3146. As previously described, the MOD field's 3142 content distinguishes between memory access and non-memory access operations. The role of Reg field 3144 can be summarized to two situations: encoding either the destination register operand or a source register operand, or be treated as an opcode extension and not used to encode any instruction operand. The role of R/M field 3146 may include the following: encoding the instruction operand that references a memory address, or encoding either the destination register operand or a source register operand.

Scale, Index, Base (SIB) Byte (Byte 6)—As previously described, the scale field's 3050 content is used for memory address generation. SIB.xxx 3154 and SIB.bbb 3156—the contents of these fields have been previously referred to with regard to the register indexes Xxxx and Bbbb.

Displacement field 3062A (Bytes 7-10)—when MOD field 3142 contains 10, bytes 7-10 are the displacement field 3062A, and it works the same as the legacy 32-bit displacement (disp32) and works at byte granularity.

Displacement factor field 3062B (Byte 7)—when MOD field 3142 contains 01, byte 7 is the displacement factor field 3062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 3062B is a reinterpretation of disp8; when using displacement factor field 3062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 3062B substitutes the legacy x86 instruction set 8-bit displacement. Thus, the displacement factor field 3062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 3072 operates as previously described.

Full Opcode Field

FIG. 31B is a block diagram illustrating the fields of the specific vector friendly instruction format 3100 that make up the full opcode field 3074 according to one embodiment of the disclosure. Specifically, the full opcode field 3074 includes the format field 3040, the base operation field 3042, and the data element width (W) field 3064. The base operation field 3042 includes the prefix encoding field 3125, the opcode map field 3115, and the real opcode field 3130.

Register Index Field

FIG. 31C is a block diagram illustrating the fields of the specific vector friendly instruction format 3100 that make up the register index field 3044 according to one embodiment of the disclosure. Specifically, the register index field 3044 includes the REX field 3105, the REX' field 3110, the MODR/M.reg field 3144, the MODR/M.r/m field 3146, the VVVV field 3120, xxx field 3154, and the bbb field 3156.

Augmentation Operation Field

Figure 31D:
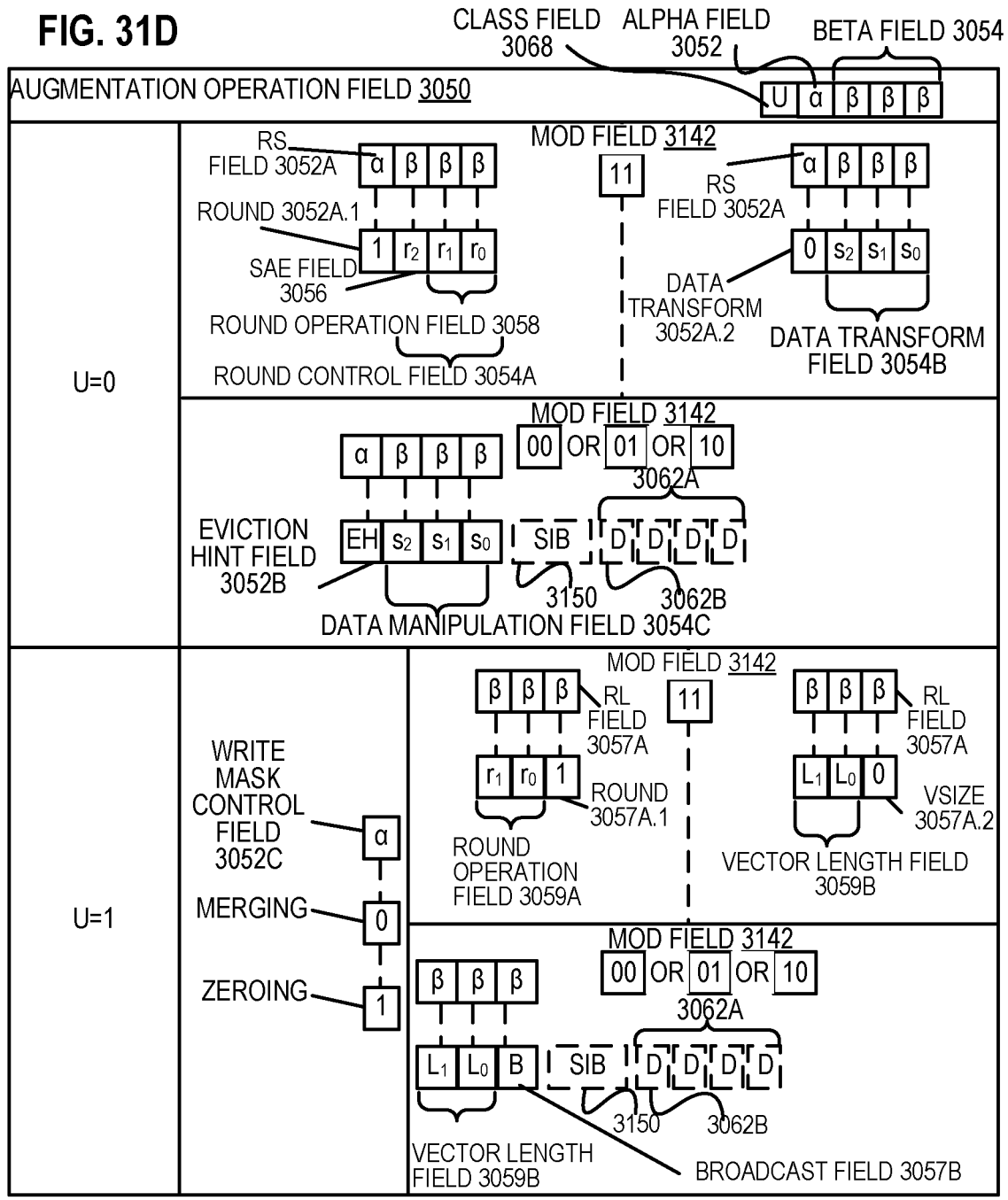
FIG. 31D is a block diagram illustrating the fields of the specific vector friendly instruction format in FIG. 31A that make up the augmentation operation field 3050 according to one embodiment of the disclosure.

FIG. 31D is a block diagram illustrating the fields of the specific vector friendly instruction format 3100 that make up the augmentation operation field 3050 according to one embodiment of the disclosure. When the class (U) field 3068 contains 0, it signifies EVEX.U0 (class A 3068A); when it contains 1, it signifies EVEX.U1 (class B 3068B). When U=0 and the MOD field 3142 contains 11 (signifying a no memo7ry access operation), the alpha field 3052 (EVEX byte 3, bit [7]-EH) is interpreted as the rs field 3052A. When the rs field 3052A contains a 1 (round 3052A.1), the beta field 3054 (EVEX byte 3, bits [6:4]-SSS) is interpreted as the round control field 3054A. The round control field 3054A includes a one bit SAE field 3056 and a two bit round operation field 3058. When the rs field 3052A contains a 0 (data transform 3052A.2), the beta field 3054 (EVEX byte 3, bits [6:4]-SSS) is interpreted as a three bit data transform field 3054B. When U=0 and the MOD field 3142 contains 00, 01, or 10 (signifying a memory access operation), the alpha field 3052 (EVEX byte 3, bit [7]-EH) is interpreted as the eviction hint (EH) field 3052B and the beta field 3054 (EVEX byte 3, bits [6:4]-SSS) is interpreted as a three bit data manipulation field 3054C.

When U=1, the alpha field 3052 (EVEX byte 3, bit [7]-EH) is interpreted as the write mask control (Z) field 3052C. When U=1 and the MOD field 3142 contains 11 (signifying a no memory access operation), part of the beta field 3054 (EVEX byte 3, bit [4]-So) is interpreted as the RL field 3057A; when it contains a 1 (round 3057A.1) the rest of the beta field 3054 (EVEX byte 3, bit [6-5]-$S_{2-1}$) is interpreted as the round operation field 3059A, while when the RL field 3057A contains a 0 (VSIZE 3057.A2) the rest of the beta field 3054 (EVEX byte 3, bit [6-5]-$S_{2-1}$) is interpreted as the vector length field 3059B (EVEX byte 3, bit [6-5]-$L_{1-0}$). When U=1 and the MOD field 3142 contains 00, 01, or 10 (signifying a memory access operation), the beta field 3054 (EVEX byte 3, bits [6:4]-SSS) is interpreted as the vector length field 3059B (EVEX byte 3, bit [6-5]-$L_{1-0}$) and the broadcast field 3057B (EVEX byte 3, bit [4]-B).

Exemplary Register Architecture

Figure 32:
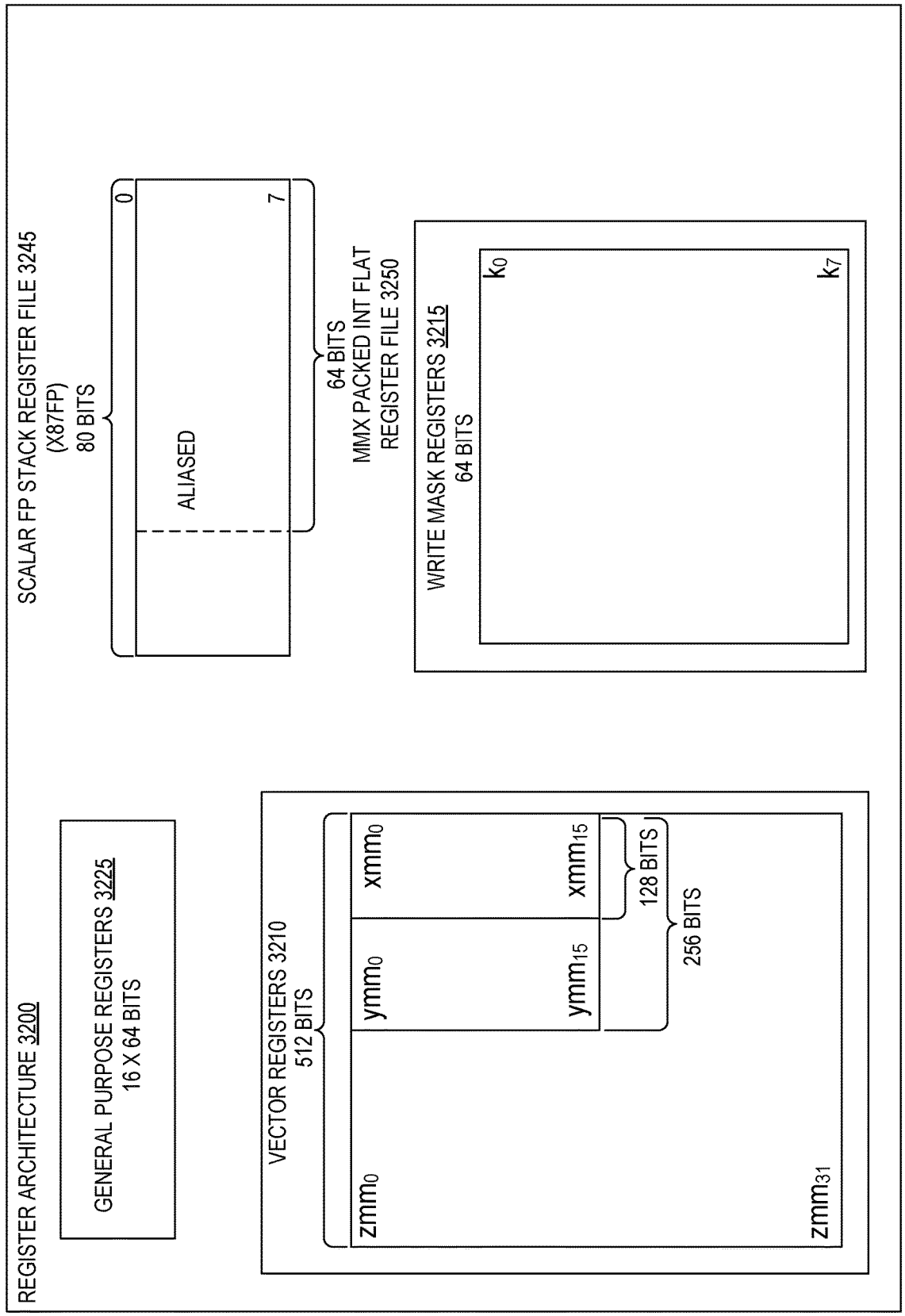
FIG. 32 is a block diagram of a register architecture according to one embodiment of the disclosure

FIG. 32 is a block diagram of a register architecture 3200 according to one embodiment of the disclosure. In the embodiment illustrated, there are 32 vector registers 3210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 3100 operates on these overlaid register file as illustrated in the below tables.

| Adjustable Vector Length | Class | Operations | Registers |
| --- | --- | --- | --- |
| Instruction Templates that do not include the vector length field 3059B | A (FIG. 30A; U = 0) | 3010, 3015, 3025, 3030 | zmm registers (the vector length is 64 byte) |
| | B (FIG. 30B; U = 1) | 3012 | zmm registers (the vector length is 64 byte) |
| Instruction templates that do include the vector length field 3059B | B (FIG. 30B; U = 1) | 3017, 3027 | zmm, ymm, or xmm registers (the vector length is 64 byte, 32 byte, or 16 byte) depending on the vector length field 3059B |

In other words, the vector length field 3059B selects between a maximum length and one or more other shorter lengths, where each such shorter length is half the length of the preceding length; and instructions templates without the vector length field 3059B operate on the maximum vector length. Further, in one embodiment, the class B instruction templates of the specific vector friendly instruction format 3100 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 3215—in the embodiment illustrated, there are 8 write mask registers (k0 through k7), each 64 bits in size. In an alternate embodiment, the write mask registers 3215 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 3225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3245, on which is aliased the MMX packed integer flat register file 3250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 33A is a block diagram illustrating both an exemplary in-order pipeline and an exemplary register renaming, out-of-order issue/execution pipeline according to embodiments of the disclosure. FIG. 33B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 33A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 33A, a processor pipeline 3300 includes a fetch stage 3302, a length decode stage 3304, a decode stage 3306, an allocation stage 3308, a renaming stage 3310, a scheduling (also known as a dispatch or issue) stage 3312, a register read/memory read stage 3314, an execute stage 3316, a write back/memory write stage 3318, an exception handling stage 3322, and a commit stage 3324.

FIG. 33B shows processor core 3390 including a front end unit 3330 coupled to an execution engine unit 3350, and both are coupled to a memory unit 3370. The core 3390 may be a reduced instruction set computing (RISC) core, a complex instruction set computing (CISC) core, a very long instruction word (VLIW) core, or a hybrid or alternative core type. As yet another option, the core 3390 may be a special-purpose core, such as, for example, a network or communication core, compression engine, coprocessor core, general purpose computing graphics processing unit (GPGPU) core, graphics core, or the like.

The front end unit 3330 includes a branch prediction unit 3332 coupled to an instruction cache unit 3334, which is coupled to an instruction translation lookaside buffer (TLB) 3336, which is coupled to an instruction fetch unit 3338, which is coupled to a decode unit 3340. The decode unit 3340 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 3340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3390 includes a microcode ROM or other medium that stores microcode for certain macro-instructions (e.g., in decode unit 3340 or otherwise within the front end unit 3330). The decode unit 3340 is coupled to a rename/allocator unit 3352 in the execution engine unit 3350.

The execution engine unit 3350 includes the rename/allocator unit 3352 coupled to a retirement unit 3354 and a set of one or more scheduler unit(s) 3356. The scheduler unit(s) 3356 represents any number of different schedulers, including reservations stations, central instruction window, etc. The scheduler unit(s) 3356 is coupled to the physical register file(s) unit(s) 3358. Each of the physical register file(s) units 3358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3358 comprises a vector registers unit, a write mask registers unit, and a scalar registers unit. These register units may provide architectural vector registers, vector mask registers, and general purpose registers. The physical register file(s) unit(s) 3358 is overlapped by the retirement unit 3354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3354 and the physical register file(s) unit(s) 3358 are coupled to the execution cluster(s) 3360. The execution cluster(s) 3360 includes a set of one or more execution units 3362 (e.g., execution circuits) and a set of one or more memory access units 3364. The execution units 3362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3356, physical register file(s) unit(s) 3358, and execution cluster(s) 3360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3364). It should also be understood that where separate pipelines are used, one or more of these pipelines may be out-of-order issue/execution and the rest in-order.

The set of memory access units 3364 is coupled to the memory unit 3370, which includes a data TLB unit 3372 coupled to a data cache unit 3374 coupled to a level 2 (L2) cache unit 3376. In one exemplary embodiment, the memory access units 3364 may include a load unit, a store address unit, and a store data unit, each of which is coupled to the data TLB unit 3372 in the memory unit 3370. The instruction cache unit 3334 is further coupled to a level 2 (L2) cache unit 3376 in the memory unit 3370. The L2 cache unit 3376 is coupled to one or more other levels of cache and eventually to a main memory.

By way of example, the exemplary register renaming, out-of-order issue/execution core architecture may implement the pipeline 3300 as follows: 1) the instruction fetch 3338 performs the fetch and length decoding stages 3302 and 3304; 2) the decode unit 3340 performs the decode stage 3306; 3) the rename/allocator unit 3352 performs the allocation stage 3308 and renaming stage 3310; 4) the scheduler unit(s) 3356 performs the schedule stage 3312; 5) the physical register file(s) unit(s) 3358 and the memory unit 3370 perform the register read/memory read stage 3314; the execution cluster 3360 perform the execute stage 3316; 6) the memory unit 3370 and the physical register file(s) unit(s) 3358 perform the write back/memory write stage 3318; 7) various units may be involved in the exception handling stage 3322; and 8) the retirement unit 3354 and the physical register file(s) unit(s) 3358 perform the commit stage 3324.

The core 3390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 3390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 3334/3374 and a shared L2 cache unit 3376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 34B:
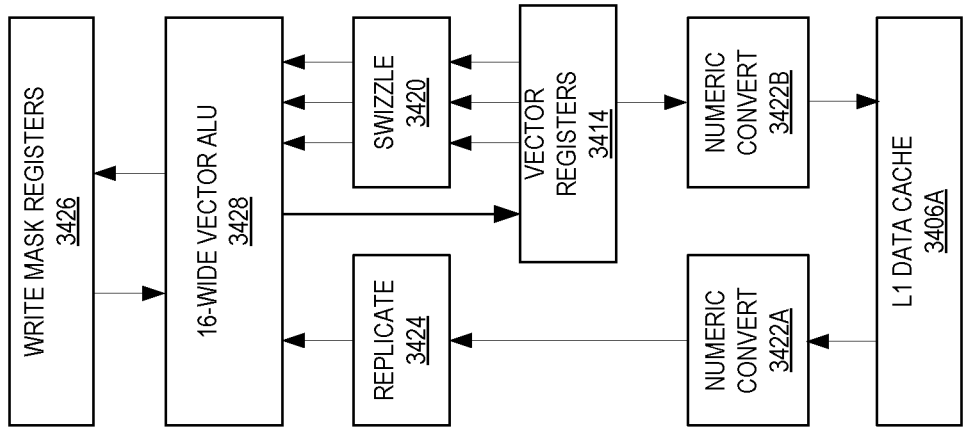
FIG. 34B is an expanded view of part of the processor core in FIG. 34A according to embodiments of the disclosure.
Figure 34A:
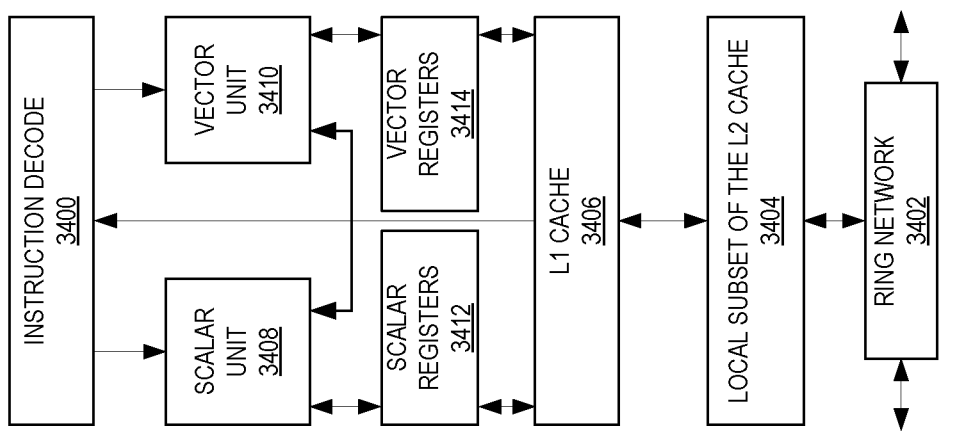
FIG. 34A is a block diagram of a single processor core, along with its connection to the on-die interconnect network and with its local subset of the Level 2 (L2) cache, according to embodiments of the disclosure.

FIGS. 34A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 34A is a block diagram of a single processor core, along with its connection to the on-die interconnect network 3402 and with its local subset of the Level 2 (L2) cache 3404, according to embodiments of the disclosure. In one embodiment, an instruction decode unit 3400 supports the x86 instruction set with a packed data instruction set extension. An L1 cache 3406 allows low-latency accesses to cache memory into the scalar and vector units. While in one embodiment (to simplify the design), a scalar unit 3408 and a vector unit 3410 use separate register sets (respectively, scalar registers 3412 and vector registers 3414) and data transferred between them is written to memory and then read back in from a level 1 (L1) cache 3406, alternative embodiments of the disclosure may use a different approach (e.g., use a single register set or include a communication path that allow data to be transferred between the two register files without being written and read back).

The local subset of the L2 cache 3404 is part of a global L2 cache that is divided into separate local subsets, one per processor core. Each processor core has a direct access path to its own local subset of the L2 cache 3404. Data read by a processor core is stored in its L2 cache subset 3404 and can be accessed quickly, in parallel with other processor cores accessing their own local L2 cache subsets. Data written by a processor core is stored in its own L2 cache subset 3404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 34B is an expanded view of part of the processor core in FIG. 34A according to embodiments of the disclosure. FIG. 34B includes an L1 data cache 3406A part of the L1 cache 3406, as well as more detail regarding the vector unit 3410 and the vector registers 3414. Specifically, the vector unit 3410 is a 16-wide vector processing unit (VPU) (see the 16-wide ALU 3428), which executes one or more of integer, single-precision float, and double-precision float instructions. The VPU supports swizzling the register inputs with swizzle unit 3420, numeric conversion with numeric convert units 3422A-B, and replication with replication unit 3424 on the memory input. Write mask registers 3426 allow predicating resulting vector writes.

Figure 35:
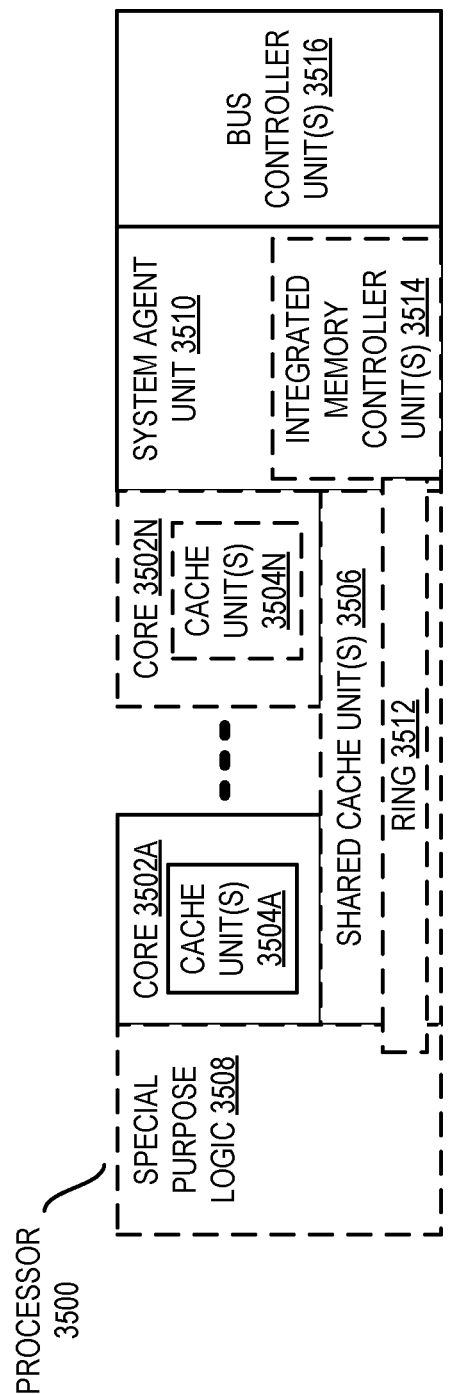
FIG. 35 is a block diagram of a processor that may have more than one core, may have an integrated memory controller, and may have integrated graphics according to embodiments of the disclosure.

FIG. 35 is a block diagram of a processor 3500 that may have more than one core, may have an integrated memory controller, and may have integrated graphics according to embodiments of the disclosure. The solid lined boxes in FIG. 35 illustrate a processor 3500 with a single core 3502A, a system agent 3510, a set of one or more bus controller units 3516, while the optional addition of the dashed lined boxes illustrates an alternative processor 3500 with multiple cores 3502A-N, a set of one or more integrated memory controller unit(s) 3514 in the system agent unit 3510, and special purpose logic 3508.

Thus, different implementations of the processor 3500 may include: 1) a CPU with the special purpose logic 3508 being integrated graphics and/or scientific (throughput) logic (which may include one or more cores), and the cores 3502A-N being one or more general purpose cores (e.g., general purpose in-order cores, general purpose out-of-order cores, a combination of the two); 2) a coprocessor with the cores 3502A-N being a large number of special purpose cores intended primarily for graphics and/or scientific (throughput); and 3) a coprocessor with the cores 3502A-N being a large number of general purpose in-order cores. Thus, the processor 3500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3506, and external memory (not shown) coupled to the set of integrated memory controller units 3514. The set of shared cache units 3506 may include one or more mid-level caches, such as level 2 (L2), level 3 (L3), level 4 (L4), or other levels of cache, a last level cache (LLC), and/or combinations thereof. While in one embodiment a ring based interconnect unit 3512 interconnects the integrated graphics logic 3508, the set of shared cache units 3506, and the system agent unit 3510/integrated memory controller unit(s) 3514, alternative embodiments may use any number of well-known techniques for interconnecting such units. In one embodiment, coherency is maintained between one or more cache units 3506 and cores 3502-A-N.

In some embodiments, one or more of the cores 3502A-N are capable of multi-threading. The system agent 3510 includes those components coordinating and operating cores 3502A-N. The system agent unit 3510 may include for example a power control unit (PCU) and a display unit. The PCU may be or include logic and components needed for regulating the power state of the cores 3502A-N and the integrated graphics logic 3508. The display unit is for driving one or more externally connected displays.

The cores 3502A-N may be homogenous or heterogeneous in terms of architecture instruction set; that is, two or more of the cores 3502A-N may be capable of execution the same instruction set, while others may be capable of executing only a subset of that instruction set or a different instruction set.

Exemplary Computer Architectures

FIGS. 36-39 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 36:
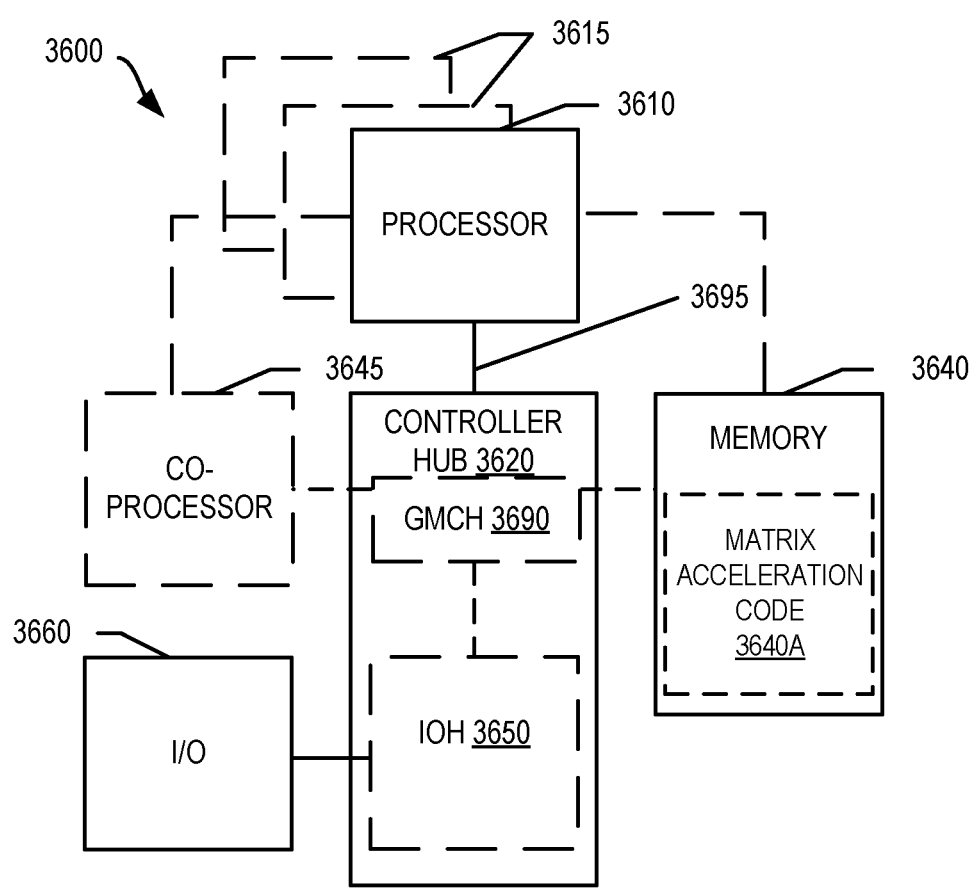
FIG. 36 is a block diagram of a system in accordance with one embodiment of the present disclosure.

Referring now to FIG. 36, shown is a block diagram of a system 3600 in accordance with one embodiment of the present disclosure. The system 3600 may include one or more processors 3610, 3615, which are coupled to a controller hub 3620. In one embodiment the controller hub 3620 includes a graphics memory controller hub (GMCH) 3690 and an Input/Output Hub (IOH) 3650 (which may be on separate chips); the GMCH 3690 includes memory and graphics controllers to which are coupled memory 3640 and a coprocessor 3645; the IOH 3650 is couples input/output (I/O) devices 3660 to the GMCH 3690. Alternatively, one or both of the memory and graphics controllers are integrated within the processor (as described herein), the memory 3640 and the coprocessor 3645 are coupled directly to the processor 3610, and the controller hub 3620 in a single chip with the IOH 3650. Memory 3640 may include matrix acceleration code 3640A, for example, that stores code that when executed causes a processor to perform any method of this disclosure.

The optional nature of additional processors 3615 is denoted in FIG. 36 with broken lines. Each processor 3610, 3615 may include one or more of the processing cores described herein and may be some version of the processor 3500.

The memory 3640 may be, for example, dynamic random access memory (DRAM), phase change memory (PCM), or a combination of the two. For at least one embodiment, the controller hub 3620 communicates with the processor(s) 3610, 3615 via a multi-drop bus, such as a frontside bus (FSB), point-to-point interface such as Quickpath Interconnect (QPI), or similar connection 3695.

In one embodiment, the coprocessor 3645 is a special-purpose processor, such as, for example, a high-throughput MIC processor, a network or communication processor, compression engine, graphics processor, GPGPU, embedded processor, or the like. In one embodiment, controller hub 3620 may include an integrated graphics accelerator.

There can be a variety of differences between the physical resources 3610, 3615 in terms of a spectrum of metrics of merit including architectural, microarchitectural, thermal, power consumption characteristics, and the like.

In one embodiment, the processor 3610 executes instructions that control data processing operations of a general type. Embedded within the instructions may be coprocessor instructions. The processor 3610 recognizes these coprocessor instructions as being of a type that should be executed by the attached coprocessor 3645. Accordingly, the processor 3610 issues these coprocessor instructions (or control signals representing coprocessor instructions) on a coprocessor bus or other interconnect, to coprocessor 3645. Coprocessor(s) 3645 accept and execute the received coprocessor instructions.

Figure 37:
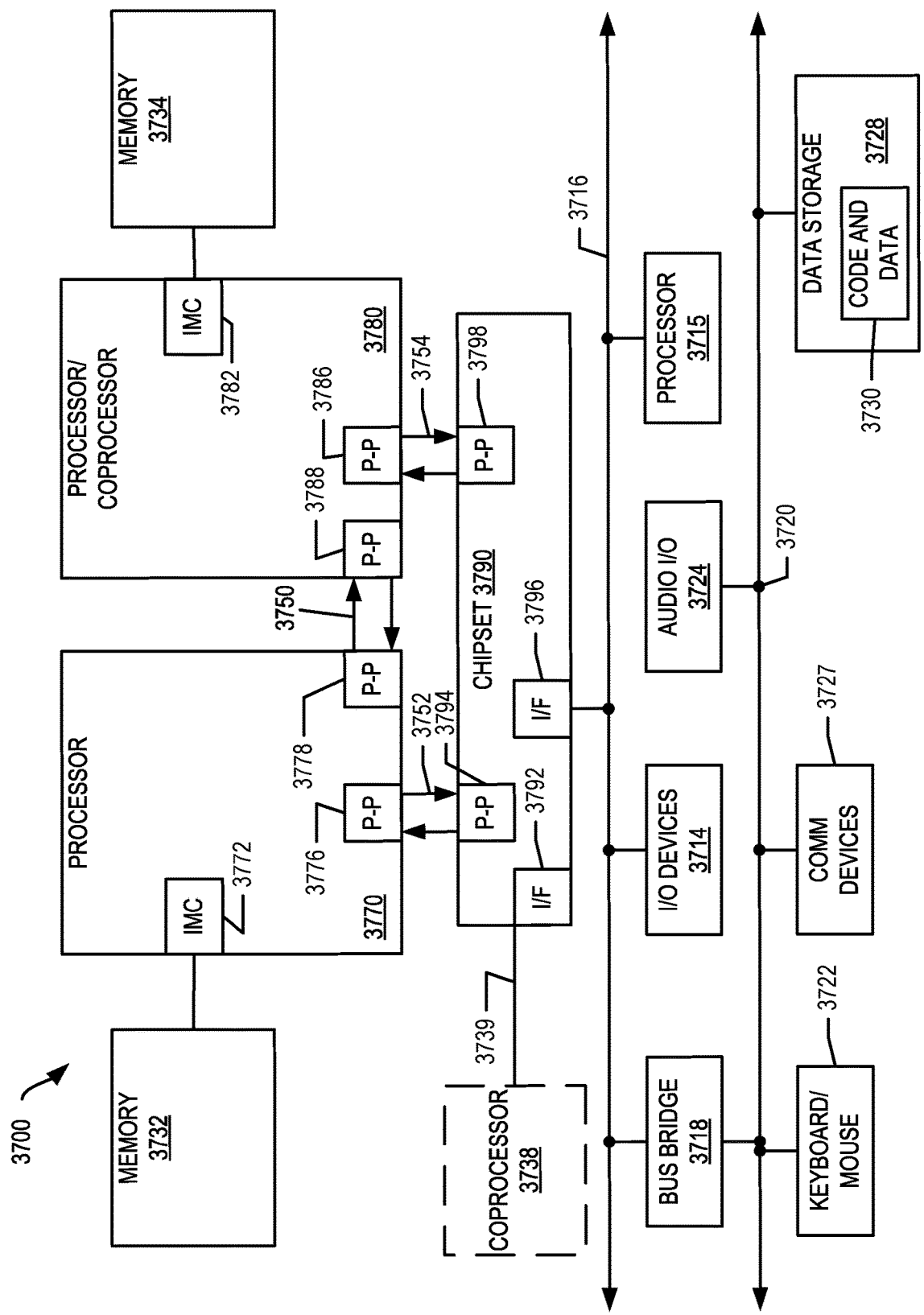
FIG. 37 is a block diagram of a more specific exemplary system in accordance with an embodiment of the present disclosure.

Referring now to FIG. 37, shown is a block diagram of a first more specific exemplary system 3700 in accordance with an embodiment of the present disclosure. As shown in FIG. 37, multiprocessor system 3700 is a point-to-point interconnect system, and includes a first processor 3770 and a second processor 3780 coupled via a point-to-point interconnect 3750. Each of processors 3770 and 3780 may be some version of the processor 3500. In one embodiment of the disclosure, processors 3770 and 3780 are respectively processors 3610 and 3615, while coprocessor 3738 is coprocessor 3645. In another embodiment, processors 3770 and 3780 are respectively processor 3610 coprocessor 3645.

Processors 3770 and 3780 are shown including integrated memory controller (IMC) units 3772 and 3782, respectively. Processor 3770 also includes as part of its bus controller units point-to-point (P-P) interfaces 3776 and 3778; similarly, second processor 3780 includes P-P interfaces 3786 and 3788. Processors 3770, 3780 may exchange information via a point-to-point (P-P) interface 3750 using P-P interface circuits 3778, 3788. As shown in FIG. 37, IMCs 3772 and 3782 couple the processors to respective memories, namely a memory 3732 and a memory 3734, which may be portions of main memory locally attached to the respective processors.

Processors 3770, 3780 may each exchange information with a chipset 3790 via individual P-P interfaces 3752, 3754 using point to point interface circuits 3776, 3794, 3786, 3798. Chipset 3790 may optionally exchange information with the coprocessor 3738 via a high-performance interface 3739. In one embodiment, the coprocessor 3738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3790 may be coupled to a first bus 3716 via an interface 3796. In one embodiment, first bus 3716 may be a Peripheral Component Interconnect (PCI) bus, or a bus such as a PCI Express bus or another third generation I/O interconnect bus, although the scope of the present disclosure is not so limited.

As shown in FIG. 37, various I/O devices 3714 may be coupled to first bus 3716, along with a bus bridge 3718 which couples first bus 3716 to a second bus 3720. In one embodiment, one or more additional processor(s) 3715, such as coprocessors, high-throughput MIC processors, GPGPU's, accelerators (such as, e.g., graphics accelerators or digital signal processing (DSP) units), field programmable gate arrays, or any other processor, are coupled to first bus 3716. In one embodiment, second bus 3720 may be a low pin count (LPC) bus. Various devices may be coupled to a second bus 3720 including, for example, a keyboard and/or mouse 3722, communication devices 3727 and a storage unit 3728 such as a disk drive or other mass storage device which may include instructions/code and data 3730, in one embodiment. Further, an audio I/O 3724 may be coupled to the second bus 3720. Note that other architectures are possible. For example, instead of the point-to-point architecture of FIG. 37, a system may implement a multi-drop bus or other such architecture.

Figure 38:
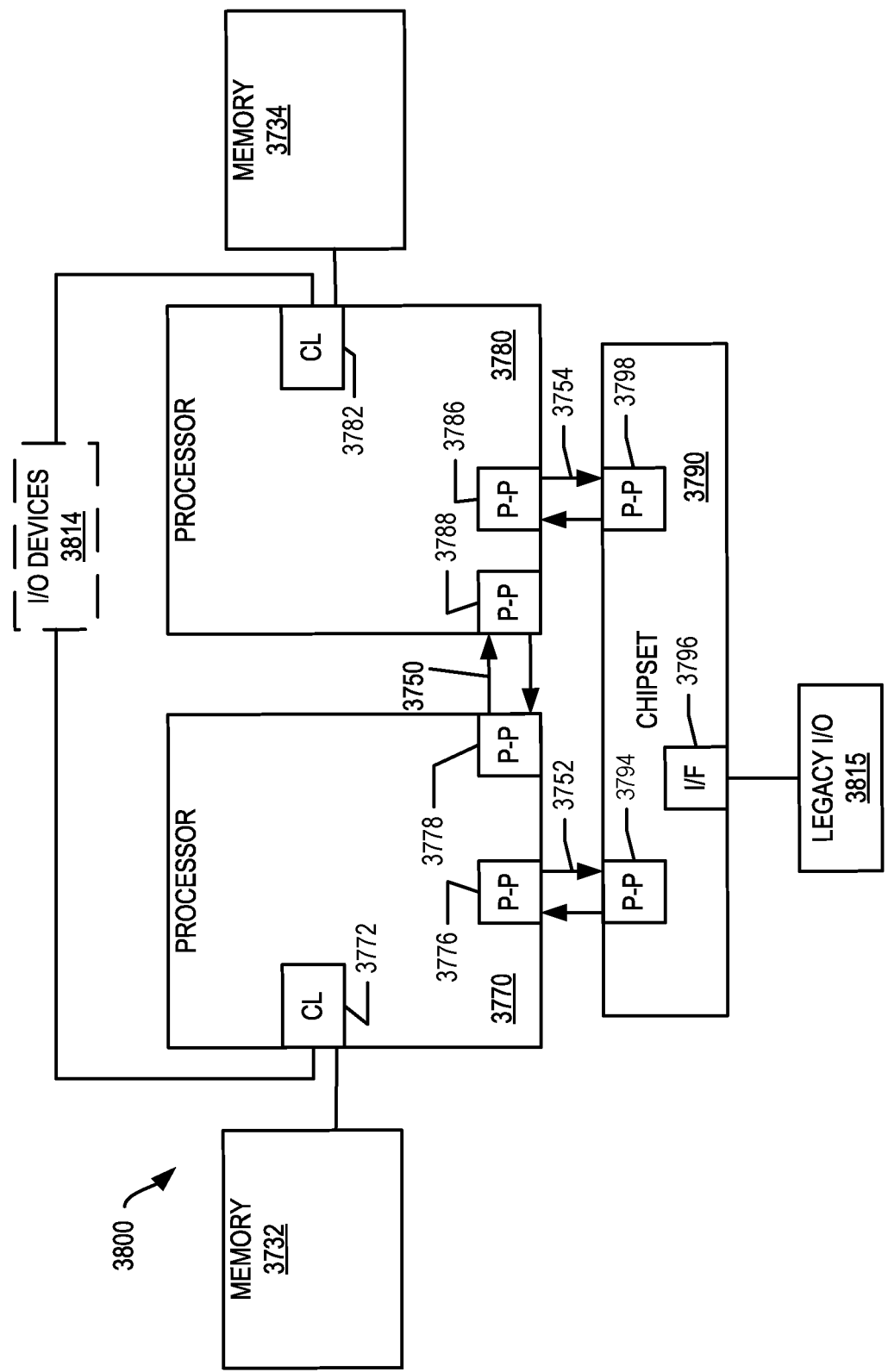
FIG. 38 is a block diagram of a second more specific exemplary system in accordance with an embodiment of the present disclosure.

Referring now to FIG. 38, shown is a block diagram of a second more specific exemplary system 3800 in accordance with an embodiment of the present disclosure. Like elements in FIGS. 37 and 38 bear like reference numerals, and certain aspects of FIG. 37 have been omitted from FIG. 38 in order to avoid obscuring other aspects of FIG. 38.

FIG. 38 illustrates that the processors 3770, 3780 may include integrated memory and I/O control logic ("CL") 3772 and 3782, respectively. Thus, the CL 3772, 3782 include integrated memory controller units and include I/O control logic. FIG. 38 illustrates that not only are the memories 3732, 3734 coupled to the CL 3772, 3782, but also that I/O devices 3814 are also coupled to the control logic 3772, 3782. Legacy I/O devices 3815 are coupled to the chipset 3790.

Figure 39:
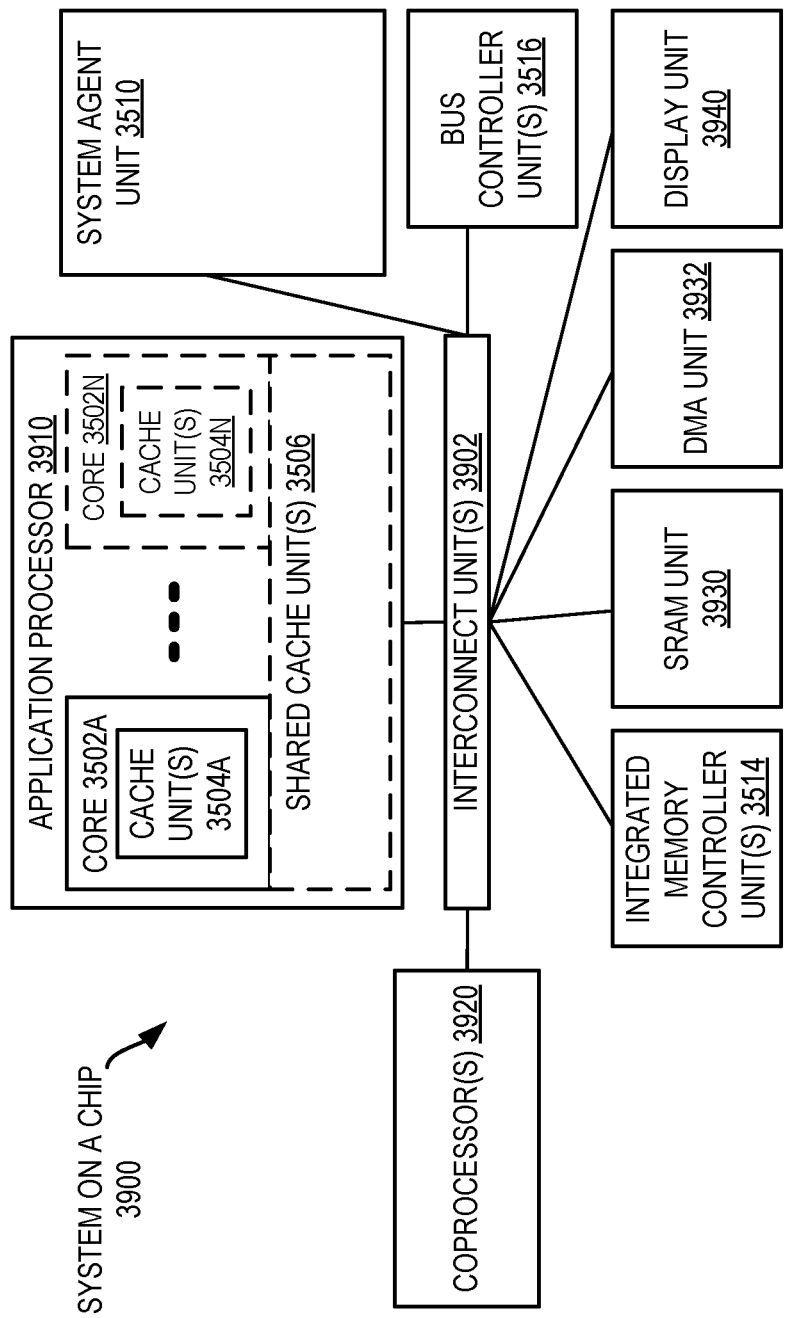
FIG. 39 is a block diagram of a system on a chip (SoC) in accordance with an embodiment of the present disclosure.

Referring now to FIG. 39, shown is a block diagram of a SoC 3900 in accordance with an embodiment of the present disclosure. Similar elements in FIG. 35 bear like reference numerals. Also, dashed lined boxes are optional features on more advanced SoCs. In FIG. 39, an interconnect unit(s) 3902 is coupled to: an application processor 3910 which includes a set of one or more cores 202A-N and shared cache unit(s) 3506; a system agent unit 3510; a bus controller unit(s) 3516; an integrated memory controller unit(s) 3514; a set or one or more coprocessors 3920 which may include integrated graphics logic, an image processor, an audio processor, and a video processor; a static random access memory (SRAM) unit 3930; a direct memory access (DMA) unit 3932; and a display unit 3940 for coupling to one or more external displays. In one embodiment, the coprocessor(s) 3920 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 3730 illustrated in FIG. 37, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 40:
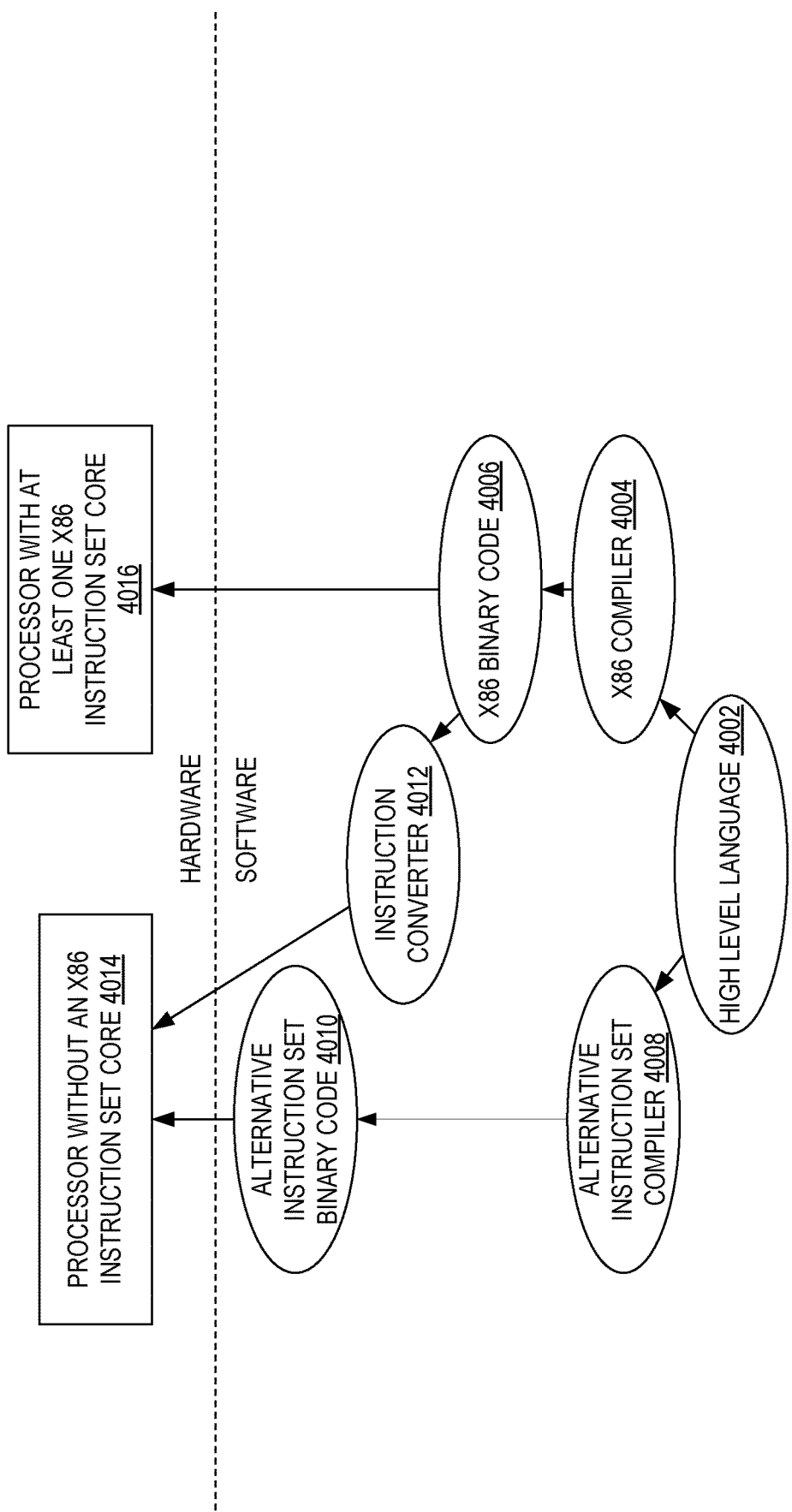
FIG. 40 is a block diagram contrasting the use of a software instruction converter to convert binary instructions in a source instruction set to binary instructions in a target instruction set according to embodiments of the disclosure.

FIG. 40 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 40 shows a program in a high level language 4002 may be compiled using an x86 compiler 4004 to generate x86 binary code 4006 that may be natively executed by a processor with at least one x86 instruction set core 4016. The processor with at least one x86 instruction set core 4016 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 4004 represents a compiler that is operable to generate x86 binary code 4006 (e.g., object code) that can, with or without additional linkage processing, be executed on the processor with at least one x86 instruction set core 4016. Similarly, FIG. 40 shows the program in the high level language 4002 may be compiled using an alternative instruction set compiler 4008 to generate alternative instruction set binary code 4010 that may be natively executed by a processor without at least one x86 instruction set core 4014 (e.g., a processor with cores that execute the MIPS instruction set of MIPS Technologies of Sunnyvale, CA and/or that execute the ARM instruction set of ARM Holdings of Sunnyvale, CA). The instruction converter 4012 is used to convert the x86 binary code 4006 into code that may be natively executed by the processor without an x86 instruction set core 4014. This converted code is not likely to be the same as the alternative instruction set binary code 4010 because an instruction converter capable of this is difficult to make; however, the converted code will accomplish the general operation and be made up of instructions from the alternative instruction set. Thus, the instruction converter 4012 represents software, firmware, hardware, or a combination thereof that, through emulation, simulation or any other process, allows a processor or other electronic device that does not have an x86 instruction set processor or core to execute the x86 binary code 4006.

What is claimed is:

1. An integrated circuit (IC) die comprising:
a first one or more vector registers to store a first plurality of source matrix data elements;
a second one or more vector registers to store a second plurality of source matrix data elements, each source matrix data element of the first and second plurality of source matrix data elements having a first data element width;
a third one or more vector registers to store a plurality of accumulation matrix data elements, each accumulation data element of the plurality of accumulation data elements having a second data element width which is at least twice the first data element width;
matrix processing circuitry operable in a plurality of processing lanes, the matrix processing circuitry to execute a single matrix instruction to perform a corresponding plurality of multiplications in the plurality of processing lanes;
operand routing circuitry to broadcast a first source matrix data element of the first plurality of source matrix data elements to multiple processing lanes of the plurality of processing lanes in accordance with the single matrix instruction, wherein in each processing lane of the multiple processing lanes, the matrix processing circuitry is to perform a corresponding multiplication of the first source matrix data element and a different data element of the second plurality of source matrix data elements to produce a corresponding product, the corresponding product to be added to a corresponding accumulation matrix data element and one or more other products of multiplications of respective data elements of the first and second plurality of source matrix data elements to generate a corresponding result matrix data element having the second data element width; and a local buffer storage to store at least a subset of the first plurality of source matrix data elements and the second plurality of source matrix data elements during execution of the single matrix instruction, wherein one or more matrix data elements in the subset of the first plurality of source matrix data elements or the second plurality of source matrix data elements are to be reused in multiple operations by the matrix processing circuitry while stored in the local buffer storage.

2. The IC die of claim 1, wherein each processing lane has a processing lane width equal to the second data element width.

3. The IC die of claim 1, wherein the first and second plurality of source matrix data elements comprise 16-bit floating-point data elements and the accumulation matrix data elements comprise 32-bit floating-point data elements.

4. The IC die of claim 1, the first plurality of source matrix data elements er and the second plurality of source matrix data elements are to be reused in multiple operations by the matrix processing circuitry while stored in the local buffer storage.

5. The IC die of claim 1, wherein the local buffer storage is to store the subset of the first plurality of source matrix data elements and a subset of the second plurality of source matrix data elements.

6. The IC die of claim 5, wherein the matrix processing circuitry is to perform matrix operations with the subset of the first plurality of source matrix data elements and the subset of the second plurality of source matrix data elements, store corresponding result data elements in the local buffer storage, and combine the corresponding result data elements with subsequent result data elements of subsequent matrix operations.

7. The IC die of claim 6, wherein the matrix processing circuitry is to prevent reclamation of at least a portion of the local buffer storage storing the subset of the first plurality of source matrix data elements and the second plurality of source matrix data elements until corresponding matrix operations have been performed.

8. The IC die of claim 1, wherein the matrix processing circuitry comprises a two-dimensional grid of processing elements arranged in the plurality of processing lanes.

9. The IC die of claim 8, wherein the two-dimensional grid of processing elements comprises a plurality of rows of processing elements including a first row of processing elements, a final row of processing elements, and a plurality of internal rows of processing elements, wherein each processing element in an internal row of the plurality of internal rows of processing elements is to receive a partial result from a first corresponding processing element in a first adjacent row of processing elements, generate a new partial result using the partial result, and transmit the new partial result to a second corresponding processing element in a second adjacent row of processing elements.

10. The IC die of claim 9, wherein the first adjacent row comprises either the first row of processing elements or a first internal row of the plurality of internal rows of processing elements and wherein the second adjacent row comprises either a second internal row of the plurality of internal rows of processing elements or the final row of processing elements.

11. A system comprising:
a processor; and
a matrix operations accelerator coupled to the processor, wherein the matrix operations accelerator comprises:
a first one or more vector registers to store a first plurality of source matrix data elements,
a second one or more vector registers to store a second plurality of source matrix data elements, each source matrix data element of the first and second plurality of source matrix data elements having a first data element width,
a third one or more vector registers to store a plurality of accumulation matrix data elements, each accumulation data element of the plurality of accumulation data elements having a second data element width which is at least twice the first data element width,
matrix processing circuitry operable in a plurality of processing lanes, the matrix processing circuitry to execute a single matrix instruction to perform a corresponding plurality of multiplications in the plurality of processing lanes,
operand routing circuitry to broadcast a first source matrix data element of the first plurality of source matrix data elements to multiple processing lanes of the plurality of processing lanes in accordance with the single matrix instruction, wherein in each processing lane of the multiple processing lanes, the matrix processing circuitry is to perform a corresponding multiplication of the first source matrix data element and a different data element of the second plurality of source matrix data elements to produce a corresponding product, the corresponding product to be added to a corresponding accumulation matrix data element and one or more other products of multiplications of respective data elements of the first and second plurality of source matrix data elements to generate a corresponding result matrix data element having the second data element width, and
a local buffer storage to store at least a subset of the first plurality of source matrix data elements and the second plurality of source matrix data elements during execution of the single matrix instruction, wherein one or more matrix data elements in the subset of the first plurality of source matrix data elements or the second plurality of source matrix data elements are to be reused in multiple operations by the matrix processing circuitry while stored in the local buffer storage.

12. The system of claim 11, wherein each processing lane has a processing lane width equal to the second data element width.

13. The system of claim 11, wherein the first and second plurality of source matrix data elements comprise 16-bit floating-point data elements and the accumulation matrix data elements comprise 32-bit floating-point data elements.

14. The system of claim 11, wherein the first plurality of source matrix data elements and the second plurality of source matrix data elements are to be reused in multiple operations by the matrix processing circuitry while stored in the local buffer storage.

15. The system of claim 11, wherein the local buffer storage is to store the subset of the first plurality of source matrix data elements and a subset of the second plurality of source matrix data elements.

16. The system of claim 15, wherein the matrix processing circuitry is to perform matrix operations with the subset of the first plurality of source matrix data elements and the subset of the second plurality of source matrix data elements, store corresponding result data elements in the local buffer storage, and combine the corresponding result data elements with subsequent result data elements of subsequent matrix operations.

17. The system of claim 16, wherein the matrix processing circuitry is to prevent reclamation of at least a portion of the local buffer storage storing the subset of the first plurality of source matrix data elements and the second plurality of source matrix data elements until corresponding matrix operations have been performed.

18. The system of claim 11, wherein the matrix processing circuitry comprises a two-dimensional grid of processing elements arranged in the plurality of processing lanes.

19. The system of claim 18, wherein the two-dimensional grid of processing elements comprises a plurality of rows of processing elements including a first row of processing elements, a final row of processing elements, and a plurality of internal rows of processing elements, wherein each processing element in an internal row of the plurality of internal rows of processing elements is to receive a partial result from a first corresponding processing element in a first adjacent row of processing elements, generate a new partial result using the partial result, and transmit the new partial result to a second corresponding processing element in a second adjacent row of processing elements.

20. The system of claim 19, wherein the first adjacent row comprises either the first row of processing elements or a first internal row of the plurality of internal rows of processing elements and wherein the second adjacent row comprises either a second internal row of the plurality of internal rows of processing elements or the final row of processing elements.

\* \* \* \* \*